United States Patent [19]

Simpson

[11] Patent Number: 5,268,998
[45] Date of Patent: Dec. 7, 1993

[54] SYSTEM FOR IMAGING OBJECTS IN ALTERNATIVE GEOMETRIES

[75] Inventor: Thomas K. Simpson, Annapolis, Md.

[73] Assignee: Paraspectives, Inc., Annapolis, Md.

[21] Appl. No.: 54,345

[22] Filed: Apr. 26, 1993

Related U.S. Application Data

[63] Continuation of Ser. No. 618,813, Nov. 27, 1990, abandoned.

[51] Int. Cl.$^5$ ............................................. G06F 15/72
[52] U.S. Cl. ...................................... 395/127; 395/119
[58] Field of Search ....................... 395/119, 125, 127; 340/729

[56] References Cited

U.S. PATENT DOCUMENTS 4,807,158  2/1989  Blanton et al. ....................... 395/125

OTHER PUBLICATIONS

Feiner et al., Visualizing n-Dimensional Virtual Worlds with n-Vision, Computer Graphics, 24(2), Mar. 1990, pp. 37-38.

Primary Examiner—Mark K. Zimmerman
Attorney, Agent, or Firm—Davis Hoxie Faithfull & Hapgood

[57] ABSTRACT

A system which enables the user to visualize directly an object in 3-D Lobachevskian, 4-D Euclidean, or other geometries. The system includes an input device (10), a transducer (11), a processing device (11), and an output device (12). The transducer (11) determines incident angles of light rays from each object point with respect to the coordinate axes of the system eye, employing geometric relationships to the alternative geometry. Then, using those incident angles, it defines new rays which produce an image constituting a direct representation on the human retina of the original object in the space of the alternative geometry. The processing device (11) them assembles the image points and delivers them to an output device (12) to be viewed by the user.

33 Claims, 40 Drawing Sheets

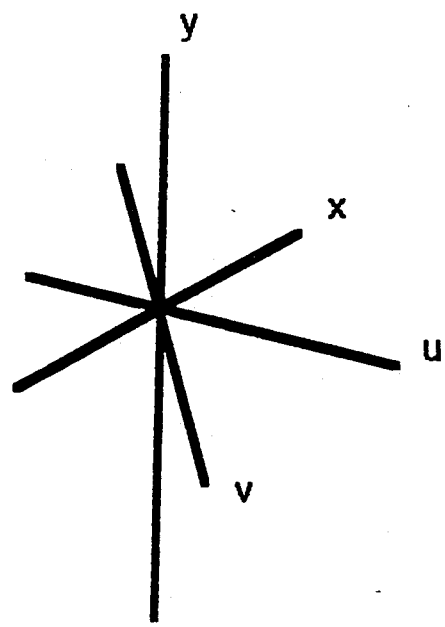
FIG. 21a
FIG. 21b
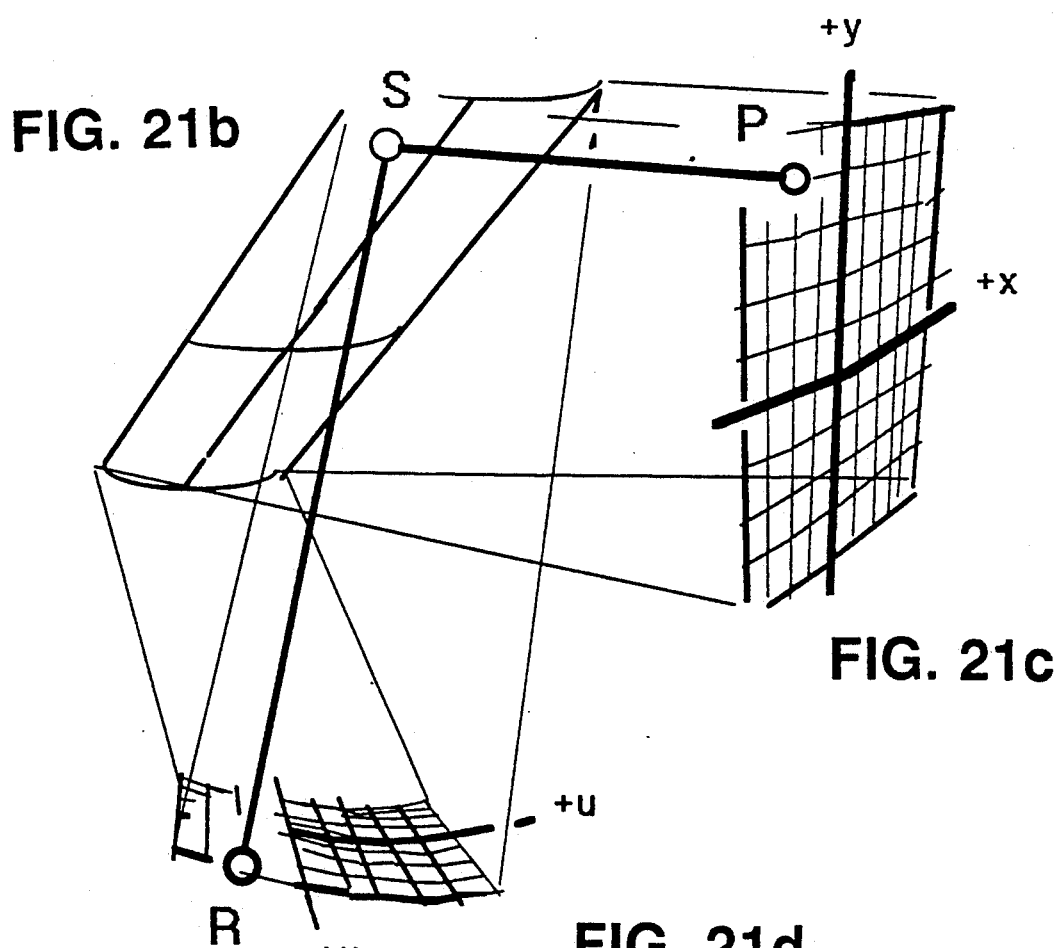
FIG. 21c
FIG. 21d

SYSTEM FOR IMAGING OBJECTS IN ALTERNATIVE GEOMETRIES

This is a continuation of copending application Ser. No. 07/618,813 filed on Nov. 27, 1990, now abandoned.

FIELD OF THE INVENTION

The present invention relates to the field of imaging devices, for use in the educational, scientific, business, and/or entertainment fields.

BACKGROUND OF THE INVENTION

Since approximately the middle of the nineteenth century, there has been a lively interest in geometries based on postulates other than those of Euclid. Mathematicians such as Lobachevski and Riemann investigated the possibility of relaxing Euclid's postulates. One postulate in particular was Euclid's "Parallel Postulate" which states that "For any given point not on a given line there is exactly one line through the point that does not meet the given line."

Relaxing the parallel postulate required showing that any number of lines through a point outside a given line are non-intersecting with the given line, or that none of the lines are intersecting. Such relaxation would result in hyperbolic geometry or curved space. The consequences of such shifts in Euclid's "Parallel Postulate" proved to be spaces of dramatically different structures. For example, in Lobachevskian geometry, which is a hyperbolic geometry, one sees that it is not possible to change the size of a given figure without at the same time changing its shape which implies in effect the existence of an absolute standard of length.

At the same time, a consistent mathematics of geometries of dimensionality greater than three was developed, and there has been during the past century extensive speculation concerning the "fourth dimension." In addition to metric geometries, non-metric geometries have been fully developed, which do not presuppose the concept of length, with the broadest theory of the structure of space, in general, having been formulated in the domain of topology. Differential geometries have made possible theories of curved spaces.

In one application of four-dimensional geometry, the "fourth" dimension is interpreted as time. Einstein's special theory of relativity has made it a commonplace assumption that the fourth dimension is time, while the curvature of physical space or the space-time continuum has become a common concept through popularization of Einstein's general theory of relativity. However, this does not concern geometry per se, which would include a fourth spatial coordinate for describing space.

It was pointed out by Henri Poincare that there is a close association between our intuitive geometrical conceptions, and the behavior of the rigid bodies with which we are familiar. In particular, the human eye may be described as a rigid body moving with the motions of a rigid body in a three-dimensional Euclidean space. It is generally assumed by mathematicians and others that our spatial intuitions are thus shaped and limited, whether by development, inheritance, or our human nature, to those of a 3-D space, and while it is widely granted that we can comprehend figures and relationships in alternative geometries formally and intellectually, it is generally supposed that we cannot visualize them directly. At the same time, it is widely recognized that many mathematicians, as well as students, teachers, engineers and other professional users of applied mathematics, are greatly aided in their understanding of mathematics by the power of the "spatial intuition," whenever this is possible.

"Spatial intuition" is the conventional power of the human visual perception system which, when presented with two dimensional information that carries with it an implication of a third dimension, systematically and as a matter of course, infers the existence of the third dimension. We thus use our insights in one dimension to understand the next or those of higher dimensionality. For example, the retina of our eye has only two dimensions, so whenever we see a three dimensional object, it is because a sequence of two dimensional images has been formed on the retina, from which we intuit the extension in depth of the three dimensional object. We instinctively use such techniques as motions of the head, and such determinations as the orientation of the object to its background to decide where each of the two dimensional images on our retina actually lies with respect to the visual axis, i.e., back, forward, side, top, etc.

What has been perceived to date as the absence of this power in the case of alternative geometries, such as 4-D Euclidean, is often regarded as an important impediment, and many methods have been devised to supplant the missing direct intuition. Such methods include the display of objects in alternative geometries, such as 4-D Euclidean, through the use of projections, intersections or models in conventional space or 3-D Euclidean geometry in a great variety of forms. In general, these take the form of some method of transformation which maps the figure which has been formally defined in an alternative geometry into a figure within 3-D Euclidean space, which we are then able to contemplate in the usual way. In its simplest form, such a figure may consist of an intersection of the figure in the alternative geometry with Euclidean three-dimensional space. Further, however, such figures may take the form of solid, three-dimensional models which can in turn be rotated as solid figures in 3-D space and/or viewed in three-dimensional perspective. The form and complexity of the original figure in the alternative geometry may, by such methods, be revealed through first giving it rotation in its original space, changing the mode or center of projection, in that space and then observing the consequence as shown in the resulting object. Over many years, diagrams or models of this sort have indeed aided greatly in the discussions of alternative geometries.

With the advent of the electronic computer, the power to visualize alternative geometries has been greatly enhanced, as images can now be quickly produced and transformed on demand, and rendered in color under various assumed modes of lighting, and in animation. However, it is important to make the distinction that these images are still only the projections, intersections, or models of objects in 3-D Euclidean space and not the object as it would appear in the alternative geometry itself. Such projections, intersections, and models of objects in 4-D Euclidean geometry have been displayed on computer systems. See, for example, *Beyond The Third Dimension: Geometry, Computer Graphics, and Higher Dimension* (1990), by Thomas Banchoff, and his film *The Hypercube: Projections and Slicing* (1978). In these works, Mr. Banchoff defines a 4-D object such as the Hypercube in 4-D space, and then computes and displays corresponding mappings in conventional space either as intersections, orthogonal projections, or stereographic projections. Orthogonal projections are those in which the conventional coordinates are projected unaltered, while the fourth is ignored (corresponding to projection by rays from a source at infinite distance.) Stereographic projections are those in which the three-dimensional object is generated by rays or lines originating from a point at finite distance. Images so generated have been used to produce animated films of the 4-D cube or hypercube, and the 4-D sphere or hypersphere. In these films, as the objects are rotated, dramatic animated sequences are produced in full color and with computer-aided enhancements of light and shading. The resulting images aid greatly in approximating an intuitive sense of the four-dimensional objects themselves. However, these images do not reproduce the effect of light rays coming directly from the object in the alternative geometry, and hence, do not provide a view of the 4-D object itself, but show only the 3-D projections of the 4-D object.

Alternative geometries have a wide range of applications. Within mathematics, for example, four dimensions are required whenever there is a need to map the plane onto itself by means of a topological function, or a number pair into a number pair, as in the graphing of the function of a complex variable. Physicists and engineers frequently work with systems with more variables than three; in general, the graphing of the configuration space of systems of more than three variables generates a locus of higher dimensionality. It is very often valuable to work with curvilinear coordinates, and non-linear systems may often be best expressed in a curvilinear geometry. In order to visualize the curvature of a three-dimensional space properly, however, it is necessary to embed it in a linear space of four dimensions. With the availability of a wealth of computer technology for graphical design and imaging, and even for the experiencing of virtual reality in various modes, it seems clear that an instrument is needed to provide for greater visual intuition of objects in alternative geometries. Such an instrument would need to provide what is in effect a direct visualization of the objects themselves in the alternative geometry, rather than the projections, models and intersections of the prior art.

OBJECTS AND SUMMARY OF THE INVENTION

It is therefore an object of the present invention to provide a system for the direct visualization of objects lying in alternative geometries, and/or for portraying the motions of objects in the space of those alternative geometries, such as, but not limited to, four-dimensional Euclidean and three-dimensional Lobachevskian geometries.

It is a further object of the present invention to provide a system for the direct visualization of an object in an alternative geometry without dependence upon models, intersections, or projections of the object in the alternative geometry.

It is a further object of the present invention to provide a system for the direct visualization of an object specifically in 4-D Euclidean geometry.

It is a further object of the present invention to provide a system for the direct visualization of an object specifically in 3-D Lobachevskian geometry.

It is a further object of the present invention to provide a system for direct visualization of an object which is also capable of interactive visualization and manipulation of visual images of the object in an alternative geometry.

It is a further object of the present invention to provide a system which is capable of interactive visualization and manipulation of an object specifically in 4-D Euclidean geometry.

It is a further object of the present invention to provide a system which is capable of interactive visualization and manipulation of an object specifically in 3-D Lobachevskian geometry.

It is a further object of the present invention to provide a system capable of translation and planar rotation of an object in an alternative geometry.

It is a further object of the present invention to provide a system capable of translation and planar rotation of an object specifically in 4-D Euclidean geometry.

It is a further object of the invention to provide a system capable of translation and planar rotation of an object specifically in 3-D Lobachevskian geometry.

It is a further object of the present invention to provide a system capable of imputing planar rotation and translational motion to a user viewing an object in an alternative geometry.

It is a further object of the present invention to provide a system for graphing an object in an alternative geometry.

It is a further object of the present invention to provide a system for graphing an object specifically in 4-D Euclidean geometry.

It is a further object of the present invention to provide a system for geometric construction or drawing of an object in an alternative geometry.

It is a further object of the present invention to provide a system for geometric construction of an object specifically in 3-D Lobachevskian geometry.

It is a further object of the present invention to include a system for imaging of objects in alternative gemetries as they appear directly in the space of the alternative geometry, including but not limited to 4-D Euclidean and 3-D Lobachevskian geometry.

These objects are achieved in accordance with the system and method of the present invention. The present invention is a system and method of imaging on the human retina of a user an object in an alternative geometry. Input to the system are the characteristics of the alternative geometry and the object. Using a transducer, the object points forming the object in the alternative geometry are transduced into corresponding 2-D image points in 3-D Euclidean space. A processing device of the system then assembles the transduced image points to form an image of the direct appearance of the object to a user's eye placed in the alternative geometry. The output of the processing device controls an output device for presenting the assembled image points forming the object to the user's eye.

More specifically, the imaging system and method displays the direct appearance of the object in the alternative geometries of 4-D Euclidean and Lobachevskian 3-D. In addition, the imaging system and method provides for interactive planar rotation and translation of the object and/or the viewing position of a user in the alternative geometries, for a fully interactive imaging system.

Further, the transducer operates by determining the angles with respect to the x and y axes at which the light rays from the object points of the object are incident on the 3-D Euclidean space of the user's eye using the geometrical relationships of the alternative geometry.

Then using the incident angles, the transducer determines the corresponding angles in the 3-D space of the output device and the user's eye according to the geometrical relationships of 3-D Euclidean geometry from which the retinal coordinates of each image point are determined. A computer assembles the image points for delivery to a computer monitor screen for display of the object as it would directly appear in the alternative geometry.

BRIEF DESCRIPTION OF THE DRAWINGS

These and other objects, aspects and embodiments will now be described in more detail, with reference to the following drawing figures, of which:

FIGS. 21(a)-21(d) illustrate the visualization of a Cartesian coordinate grid in 4-D space and the corresponding plotting of functions involving four variables in accordance with the GRAPHING/IMAGING mode of the present invention.

DETAILED DESCRIPTION OF THE INVENTION

I. The Concept of Alternative Geometries

In order to fully understand the concepts involved in the present invention, reference will be made to FIGS. 1-8 and the general introduction which follows, before discussion of the invention in detail. Further, reference is made to Flatland, (Signet Classic, 1984), written by E. A. Abbott and originally published in 1884, as background in forming an intuitive sense of the hypothetical case of people existing in a 2-D space having 2-D eyes and a one-dimensional retina.

Figure 1:
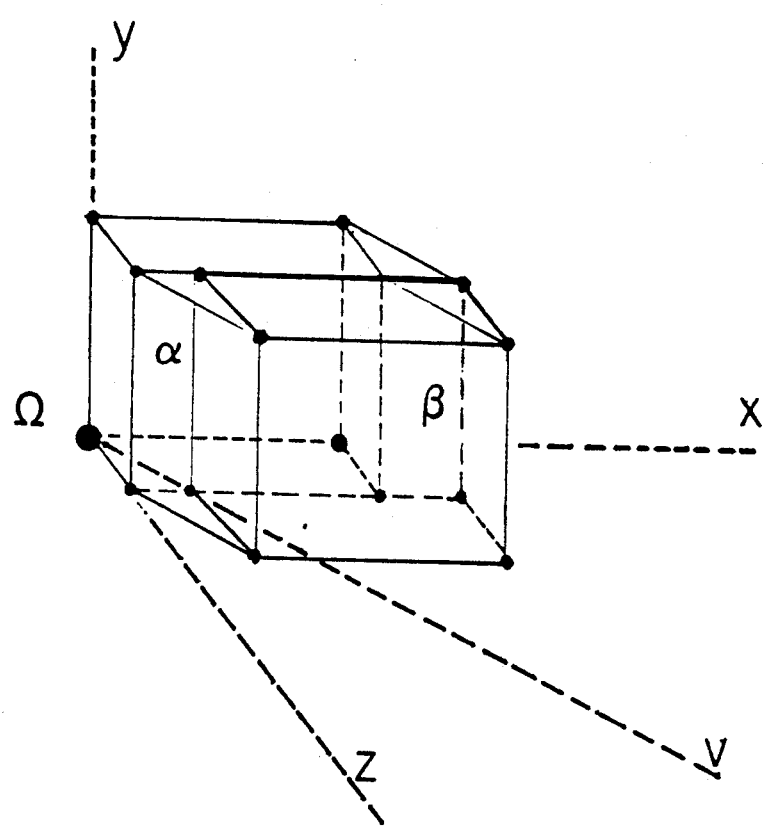
FIG. 1 illustrates an image of the 4-D Hypercube.

A basic understanding of geometric objects is necessary in order to apprehend objects of higher dimensions and, more importantly, in understanding the power of the optical system of the present invention. Geometric figures exist in the dimensionality and in conformity to the theorems and postulates of the space which they are defined. Thus, a square is a representative figure in a hypothetical 2-D Euclidean space or world (i.e., a plane) and its counterpart, the cube, in the Euclidean space of three dimensions. On the other hand, a square is an impossible figure in the geometry of Lobachevski. Considering the question of dimensionality, from the geometrical relationship between objects of one dimensionality and those of dimensionality one degree higher, one can attempt to grasp the form of objects of dimensionality higher than our own. More broadly, one can see the geometrical progression from an object of no dimension, such as a "point", to a 4-D Euclidean object, such as a Hypercube. By extending a point with zero dimensionality unit distance in the new dimension of one dimension, a line is created. This reflects a new degree of freedom a point thus acquires. Correspondingly, in 2-D space, a line moved a unit distance perpendicular to its length forms a square. In three dimensions, a square moved a unit distance perpendicular to its surface forms a cube. Following this through to four dimensions, a cube in 4-D space moved a unit distance perpendicular to its volume forms the 4-D object the Hypercube, as shown in FIG. 1, in which the image has been produced by means of the present invention. The geometrical progression can be recognized through the fact that the Hypercube of FIG. 1 has sixteen vertices, whereas the cube of 3-D space has eight vertices.

The term "space" is not to be limited to its literal interpretation discussed herein but is to also be understood metaphorically or abstractly, as in discussion of "color space," "tone space," or the "configuration space" of a physical system. Thus, the present invention is equally applicable by way of the visual images it produces, to such abstract, diagrammatic or metaphorical spaces as well.

Figure 2:
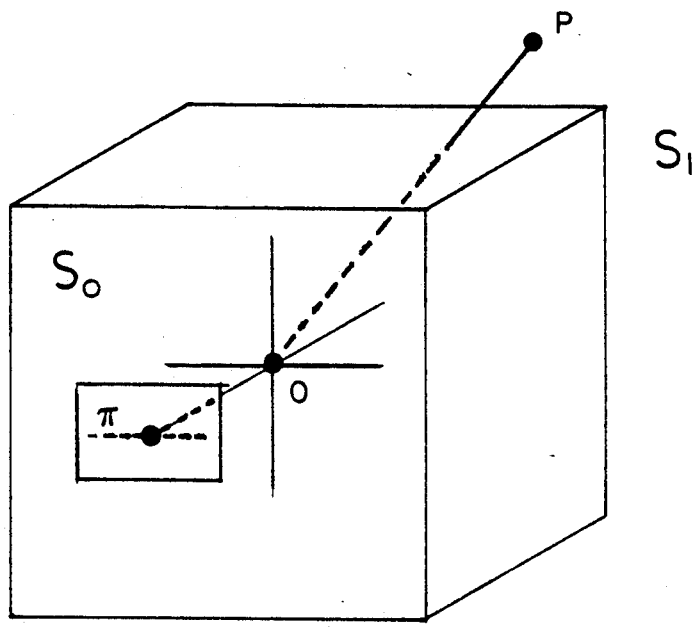
FIG. 2 illustrates the 3-D Euclidean space of the human eye.
Figure 3:
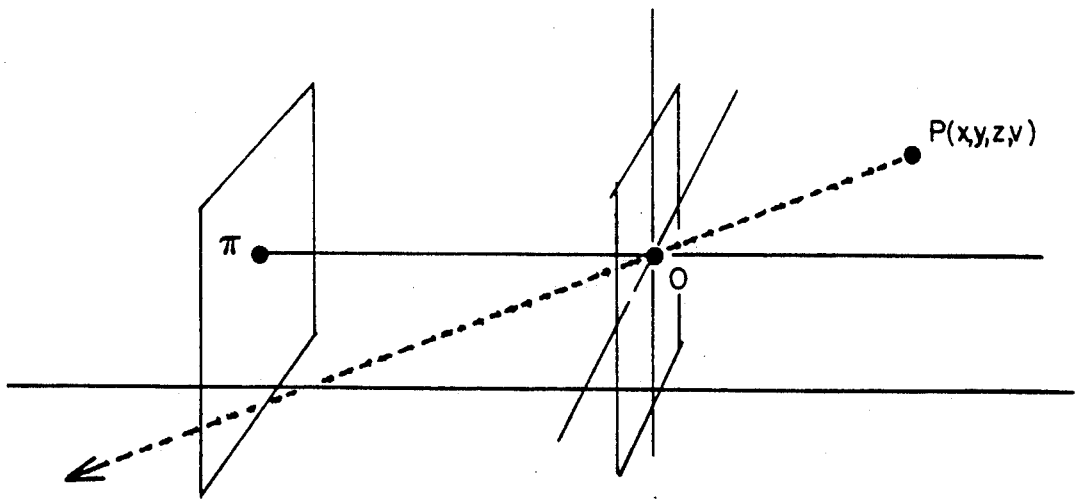
FIG. 3 illustrates the fact that a ray from a 4-D point lying outside a given 3-D space cannot intersect the 3-D space in more than one point.

FIG. 2 represents the human eye as it is confined to 3-D Euclidean space. The eye, as represented, is a system which is physically only 3-D in that, as shown in FIG. 2, it consists of a plane $\pi$ (the retina) and a point outside that plane (the pupil, O). The eye is represented as the space $S_o$. Although the space $S_o$ is shown as a box it in fact has no "edges," as shown in FIG. 3. It is commonly believed that humans are confined to the conventional space $S_o$ of the eye which is 3-D Euclidean space (i.e., conventional space). The problem exists in directly seeing an object that lies outside the 3-D Euclidean space of the eye. It is mathematically provable that the ray from a point P on an object in an alternative geometry, which is outside the 3-D Euclidean space of the eye, if it intersects that space at all can do so only once, and cannot intersect it a second time.

FIG. 2 shows the point P in the space of the alternative geometry outside the conventional space $S_o$. Thus, as shown in FIG. 3 if a ray originates in a different space, corresponding to a different alternative geometry, and intersects the pupil it therefore cannot also intersect the retina and thus be visible. Such reasoning until now has quite plausibly convinced the mathematical world that it cannot be imagined that an object in an alternative geometry could be seen, such as an object in 4-D Euclidean space—though its properties could be logically comprehended, and could be modeled in various ways within conventional Euclidean space. Thus, prior to the present invention it was felt that a person could not have a direct, perspective view of 4-D objects. The present invention overcomes this problem with the use of a transducer, as described below.

Figure 4:
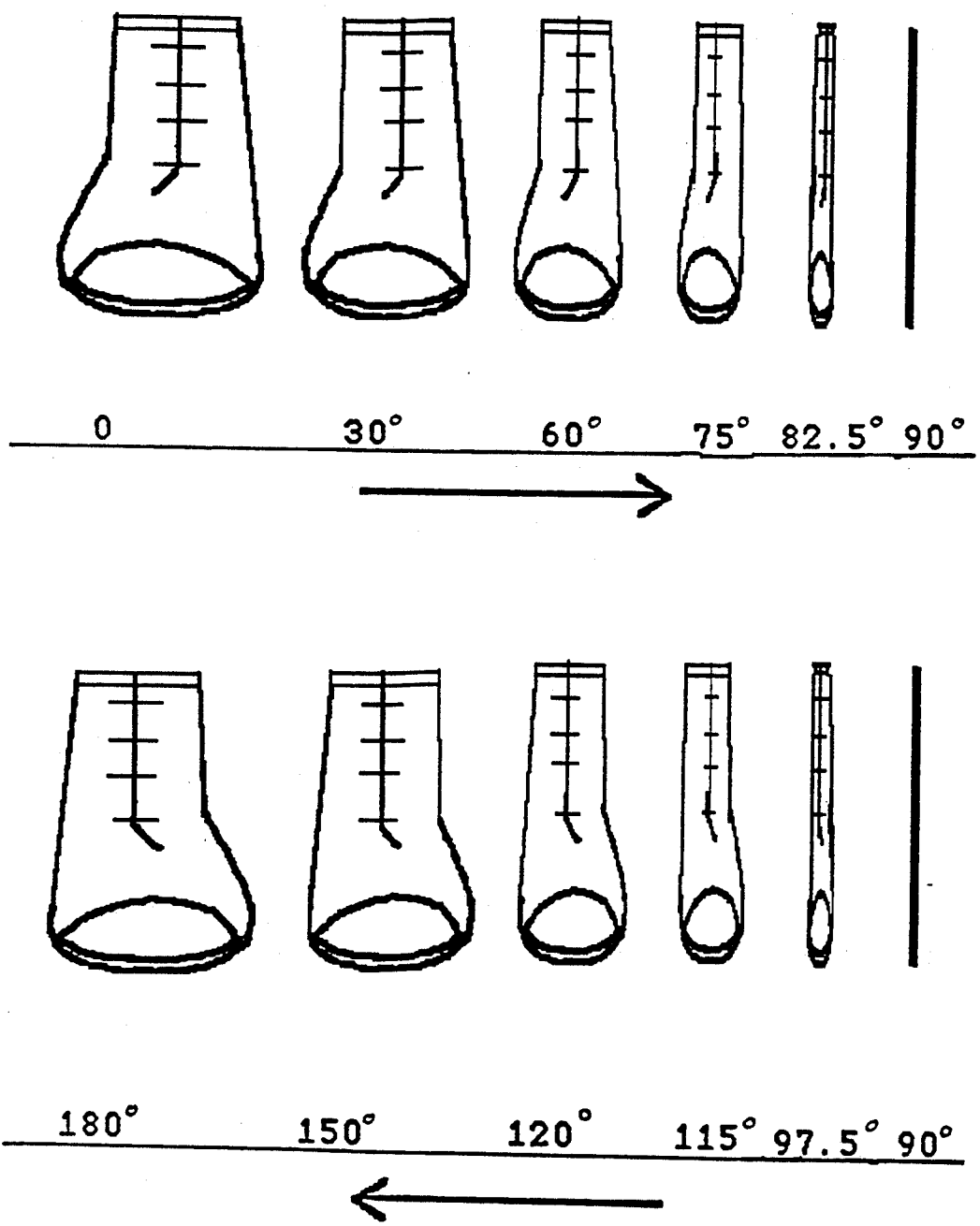
FIG. 4 illustrates a view in 3-D Euclidean space of the rotation of a shoe in 4-D space.

Henri Poincare made the claim that an experienced mathematician should be able, with practice, to visualize phenomena in 4-D Euclidean space in which left-handed objects could routinely be turned into their right-handed counterparts. This would mean that left shoes could be routinely turned into right shoes, because of the additional degree of freedom a fourth spatial coordinate would give. FIG. 4 shows a view in conventional space of the rotation of a shoe in 4-D space. As shown, the left shoe 1 does not seem to be rotating but only to be shrinking until it disappears, then reappearing and expanding to a full sized right shoe 1. The problem overcome by the present invention is to observe, not just this 3-D glimpse, but the 4-D body in its rigid integrity throughout the motion. This may be easier to understand with reference to FIG. 5(a) which shows a hypothetical 2-D world, i.e., a plane.

Figure 5A:
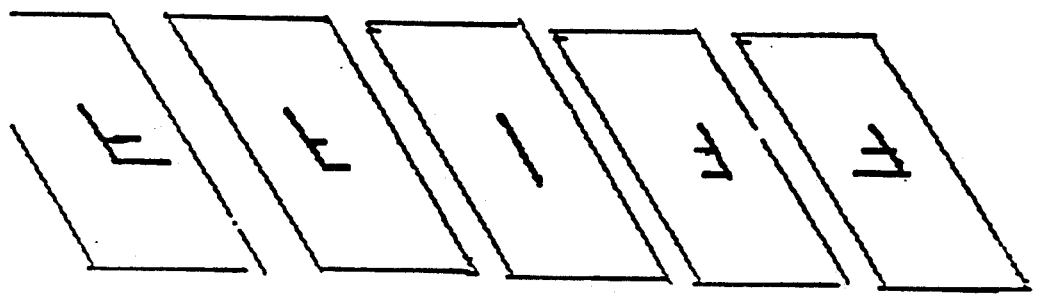
FIGS. 5(a)-5(b) illustrate, respectively, the view to an unaided 2-D eye of the letter "F" rotating in 3-D Euclidean space and the same view with the aid of the present invention.
Figure 5B:
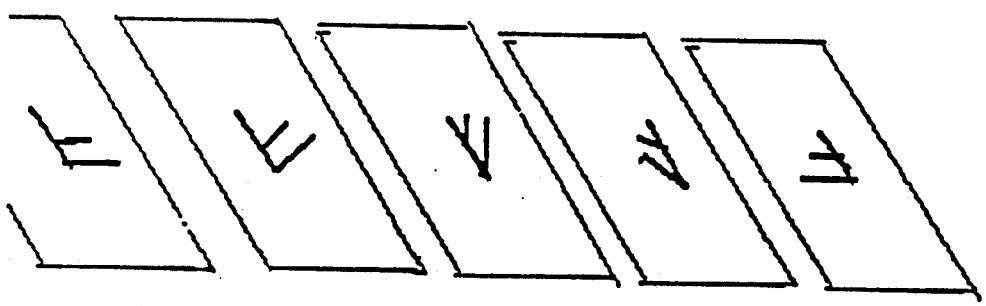

As shown, a person in such a 2-D space would be 2-D having a 2-D eye with a one-dimensional retina. The unaided 2-D eye, as represented in FIG. 5(a), is looking at a levular (i.e., left-handed) letter "F" as it rotates. To the 2-D eye the left-handed "F" would appear only to be shrinking in size until it disappears and then reappearing as a dextral (i.e., right-handed) letter "F". However, as shown in FIG. 5(b), if the 2-D eye could see with the present invention, discussed below, it would see that the "F" is actually rotating in 3-D space (i.e., conventional space) and never changes size but merely rotates 180 degrees (i.e., flips over). The 3-D space gives the letter "F" an extra degree of freedom so that it can rotate out of the plane of the 2-D world or space, just as the shoe in FIG. 4 could rotate out of the conventional space $S_o$ in the 4-D space.

With the use of the present invention, discussed below, a person will be able to see the rotation of the shoe and the translation and rotation of any other 3-D object in 4-D space. In effect, the present invention will also enable a person's 3-D eye to visualize directly a 4-D object in the 4-D space, as opposed to the 3-D projections, models, or intersections of the prior art. The present invention will also extend to any alternative geometry, such as 3-D Lobachevskian geometry.

It is important to clarify how the present invention makes possible a "direct" view of an object such as the 4-D object discussed above. When the visual data of a 4-D world are crowded onto the 2-D human retina, overlapping and apparent visual confusion necessarily ensue. Not all objects lie in the direction in which they are first seen, and in that sense their image is not "direct," but as if refracted into the eye, much as a stick is seen refracted under the surface of a pond. On the other hand, it is always possible to confirm that the stick is indeed intact by placing the eye in an appropriate position and sighting along its length. In much the same way, the present invention makes it possible in every case to turn to the object in such a way as to sight it directly, then to confirm this by reducing the distance between the pupil of the system eye and the 4-D object to zero. By this process it is indeed not only seen directly, but can be approached and "touched," a feature specifically incorporated in the "GO/LOOK" and "MOVE/TURN" modes described below.

The transducer used in the present invention replaces the pupil of the human eye with a "system eye" and functions as an interface between the conventional space $S_o$ of the eye, and the space $S_1$ of the alternative geometry in which the object is inserted. The transducer will allow the user's eye to in effect be inserted in any alternative geometry by becoming congruent with the space of the alternative geometry.

Generally, the transducer has two functions. It first determines the angle at which any incoming ray of an object is incident on the pupil of the system eye with respect to the reference axes of the system eye, using the trigonometric laws of the alternative geometry in space $S_1$. Then according to the laws of the conventional space $S_o$, which is 3-D Euclidean geometry, it determines from the incident angles the position of a corresponding image point in the space $S_o$ of the system eye and correspondingly, the user's eye.

Figure 6:
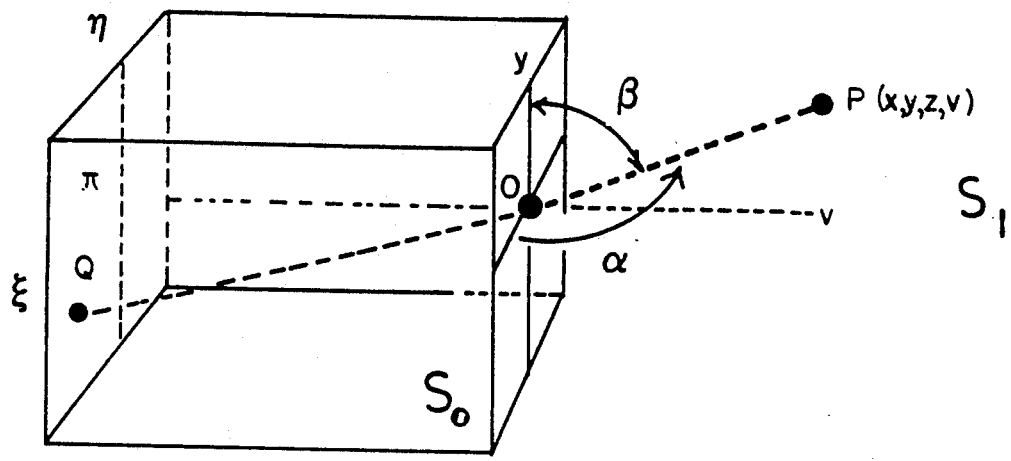
FIG. 6 illustrates the 3-D Euclidean or conventional space of the system eye of the transducer of the present invention and a point P in 4-D Euclidean space.

For example, in FIG. 6 the conventional space of the system eye of the transducer is designated $S_o$ and the point P outside the space $S_o$ is in the space $S_1$ of the alternative geometry. The point I represents the pupil of the eye, the plane $\pi$ the retina. The line OV represents the visual axis of the eye in the space $S_1$ looking through the transducer. The ray PO lies in the alternative space, and strikes the transducer or pupil of the eye at O. The transducer determines the angles $\alpha$ and $\beta$ which PO makes with the x and y axes of the eye's system, and generates a new ray OQ in the conventional space $S_o$ of the eye in such a way as to make the determined angles with the two axes. OQ belongs to the eye's space and strikes the retina to form a 2-D image point Q. Thus, the transducer is used to generate an image point in conventional space $S_o$ for any object point in the space $S_1$ of any alternative geometry. It is important to note that the rays PO and OQ are not the same lines, even though, in cases where the angles in both spaces are equal, it will appear that way. Also, when the angles are equal it is only because of the type of display employed and it is not necessary that they be equal. Only by using this optical transducer is it possible to obtain the image point Q on the retina. If the space $S_1$ is 4-D space then by transducing each object point P (x, y, z, v) of an object into an image point Q we form a retinal image or image on a picture plane of the object in 4-D Euclidean space. Each image point Q would have the coordinates $\xi$, $\eta$.

Figure 7:
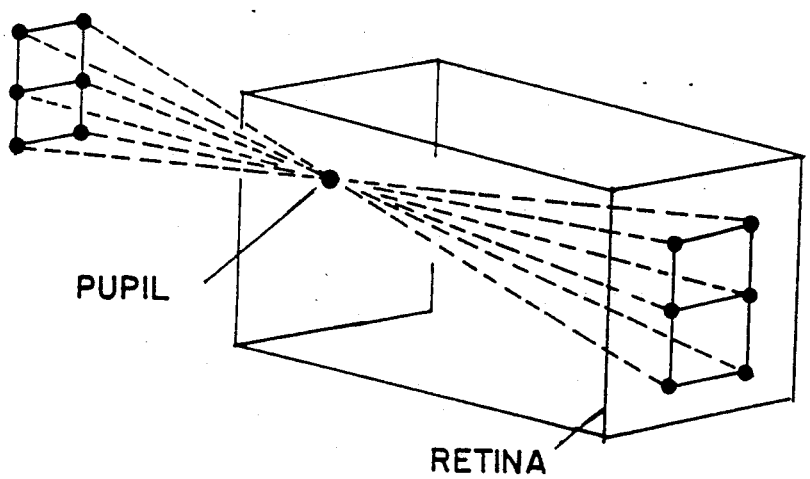
FIG. 7 illustrates the unaided human eye viewing a 3-D object from a particular position and orientation.

By planar rotation and translation of the viewing position a user can intuit from the 2-D visual images on the user's retina the appearance of the 4-D object in 4-D space, just as the user can already intuit the 3-D Euclidean objects in conventional space from the 2-D images on the user's retina. FIG. 7 shows the unaided eye of a person in conventional space as the person normally views a 3-D object such as a cube from one angle and position. The person's retina only sees 2-D pieces of the 3-D object and intuitively, although subconsciously, determines where each of the pieces of the cube are and then there formation into a 3-D object.

The same intuition will help a user view a 4-D object from its 2-D pieces formed on the user's retina from the 2-D image points displayed by the present invention. Translation and rotation of the objects or imputation to a user's eye will be crucial in sorting out the overlapping image points on the user's retina.

Before the present invention is described in detail it will also be helpful to look at how the translation and rotation of a 3-D object in a 3-D Euclidean space using the present invention would be helpful to hypothetical 2-D people in their 2-D world, i.e., a plane. 2-D people only see 2-D figures in perspective like a 3-D person sees 3-D objects in perspective. Similarly, their viewing 3-D images brings the same problems as 3-D people viewing 4-D objects.

Figure 8A:
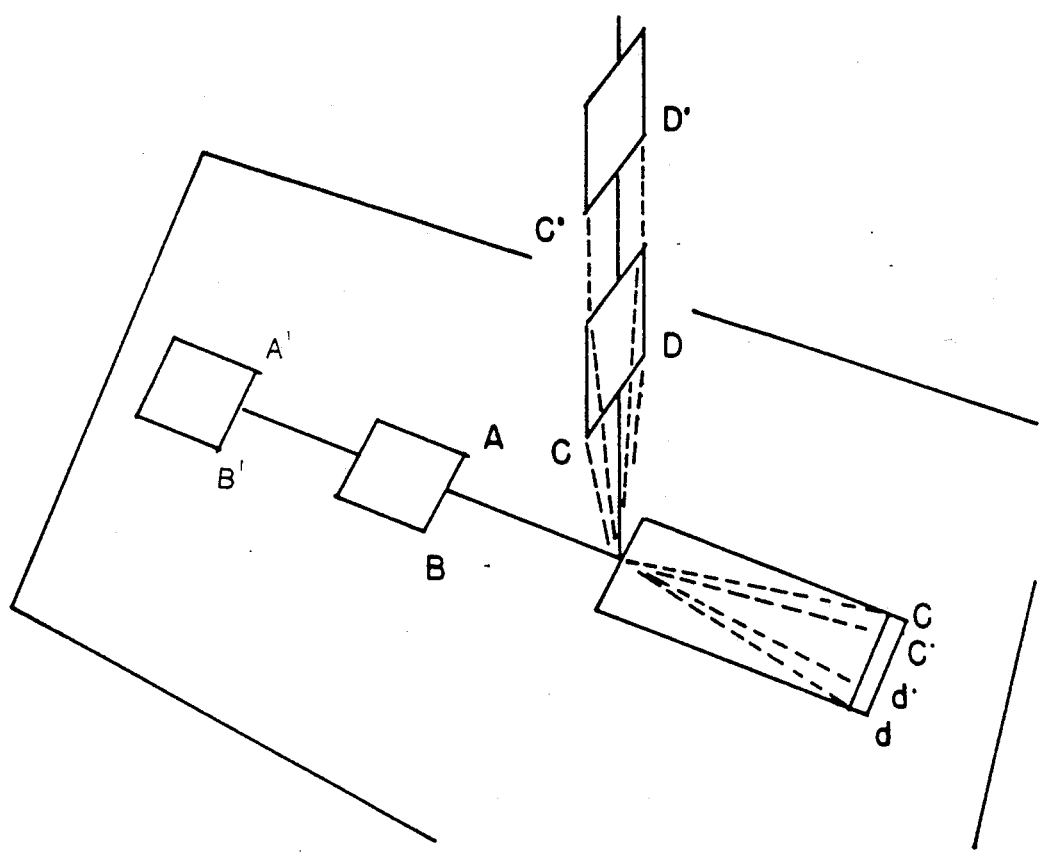
FIGS. 8(a)-8(d) illustrate a 2-D eye viewing 2-D objects in 3-D Euclidean space with the use of the system of the present invention.
Figure 8B:
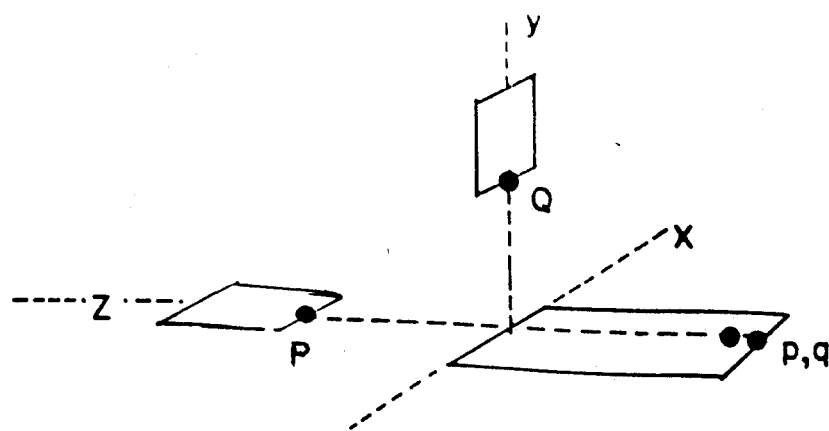
Figure 8C:
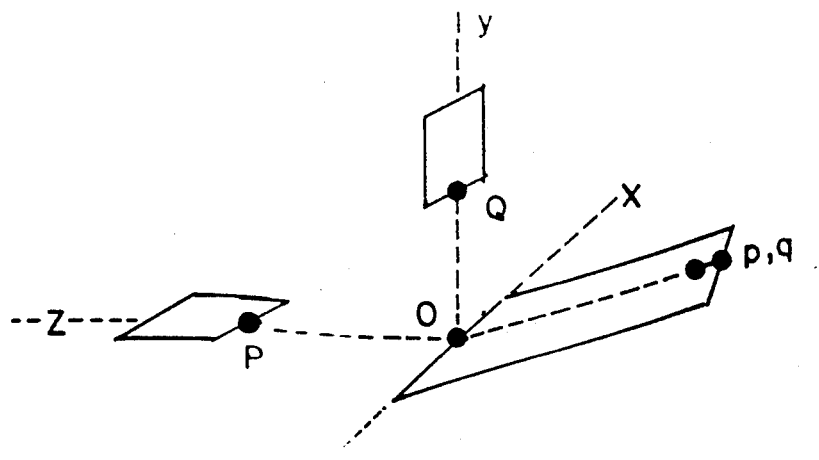
Figure 8D:
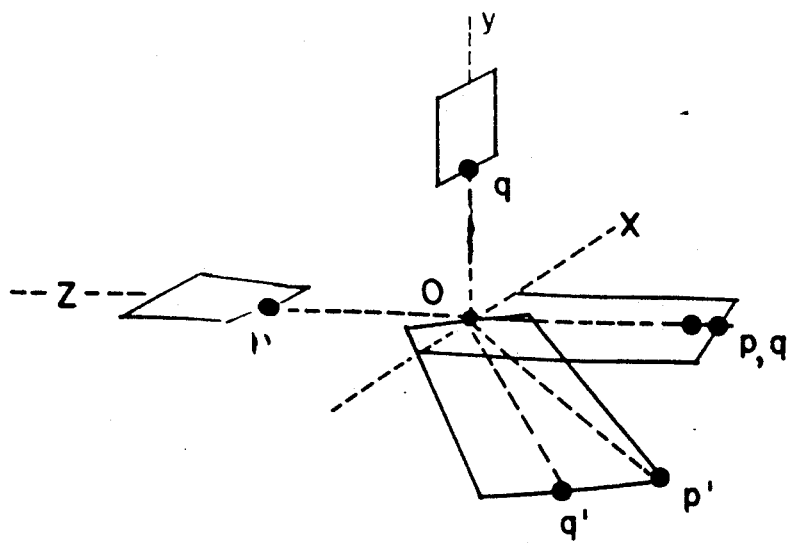

FIG. 8(a) shows a 2-D person looking through a transducer at the 3-D world. The 2-D person would note that the sense of distance looking at a 2-D object is preserved in 3-D space, in that an object will appear to reduce in size in proportion to its distance from the pupil as it moves down an axis perpendicular to 2-D space. More specifically, in 2-D space the edge of an object represented by line AB will appear to the 2-D person to be reducing in size as it moves down the visual axis, as shown by line A'B'. Similarly, in 3-D space the line CD of the 2-D object will appear to reduce in size as it moves down an axis perpendicular to 2-D space, shown by line C'D'. FIG. 8(b) shows the 2-D eye having a one-dimensional retina looking at points P and Q, for simplicity, on 2-D objects (i.e., squares) in a 3-D space. It is shown that the y and z axes will coalesce on the one-dimensional retina, both appearing "straight ahead", just as the z and v axes of the 4-D space would coalesce on a user's 2-D retina. Rotation about a proper coordinate axis will be needed to distinguish the axes and the points p, q on the one-dimensional retina. FIG. 8(c) shows that rotation about the x-axis will not help to distinguish the y and z axes, but FIG. 8(d) shows that rotation about the y-axis will quickly separate one from the other and correspondingly the points p, q.

Similarly, when a user looks in 4-D space, 2-D image points are formed on the user's retina, but the v and z axes may coalesce. To separate the two axes and the images overlapping on a user's retina requires translation and rotation. However, the rotation is no longer axial but must be rotation about a plane (i.e., "planar rotation"). Once the 2-D images are separated a user can employ intuitive means to distinguish images of the components of the object. Then, through further rotations and translations he can begin to reassemble these components just as a user would normally assemble a 3-D object from the 2-D components of an image in conventional space. Physically, planar rotation at this stage of evolution is impossible, but with the use of the present invention, planar motion can be imputed to a user viewing a 4-D or 3-D object in 4-D space, by translation and planar rotation of the object. It will thus be possible to experience the visual effects of a degree of freedom not afforded our human visual system by evolution.

The present invention utilizes a computer for the transducer. Thus, the computer acts as a versatile optical instrument for imaging objects in alternative geometries, whether visually or by other means of imaging.

Figure 9:
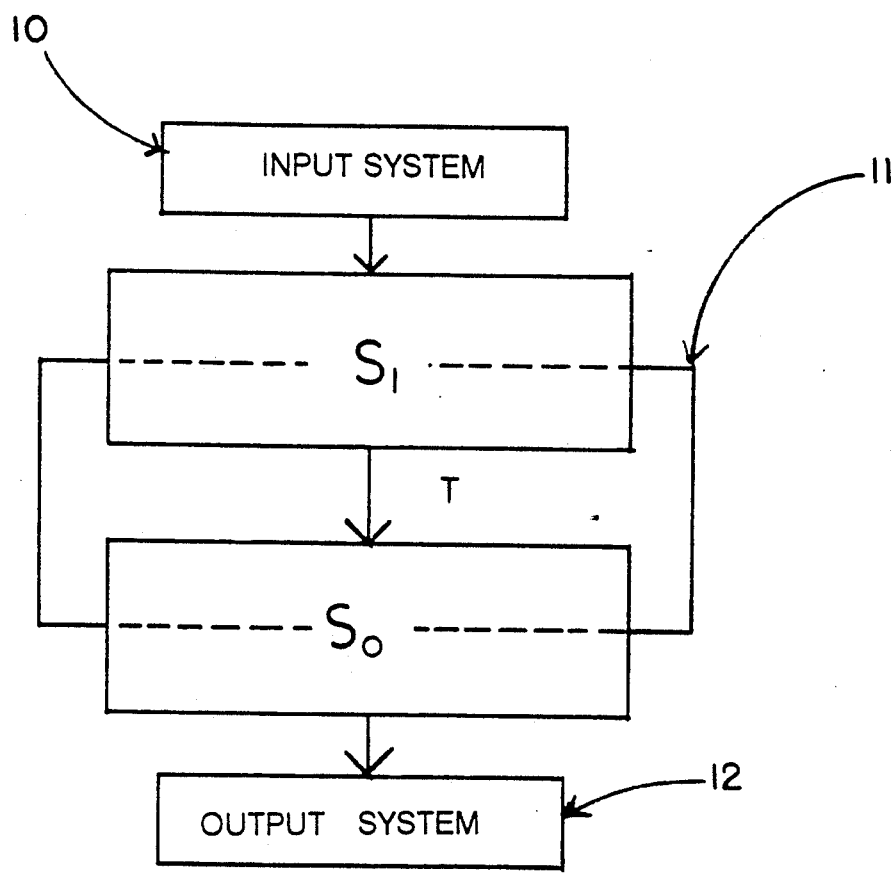
FIG. 9 illustrates a flow diagram of the overall function of the system of the present invention.

FIG. 9 depicts in diagrammatic form the overall function of the system of the present invention. The system includes an input system 10 for inputting the characteristics of a selected alternative geometry and an object in the space $S_1$ of the alternative geometry. Such input systems would include physical position and motion detectors, graphic devices or keyboards and voice instructions to the computer. The imaging system further includes a transducer 11 to place a user's eye virtually in the space $S_1$ of the alternative geometry and determine the directions of light rays which would reach the pupil of an eye so positioned. The transducer then would generate an altogether new set of rays in the conventional space $S_o$ (i.e., 3-D Euclidean space) of the eye, and their corresponding intersections with a retina or picture plane (i.e., image points). The system has a corresponding physical output system 12 in the conventional space $S_o$ for presenting the image formed in a selected form, including film, tape, computer screen display, or actuating any of the devices such as stereoscopic spectacles, stereophonic sound, manipulator handles, etc., designed to generate sensations of virtual reality.

Fully implemented with the use of high-speed computer workstations now commonly available or readily provided by present computer technology, the output of the system of the present invention would follow without observable delay upon the insertion of a given input. The response of the system would be such, therefore, that the visual image would follow immediately upon the motion of the joystick or turn of a control trackball. The user will thus have the undiluted experience of carrying out motions at will within the given alternative space, and moving freely and immediately among any objects which have been specified to constitute a "world" or environment within it. When implemented in the "GRAPHING/IMAGING" mode to be described below, this means that the system will be able for example to produce outputs from 4-D imaging systems, or to graph four data streams from physical systems, in real time, permitting the user as well to change parameters of the display during the course of a process, which the system can thus be interactively utilized to control.

Of the main components of the system, the transducer is the most essential part of the new invention, and makes it possible for the display of direct physical images of virtual objects defined in spaces of alternative geometries. The functioning of this system will first be described in broad terms in Section II with respect to 4-D Euclidean geometry and more specifically in Section III related to the specific modes of operation of the system for both 4-D Euclidean geometry and 3-D Lobachevskian geometry. It will be understood that the present invention can be applied to any other alternative geometries, the 4-D Euclidean and 3-D Lobachevskian geometries being described herein as examples, without limiting the invention thereto.

II. Specific Implementation

A. GENERAL FUNCTION OF THE SYSTEM

Figure 10:
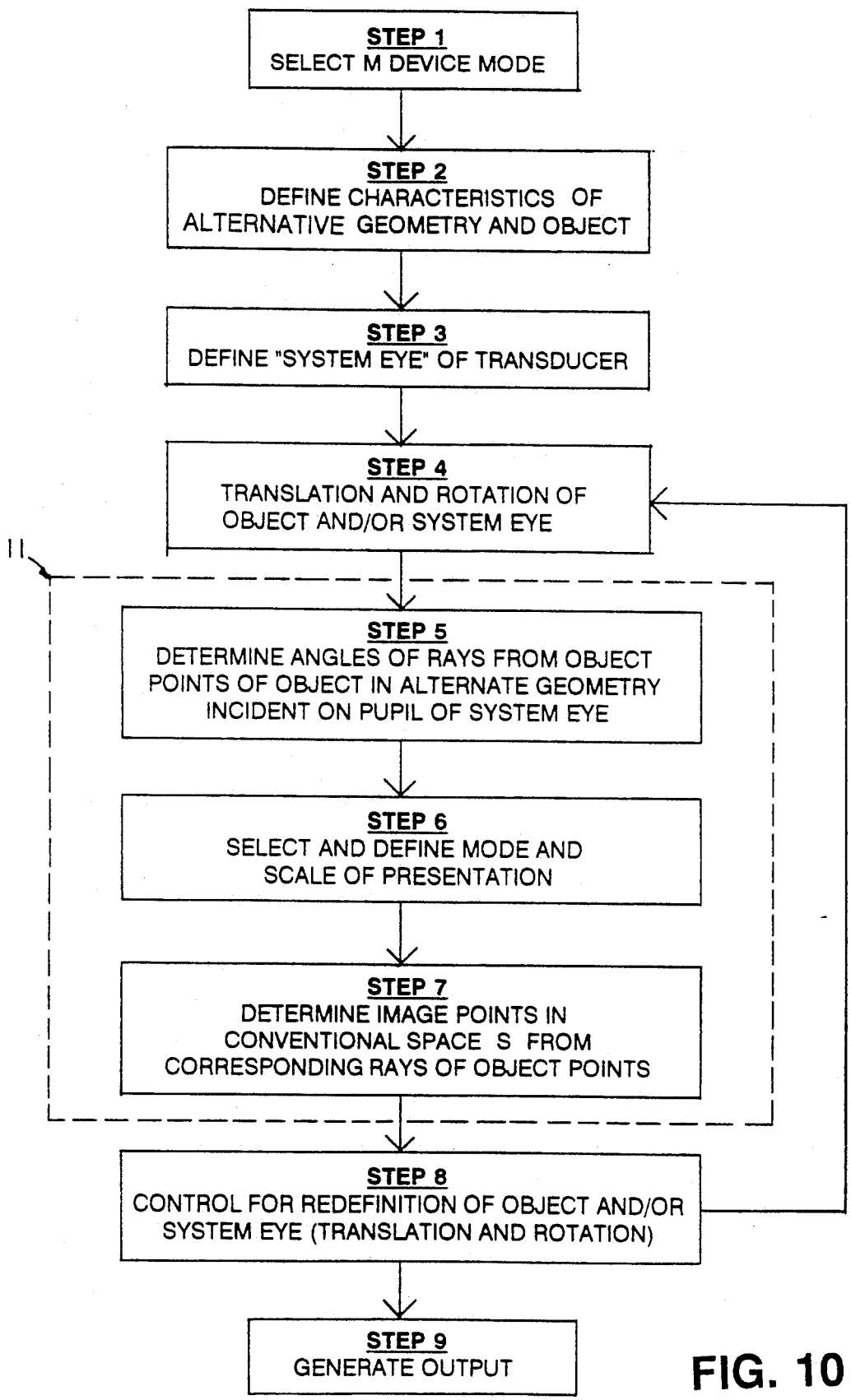
FIG. 10 illustrates in flow diagram form the general step-by-step functions of the system of the present invention.
Figure 10A:
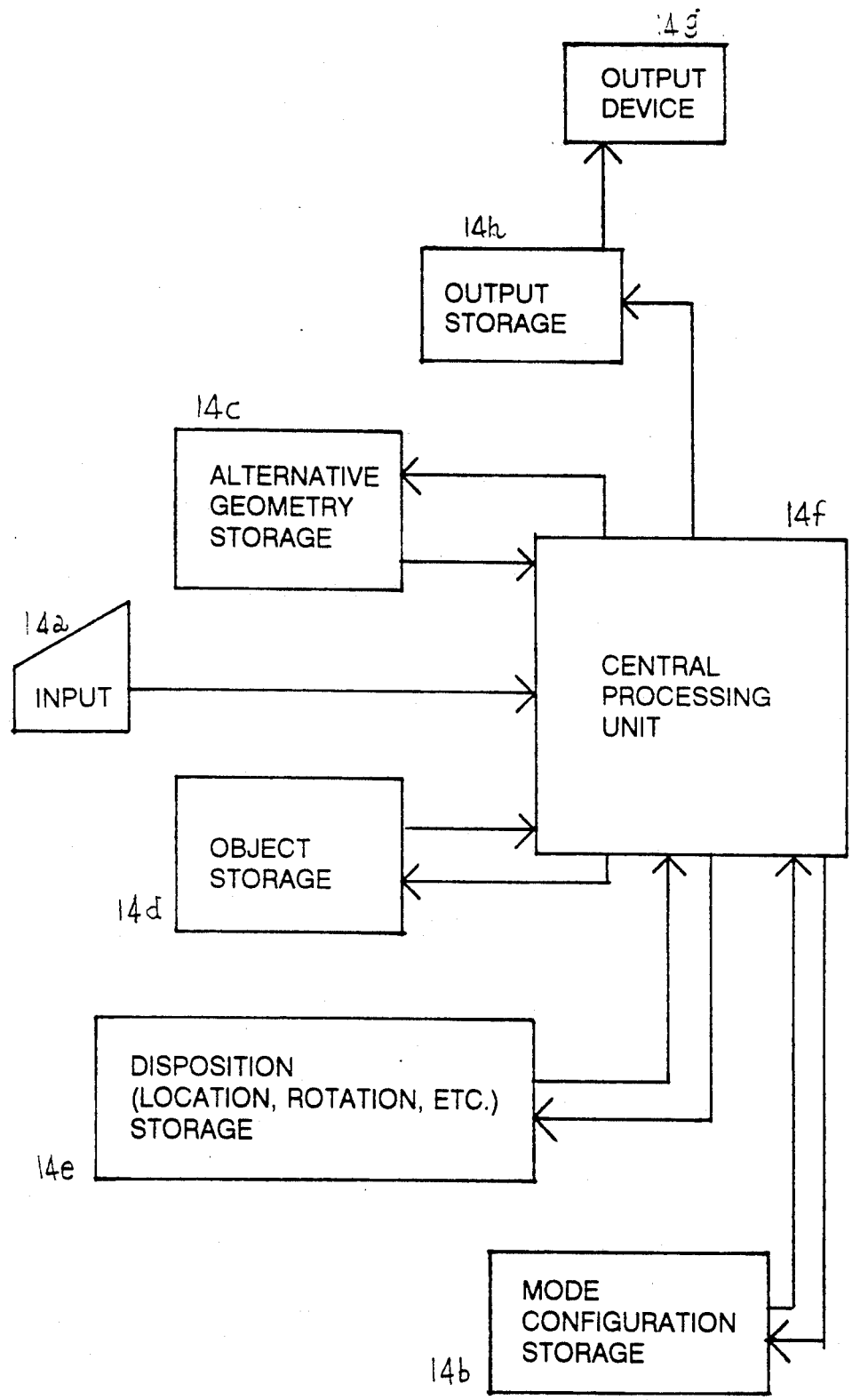
FIG. 10(a) illustrates a device in accordance with the present invention.

Reference is now made to FIGS. 10 and 10(a) in which the steps for a specific implementation of a system and method of imaging objects in alternative geometries, specifically 4-D Euclidean, are described. It will be appreciated that other implementations which employ the system and method of the present invention, can be employed as well, the present implementation being for illustrative purposes.

In this implementation the mode of operation of the system stored in the mode configuration storage 14b is selected in Step 1 using the input device 14a of FIG. 10(a). There can be many modes of operation of the system; the basic mode being that of "VISUALIZATION AND MANIPULATION" which includes "GO/LOOK/TOUCH" and "MOVE/TURN/TOUCH" viewing modes which can also be used with other modes of the system. Other modes of the system can include "GRAPHING/IMAGING" which permits drawing and viewing of graphs in a selected alternative geometry, and the "BLACKBOARD" mode which permits construction of geometric forms and provides appropriate computer-aided design (CAD) tools for that purpose.

The characteristics of the alternative geometry and an object or objects in that geometry are next defined in Step 2 using the input device 14a or selected from the predefined alternative geometry storage 14c and the object storage 14d. Many characteristics of the system can be defined to, in effect, create, manage, and alter a world or environment in the space $S_1$ of the alternative geometry of any desired degree of complexity and detail. An essential characteristic is the selection of an alternative geometry for the particular mode. The process then enters the domain of the selected geometry. Another essential characteristic is the setting up of a coordinate system $\Sigma$ in the alternative geometry. Also, at least one object of any desired form for display must be defined. The definition of the object would include the position and rotation or motion in the alternative geometry. Other objects may be defined as stationary objects, gateways or benchmarks from which to view any other object in the alternative geometry. In full implementation of the present invention for the purpose of producing films or animations, objects representing inanimate or animate forms may be caused to move in any ways and with any designated velocities or interactions, either in response to operator instructions, or as governed by instructions input from any form of memory storage.

Further, additional translation and rotation of the object or objects may be made in Step 4, whether before displaying the objects, after display as part of a feedback, ergonomic or interactive input system, or for preprogrammed continuous display selected from the disposition storage 14e (i.e., location, rotation, etc.). More than one input device or station, utilized by more than one operator, may be attached to give instructions to a single system, by using the methods described here, and making provision for current priorities in system control. Additional characteristics might include, for example, color and animation. The selection of a number of objects along with color and texture of any detail will present a vivid sense of presence in an environment.

Finally for the input system, in Step 3, the system eye of the transducer must be positioned in the 4-D space $S_1$, and also defined, as a 3-D Euclidean space $S_o$ (i.e., conventional space), in such a way as to establish a second, 3-D coordinate system using input device 14a. Thus, the system eye of the transducer, and correspondingly the user's eye, must be positioned in such a way as to locate the pupil and specify the orientation of the visual axis of the system eye within the original 4-D coordinate system. All of the characteristics of the alternative geometry and the object, as well as the translation and rotation of the object and/or system eye in Step 4, may be changing in any manner as a function of the input device 14a or other input devices. Depending on the nature of the geometry and the complexity of the characteristics, extensive determinations may be required for the input system, within the geometry of space $S_1$.

The transformation from $S_1$ to $S_o$ is next accomplished by the transducer 11, implemented, without limitation, as CPU 14f in FIG. 10(a), which in effect operates in both spaces in Step 5 of FIG. 10. In principle, the transducer functions with any geometry in which the problem arises of an articulation between the geometry of the eye's space and another geometry of a different postulate-structure. Illustration of the general function of the system of the present invention in this example is made in terms of Euclidean four-dimensional geometry for space $S_1$.

Within the realm of $S_1$, and operating by the postulates and theorems of that geometry, the transducer processes all input data to determine the angle at which, in that geometry, incoming rays from each object-point of an object would intersect the axes of the system eye at the pupil O, positioned and oriented as specified in Step 3. The transducer then shifts geometrical domains, to determine the light rays for corresponding image points in the conventional space $S_o$ of the system eye, in Steps 6 and 7. Step 6 requires selection of the mode of output for the system and any scaling which must be figured into the computations of the rays from the object in space $S_o$. Such modes may include the use of "wide-angle" or "telescopic" lenses which have certain optical effects. Step 7 is the determination of the actual image points in space $S_o$. Thereafter, apart from the transducer, in Step 9 the CPU 14f and an appropriate output device 14g and output storage 14h of the system carry out the generation of the signals necessary to generate any required screen display or other output. Step 8 provides controls through input device 14a, for example panel controls, for versatile redefinition by the user of the object and/or system eye positions (i.e., translation and/or rotation), as specified in Steps 2 and 3.

Figure 11:
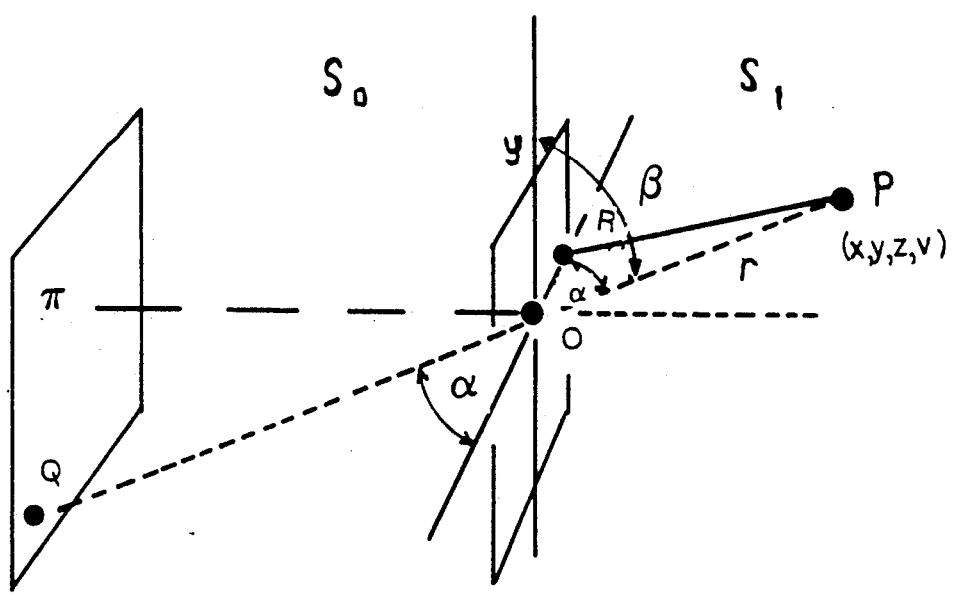
FIG. 11 illustrates the geometrical relationship of a light ray from an object point in 4-D space which is transduced into 3-D space with the system of the present invention.

The ability of the transducer to function in this manner in two mathematically disparate worlds is based on the following geometrical considerations, for which reference is made to FIG. 11. Here O represents the pupil of the eye, and P a point outside the eye's space, in this case assumed to be a point in a four-dimensional space $S_1$. The present invention requires that the transducer determine the angle at which the ray PO meets an axis of the eye's system, for example, the x-axis, with which PO makes the angle $\alpha$. The points O, the x coordinate and P serve to define a plane, which is not in general a plane in $S_o$, yet serves to permit the measurement of the angle $\alpha$, which is all that is required for the present technique. The transducer in accordance with the present invention will thus determine the angles $\alpha$ and $\beta$ at which the ray OQ would meet the axes x and y in accord with the laws of the appropriate geometry, which in the case of this example are quite simple, but in other cases, such as 3-D Lobachevskian geometry, may become complex.

In passing a corresponding ray onto the Output System, the transducer in effect "changes hats," and determines the direction of the output ray under the laws of 3-D Euclidean (i.e., conventional) geometry. Computation of two angles, $\alpha$ as shown with the x-axis, and the corresponding angle $\beta$ with the y-axis, is necessary and sufficient to determine the direction of the output ray OQ in $S_o$.

In the present invention, the system eye is placed directly in the alternative space $S_1$, and the line PO from object-point to pupil of the system eye is a straight line drawn in that space. Since $S_1$ the 4-D Euclidean case assumed for the present example has a Euclidean metric, the distance r from P to O is computed by use of the Pythagorean relation, with the fourth "v" component included, however. It is characteristic of the present invention that the system eye, though itself a three-dimensional system with conventional geometry, is assigned at its pupil a full set of four coordinates in $S_1$, while its three axes may be aligned for convenience with three of the four orthogonal axes of $S_1$. If the coordinates of the pupil are given by ($x_o$, $y_o$, $z_o$, $v_o$), the distance PO from the object to the system eye is given by:

$$r[(x-x_o)^2+(y-y_o)^2+(z-z_o)^2+(v-v_o)^2]^{\frac{1}{2}}.$$

For each point of an object or objects defined in the alternative geometry in Step 2, this quantity r must be determined by the transducer in Step 5. The results are stored in matrix form for access as needed in later steps of the process, as will be described below.

For each object point P, the corresponding angle $\alpha$ is now computed, and similarly stored, through the trigonometric relation:

$$\alpha = \cos^{-1}(x/r),$$

where x is the x-coordinate of P and r is the value just determined. The angle $\beta$, also required, which PO makes with the y-axis, is computed by means of the corresponding relation:

$$\beta = \cos^{-1}(y/r).$$

In the simplest case in Step 6, in which the new ray in the eye's space $S_o$ is projected at the same angle, it becomes necessary only to set $\alpha' = \alpha$ and $\beta' = \beta$, but other functions may be employed, with the effect of adjusting the perception of the space in the manner of an optical lens of any desired kind.

Figure 12:
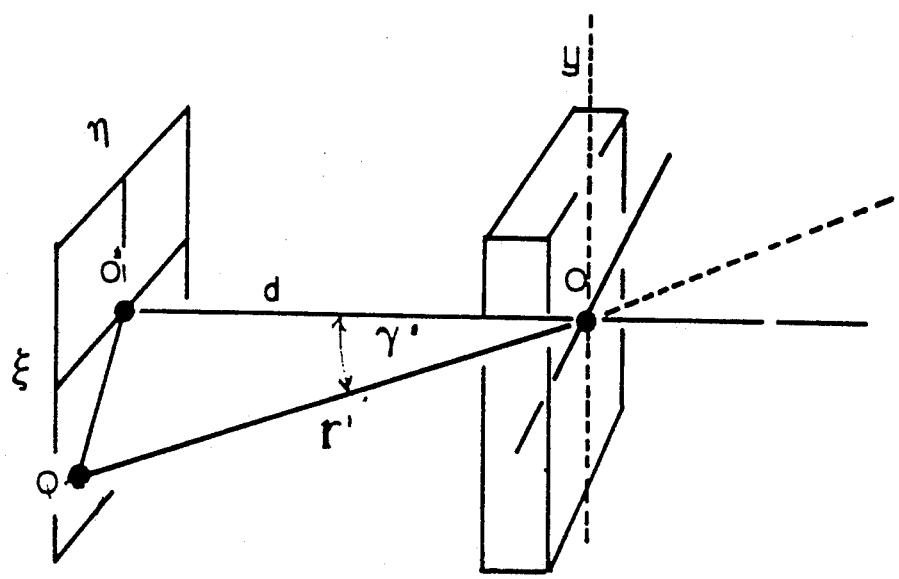
FIGS. 12-14 illustrate the geometrical relationships in 3-D space of a light ray forming an image point on the picture plane used by the transducer of the present invention.

Since $\alpha'$ and $\beta'$ together determine the direction of the ray OQ in $S_o$, when $\alpha'$ and $\beta'$ have been determined, the work of the transducer is complete. It is thereafter a task of the output system, in Steps 7 and 9, to use conventional algebra and trigonometry to determine the display to be presented by means of a given output device, for example, for presentation on a screen representing a picture plane (i.e., the retina of the system eye). The geometry is thus as shown in FIG. 12, yielding the relations:

$$r'd/\cos \gamma', \text{ and}$$

$$\cos \gamma' = [1 - \cos^2 \alpha' - \cos^2 \beta']^{\frac{1}{2}}$$

where r' is a function of a, and the distance d (i.e., the focal length) to the screen.

Figure 13:
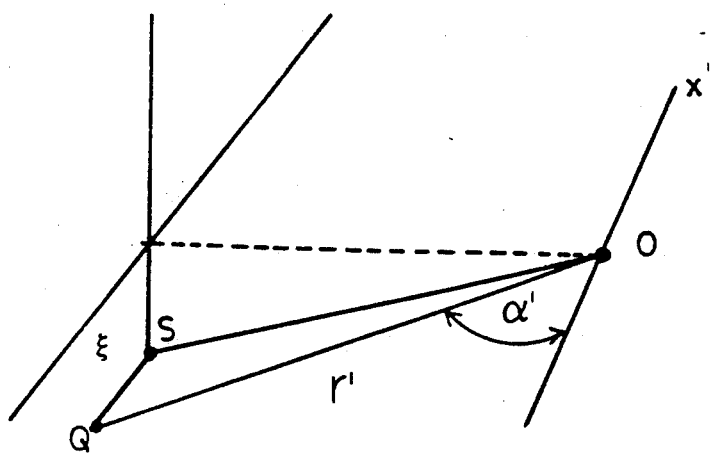
Figure 14:
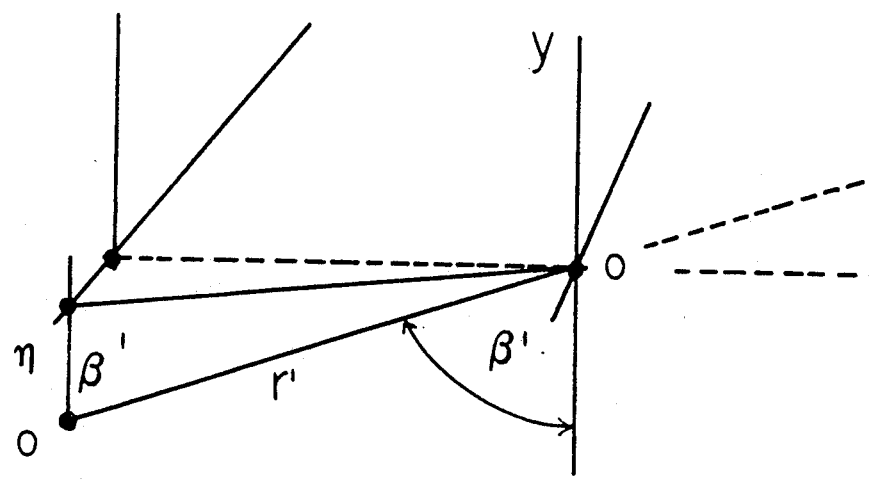

With r' determined, the Output System then determines the output coordinates $\xi$ and $\eta$ in accord with the relations depicted in FIGS. 13 and 14, where:

$$\eta = r' \cos \beta'$$

and the corresponding equation for the x coordinate on the retinal plane, is:

$$\xi = r' \cos \alpha'.$$

III. Operation of the System in Specific Modes

A. INTERACTIVE VISUALIZATION AND MANIPULATION MODE

The system of the present invention may be used for VISUALIZATION AND MANIPULATION in either GO/LOOK/TOUCH or MOVE/TURN/TOUCH viewing modes. In the GO/LOOK/TOUCH mode, motion is imputed to the user who views an object or objects in an alternative geometry, and the direction of view or visual axis is freely selected. Further, the user can translate and/or rotate so as to touch any point in the alternative geometry. The user has the experience of becoming capable of, for example, 4-D Euclidean or 3-D Lobachevskian motions. It is important to emphasize that in this mode the user/viewer is in effect liberated from any confinement to conventional space. It is possible to choose any object or point in an alternative space, and make the necessary virtual motions to look directly at it, go to it, and touch it. These imputed virtual motions will in general be of a highly unfamiliar sort—for example, turning the user's head or limbs not about axes, but about planes of rotation—a motion which may be termed for purposes of this discussion, "planar rotation". In the MOVE/TURN/TOUCH mode it is the object or objects chosen that are visualized and manipulated by moving and turning.

Figure 15:
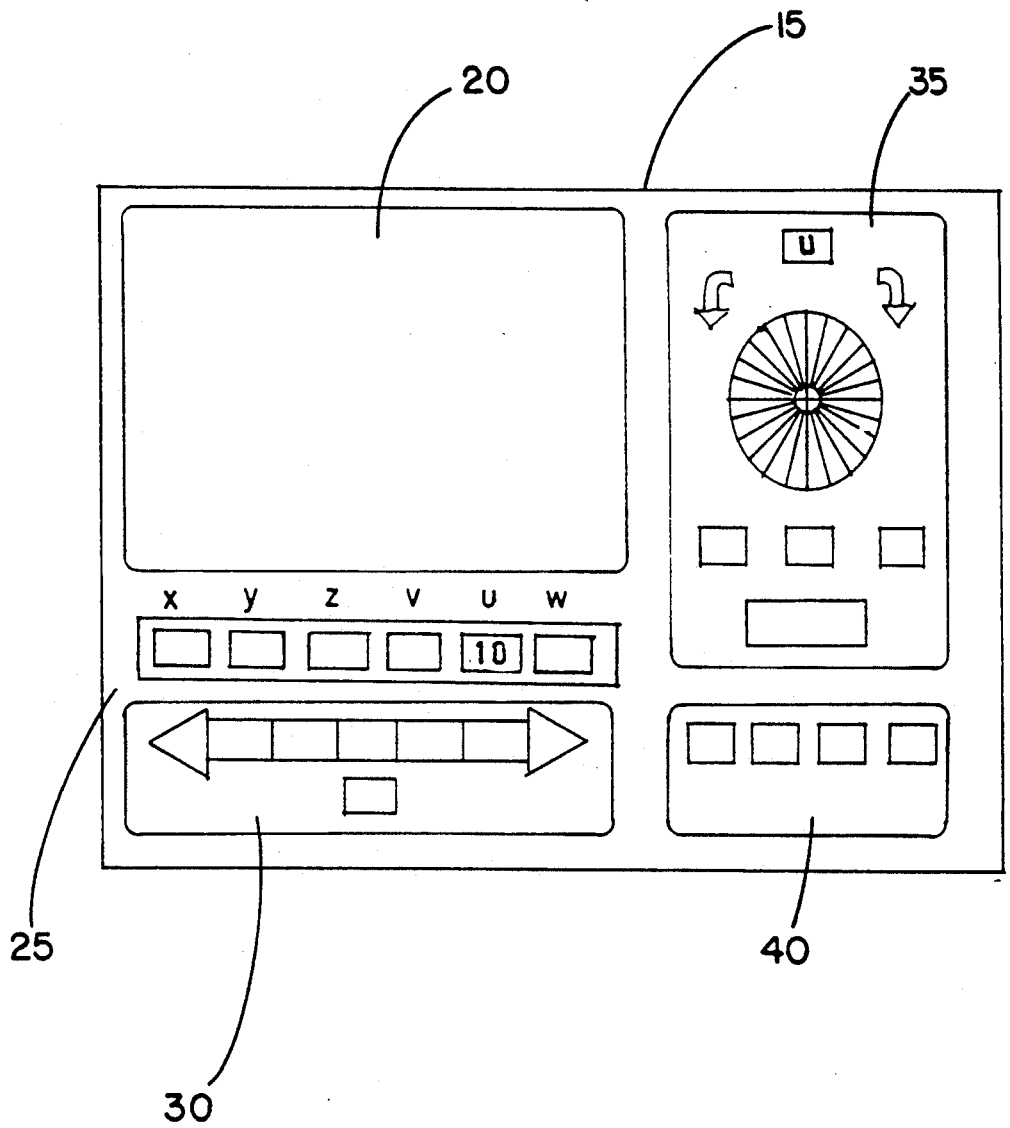
FIG. 15 illustrates the screen display and control panel for the GO/LOOK/TOUCH mode of the INTERACTIVE VISUALIZATION AND MANIPULATION mode of the present invention.

In the example described, control and viewing of the method and system, described above and illustrated in FIGS. 10 and 10(a), are achieved using a computer and by the design of control panels and viewing screens on a conventional computer monitor, one example of which is shown in FIG. 15, for the GO/LOOK/TOUCH mode. In its full implementation, what is here represented on the computer screen may take the form of ergonomic physical controls and readouts apart and/or remote from the computer. The present example of FIG. 15 can be implemented by HYPERSTACK cards used on the Macintosh computer using the MATHEMATICA program, and has been so implemented for convenience and flexibility for development purposes. However, while HYPERCARD and MATHEMATICA or other systems generally available for use on personal computers may be of great value for certain applications, the present invention could also be implemented through the use of more advanced, rapidly interactive systems with ergonomic physical input and output systems, intended by the invention. Active "buttons" on the screen, controlled by touching the screen as shown in FIG. 15, or use of a "mouse," "trackball," keypad or other device, accept the user's commands, and readouts on the screen keep track of current coordinates and orientations. The configuration of the panel can be changed so as to be appropriate for a given geometry or mode of use, such as the INTERACTIVE VISUALIZATION AND MANIPULATION mode, BLACKBOARD mode, and GRAPHING/IMAGING mode.

The modules of the representative control panel of FIG. 15 in the INTERACTIVE VISUALIZATION AND MANIPULATION mode are further identified in FIGS. 16(a)-(d). These modules are described with reference to both the GO/LOOK/TOUCH mode and the alternative MOVE/TURN/TOUCH mode.

The screen module 20, shown in FIG. 15, is a window within a computer monitor screen 15, which represents any screen or any form of display device, including a recording, printout, or the like.

Figure 16A:
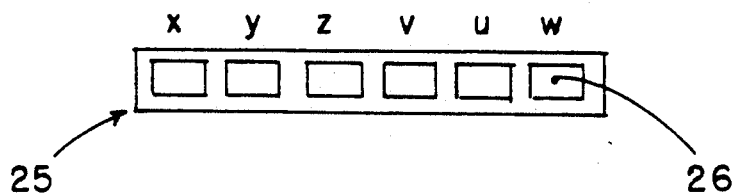
FIGS. 16(a)-16(d) illustrate the functional modules of the control panel used in both the GO/LOOK/TOUCH and MOVE/TURN/TOUCH modes of the INTERACTIVE VISUALIZATION AND MANIPULATION mode of the present invention.

The positional readout module 25, shown in FIGS. 15 and 16(a), includes indicators 26 which report current position and attitude of the system. In the MOVE/TURN/TOUCH mode they report the position and angular attitude of the object being manipulated. From left to right the indicators are of the x, y, z, and v coordinates of the center or reference point in the object; the two remaining indicators show values of u and w, angles of rotation about the yz and xv planes, respectively. In the GO/LOOK/TOUCH mode the same indicators report the corresponding position and orientation of the user with respect to the coordinate system of the alternative geometry, as shown in FIG. 15.

Figure 16B:
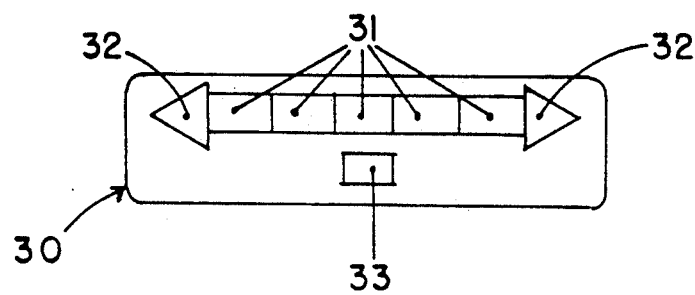

The translation module 30, shown in FIGS. 15 and 16(b), includes any convenient device for managing the position of the object (in the MOVE/TURN/TOUCH mode) or of the operator (in the GO/LOOK/TOUCH mode); here shown as an array of buttons 31 (or equivalently, a slider) to control the notion along one axis, referred either to the coordinate system relative to the system eye, or, at the user's option, to absolute coordinates of the alternative space. In the present example, the operation controls consist of a mouse (or trackball), actuated buttons, or equivalently, touch-screen positions. These represent initial implementations of the invention, which is further intended to provide ergonomically efficient manipulative control over objects (or the operator's position) in the space being investigated. The two extreme buttons 32, serve to interpolate between button positions or (on a double-click of the mouse) to start an automatic continuous run to the corresponding end of the axis. Also in the present example, only one axis is under management at a given time; the current axis is indicated in the readout 33. The choice of axis is readily switched, through the "SELECTION" module.

Figure 16C:
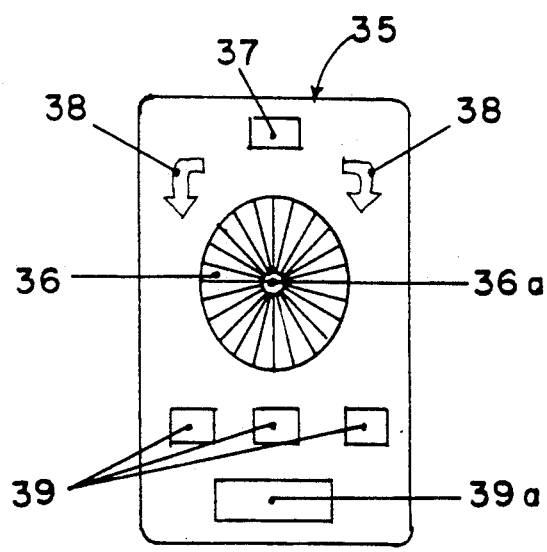

The rotation module 35, shown in FIGS. 15 and 16(c), includes a radially arranged display which consists of active buttons 36. The remaining description will be done assuming that a touch screen, having the format of FIG. 15 is employed, but other means of inputting information into the system, such as a mouse, keyboard, etc. can be employed as well. Each button takes the object (in the MOVE/TURN/TOUCH mode) or the user (in the GO/LOOK/TOUCH mode) by 30 degree steps, to the corresponding angular position in rotation about one coordinate plane. Again, in this implementation only one plane is under management at a given time; the current choice being indicated on the display 37. Buttons 38 permit continuous motion between the 30 degree steps, and when the mouse is double-clicked, set the object (or user) moving in a continuous rotation in the indicated direction. Buttons 39 permit choice of the plane about which rotation is occurring. Button 39a is the HOME button, used for returning the object or the user to the coordinate center or reference position in the alternative geometry. Button 36a is the TOUCH button; it serves to test whether an object visible in output is in fact within "reach," a certain established test interval discussed later with reference to FIG. 17. It is in general possible, by the operation of the present invention and with the proper maneuvers, to go and "touch" any object in the 4-D world of the present example—but not every object which appears to be near is in fact within reach. Successful "touch" can be rewarded by the lighting of button 36a, or implemented otherwise by any alternative signal.

Figure 16D:
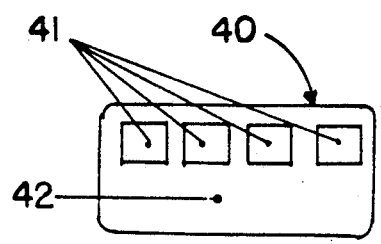

The Control Module 40 shown in FIGS. 15 and 16(d), includes buttons 41 which permit quick choice of an axis along which translation is to be controlled by the translation module 30. Area 42 is available for control buttons ("next screen", "first screen," etc.) of the computer system being used.

1. GO/LOOK/TOUCH mode for 4-D Euclidean Geometry

The following is a detailed example of the GO/LOOK/TOUCH mode in 4-D Euclidean Geometry implemented by the steps of FIG. 10 and in the device illustrated in FIG. 10(a), and specifically implemented as shown in FIG. 15 on the Macintosh computer:

Step 1

For the present example the device mode selected is INTERACTIVE MANIPULATION AND VISUALIZATION and the specific mode selected within it is GO/LOOK/TOUCH. The combination enables a user to move around in space $S_1$ of an alternative geometry.

Step 2

The characteristics of the alternative geometry must be defined. For the present mode the alternative geometry selected is 4-D Euclidean geometry. The coordinate system $\Sigma$ must be defined, which is considered here to consist of the orthogonal coordinates $(x_s, y_s, z_s, v_s)$. Other coordinate systems, such as logarithmic, polar or other non-linear coordinate systems, may be used where convenient. The origin of the coordinate system is $\vec{\Omega}$, which may be defined in the coordinate system as all zeros:

$$\vec{\Omega} = (0,0,0,0)$$

Every object point corresponds to a choice of four coordinates, forming a vector. Along the four coordinate axes are the unit vectors, respectively:

$$\hat{i}, \hat{j}, \hat{k}, \hat{l}$$

where, $$\hat{i} = (1,0,0,0)$$

$$\hat{j} = (0,1,0,0)$$

$$\hat{k} = (0,0,1,0)$$

$$\hat{l} = (0,0,0,1)$$

Within the coordinate system $\Sigma$ of the space $S_1$ of 4-D Euclidean geometry any number of objects can be defined. The objects can be used as streets, buildings, gateways, or benchmarks of any sort. These objects can be viewed with respect to one another. For example, one object may be chosen for interactive manipulation, and the others used as background or benchmarks. Every object be will be interpreted, as here, as geometrical, in terms of its coordinates, together with any accompanying computer instructions as to rendering, color, shading, etc. Images initially produced and/or stored in any form may be inserted into the geometric frame determined by the vectors defined and discussed herein. Two determinations must be made: (1) the internal configuration of the object, and (2) its position and orientation within the coordinate system. In defining an object or objects it is preferable to first define the object or objects by giving them determining points such as vertices with respect to the coordinate system $\Sigma$. The object or objects can then be moved to any coordinate position (x, y, z, v), and oriented by rotating about the coordinate planes as desired.

The objects are defined as a set of vectors in the form of:

$$\vec{q}_{ij} = (q^i_x, q_{ijy}, q_{ijz}, q_{ijv})$$

where the symbol $\vec{q}_{ij}$ represents the j-th point on the i-th object. Thus, an object i can consist of one or more points j.

Step 3

Figure 11A:
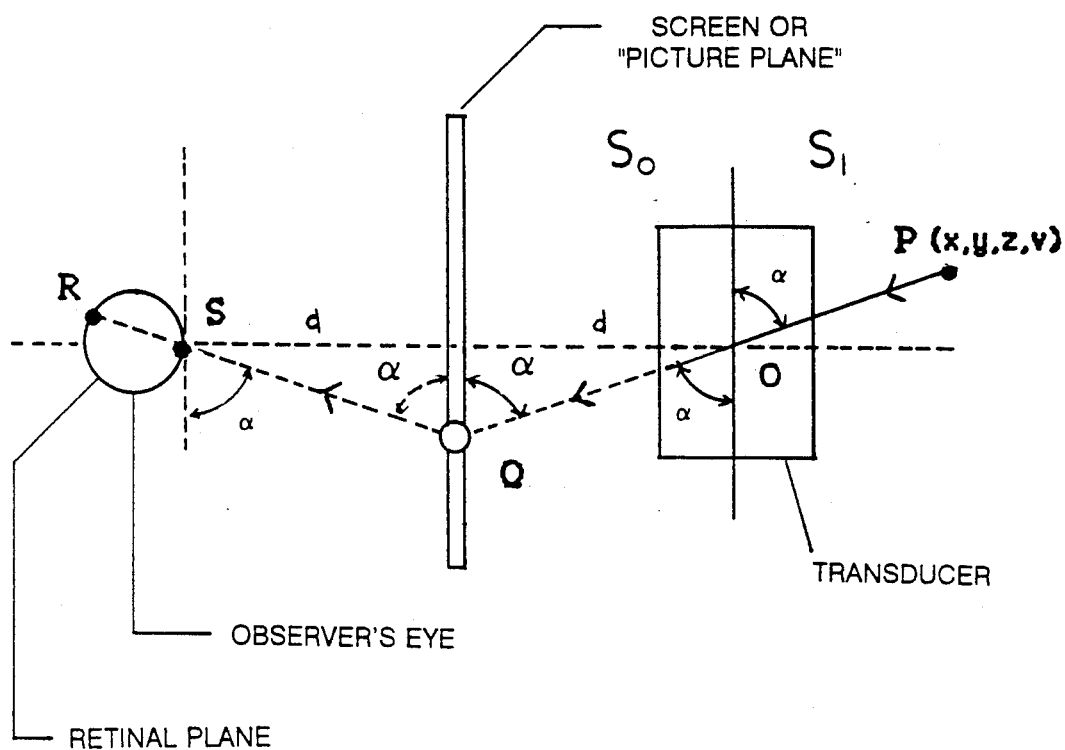
FIG. 11(a) illustrates that the transducer of the present invention has the effect of projecting rays into the user's eye which form on the user's retina a direct image of the object which exists in the alternative space, and that the display screen for presenting the direct image to the human eye "cancels out."

The choice of GO/LOOK/TOUCH requires that a coordinate system in space $S_o$ for the system eye of the transducer be defined. As discussed, the system eye per se constitutes a three dimensional Euclidean space $S_o$, but it is nonetheless located and oriented at all times in the coordinate system $\Sigma$ of the 4-D space $S_1$. Initially, the space $S_o$ of the system eye is located for convenience so that its origin $\bar{O}$ (0, 0, 0) in conventional space, which is the pupil of the system eye, coincides with $\Omega$, while its axes (x, y, z) coincide with the axes $(x_s, y_s, z_s)$ of $\Sigma$. $S_o$ is initially that space within $\Sigma$ for which $v_s = 0$. Within $S_o$, the pupil is the origin $\bar{O}$ and the retina or picture plane is at a distance $d_o$ (i.e., focal length) from $\bar{O}$, with coordinates $\xi, \eta$. Thus, the user is represented by the system eye of the transducer in $\Sigma$. The transducer converts input information to outputs which ultimately lead to perceptions and responses on the part of the user. The monitor screen of the computer shown in FIGS. 15 and 16 acts as a picture plane generating light rays which enter the eye of the user just as the original rays enter the system eye in $\Sigma$. Herein, the term "picture plane" is used to mean a plane on which an image is formed in such a way as to project a similar image onto the retina of the user's eye; it has the ultimate effect of projecting rays into the user's eye which form on the user's retina a direct image of the object which exists in the alternative space, as if the user's eye had been placed directly in that space. Thus, in FIG. 11(a), the ray PO from the external point P makes the angle a with the x-axis of the system eye of the transducer. In the simplest implementation, the new ray OQ makes the same angle, and strikes the screen or picture plane at Q, which becomes, for example, a luminous point on a screen. A ray QS from point Q enters the user's eye at the pupil S, and passes at the same angle a to meet the retina of the user's eye at R. In this way, the screen has a role as intermediary, causing the ray QS to enter the user's eye at the same angle at which the screen received it. Ray QR is equivalent to ray OQ, so that the effect of the system is to make the point O effectively the pupil of the user's eye, or effectively to place the user's eye in the alternative space, where it may directly view point P.

Because of the equality of angles and distances, the screen thus has only an intermediate function, and "cancels out" in the overall process. In this, the present invention differs from other methods which picture four dimensional objects, in which the aim is to produce a picture or projection, such as a stereographic projection, which is not, and does not purport to be, a view which the eye would receive if it were to look directly at the 4-D object.

This is not intended to preclude the possibility that by various arrangements of the picture plane in reference to the user's eye, modifications of this effect may be produced, corresponding, for example, to wide-angle, telescopic, or other optical alterations. In the GO/-LOOK/TOUCH mode of the present example shown in FIG. 15, the control panel is the central working input, where the purpose is to allow the user to move (virtually) about in the space $\Sigma$ in a controlled manner. Since the values entered in Step 3 will be parameters which govern the target location to which the user chooses to GO and LOOK in the space of the alternative geometry, the actual input will preferably be in physical form (joystick, gloves, helmet, etc.)

Step 4

In the GO/LOOK/TOUCH mode the user is able to choose the position of the system eye and the orientation of its visual axis. In effect, controlling the direction in which the user/viewer can LOOK, which is also the "forward" direction in which the user reaches in the TOUCH mode. The position of the system eye (or the object in the MOVE/TURN mode) can be manipulated interactively. The changing of the position of the system eye shall refer to the translation and rotation of the system eye and it visual axis. Translation shall refer to the producing of a change in location, and rotation as affecting the orientation of the visual axis. Defining the location of the system eye may be less crucial in other modes, where a default choice of eye location may often suffice. The system in full, interactive operation operates in a cycle, which begins with an input on the part of the user; the system then presents a corresponding output, and the cycle is completed when the user interactively responds by calling for a new input appropriate to the user's own goals. To start a system cycle the user may move from the original position specified in Step 3 to a designated system eye position by specifying the eye position in translation and rotation. The system eye can in effect GO any where in the 4-D space.

Translation requires defining the new location of the origin $\bar{O}$ for the pupil of system eye in the $\Sigma$ coordinate system of space $S_1$ by the vector $\bar{O}$ where:

$$\vec{O} = (x_o, y_o, z_o, v_o).$$

New determining points are determined for the objects in $\Sigma$ of the 4-D space with respect to the new location in $\Sigma$ of the system eye represented by $\bar{O}$. Also, the origin $\Omega$ of $\Sigma$ and the unit vectors are translated with respect to the translation of the position of the system eye. The new object vectors, unit vectors, and origin of $\Sigma$ are translated from the relations:

$$\vec{q}'_{ij} = \vec{q}_{ij} - \vec{O}$$

$$\hat{i}' = \hat{i} - \vec{O}$$

$$\hat{j}' = \hat{j} - \vec{O}$$

$$\hat{k}' = \hat{k} - \vec{O}$$

$$\hat{l}' = \hat{k} - \vec{O}$$

$$\vec{\Omega}' = \vec{\Omega} - \vec{O}$$

The orientation of the visual axis of the system eye may also be changed by planar rotation. As initially defined in Step 3, the visual axis of the system eye remains parallel to itself, and is in a sense looking at the same point at infinity, down the system eye's z axis. To re-orient the system eye requires rotation in the fourth dimension, which is rotation about a plane as opposed to an axis. A set of rotations used for the present example are designated as follows:

through angle s about the yv plane,
through angle t about the xy plane,
through angle u about the yz plane, and
through angle w about the xv plane.

Rotations are governed by corresponding matrices, extensions of the familiar rigid rotation in 3-D. These may be referred to as $T_s$, $T_t$, $T_u$, $T_w$. For example, for the case of rotation through the angle s about the yv coordinate plane the required computation is:

$$\vec{q}''_{ij} = T_s \cdot \vec{q}'_{ij}$$

where
$q'_{ij}$ is the vector defining the point after translation but before rotation,
$\vec{q}''_{ij}$ is the new vector in the rotated coordinates,
and $T_s$ is the matrix representing rigid rotation about s, namely:

$$T_s = \begin{matrix} \cos s_o & 0 & \sin s_o & 0 \\ 0 & 1 & 0 & 0 \\ -\sin s_o & 0 & \cos s_o & 0 \\ 0 & 0 & 0 & 1 \end{matrix}$$

Had the rotation been about u instead of s then the rotation matrix would have been:

$$T_u = \begin{matrix} \cos u & 0 & 0 & \sin u \\ 0 & 1 & 0 & 0 \\ 0 & 0 & 1 & 0 \\ -\sin u & 0 & 0 & \cos u \end{matrix}$$

The unit vectors and the origin $\Omega$ of $\Sigma$ must also be rotated as follows:

$$\hat{i}'' = T_s \hat{i}'.$$

$$\hat{j}'' = T_s \hat{j}',$$

$$\hat{k}'' = T_s \hat{k}' \text{ and}$$

$$\hat{l}'' = T_s \hat{l}'.$$

$$\vec{\Omega}'' = T_s \vec{\Omega}'$$

At this point, the notion has been imputed to the system eye to bring it to the desired position, and the vectors $\vec{q}''_{ij}$ for the object or objects, unit vectors, and the origin $\Omega$ of $\Sigma$ have all been redefined in relation to $S_o$. However, the resulting orientation of the system eye $S_o$ will need to be designated in terms of the angular positions of its axes, with respect to $\Sigma$. To determine the resulting orientation of $S_o$ requires translating back the unit vectors, which have already been rotated to their new positions, to the origin of $S_o$. This is done by subtracting from their coordinates those of the origin of the coordinate system $\Sigma$ as follows:

$$\hat{i}''' = \hat{i}'' - \vec{\Omega}'',$$

$$\hat{j}''' = \hat{j}'' - \vec{\Omega}'',$$

$$\hat{k}''' = \hat{k}'' - \vec{\Omega}'' \text{ and}$$

$$\hat{i}''' = \hat{i}'' - \vec{\Omega}''.$$

The resulting coordinates of the unit vectors will be its projections on the respective axes of $S_o$, and these will be the direction-cosines of the angles which determine the orientation of $S_o$. The visual axis is the z-axis in the system eye's space $S_o$. Thus, to determine the angles with respect to the visual z-axis we use the z-component of each of the unit vectors and derive from the direction cosines the following relationships from which to determine the angles $\alpha$, $\beta$, $\gamma$, $\delta$:

$$\alpha = \cos^{-1} \hat{i}'''_z,$$

$$\beta = \cos^{-1} \hat{j}'''_z,$$

$$\gamma = \cos^{-1} \hat{k}'''_z, \text{ and}$$

$$\delta = \cos^{-1} \hat{l}'''_z.$$

Thus, the resulting orientation of the visual axis of the system eye with respect to $\Sigma$ is represented by the angles $\alpha$, $\beta$, $\gamma$, $\delta$ and the position of $S_o$ in $\Sigma$ by $x_o$, $y_o$, $z_o$, $v_o$.

Step 5

Once the new coordinates of the system eye, the orientation of its visual axis, and the coordinates of the object points have been computed the system of the present invention enters the transducing function in Step 5. A light ray $\vec{q}_{ij}\vec{O}$ is imagined projected from $\vec{q}_{ij}$ to the pupil $\vec{O}$ of the system eye. A plane is envisioned which contains that ray and the x-axis of the eye's system as shown in FIG. 11; since $\vec{q}_{ij}$ does not in general lie in the eye's three-dimensional space $S_o$, neither will this plane, but that does not matter with the use of the transducer.

The angle that the light ray makes with the x and y axis must be computed. To do so, first the distance $r_{ij}$ from the $\vec{q}_{ij}$ to $\vec{O}$ must be computed from the relation:

$$r_{ij} = (\vec{q}''^2_{ijx} + \vec{q}''^2_{ijy} + \vec{q}''^2_{ijz} + \vec{q}''^2_{ijv})^{\frac{1}{2}}.$$

It is important to recognize that $r_{ij}$ is the actual distance of $\vec{q}_{ij}$ from the system eye, so that perspective effects, stereopticon measures and even audio effects if used arise from the object's true distance from the operator, in four-dimensional space.

Next, the direction cosine for each incident light ray is computed from the following relations:

$$\lambda_{ij} = \vec{q}''_{ijx}/r_{ij}$$

$$\mu_{ij} = \vec{q}''_{ijy}/r_{ij}$$

From the preceding computations the angles $\alpha_{ij}$ and $\beta_{ij}$ of incidence, with the x and y axis of the system eye, for the light rays from each object point are computed from the following relations:

$$\alpha_{ij} = \cos^{-1} \lambda_{ij}$$

$$\beta_{ij} = \cos^{-1} \mu_{ij}$$

Thus, the angles $\alpha_{ij}$ and $\beta_{ij}$ exist at the intersection of $\vec{q}_{ij}\vec{O}$ and the eye's x-axis and y-axis, respectively, for each object point.

Step 5 has been completed when these two angles have been computed for all points $\vec{q}_{ij}$. Note that the incident angle $\gamma_{ij}$ with the system eye's z-axis is not used.

The more the system is implemented with a high degree of computing speed, using the panel controls of the computer of Step 8 for continuous feedback to Step 4, the more rapidly the loop between Steps 8 and 4 can be closed. Thus, the operator will sense the reality of motion within four-dimensional space more immediately.

Steps 6 and 7

With the angles of the incoming rays of each object point determined, Step 5 is completed for input to the transducer. The transducer is to generate image points $Q_{ij}$ having coordinates $\eta$ on the retina or picture plane of the system eye for each object point $\vec{q}_{ij}$. The transducer will use the incident angles $\alpha_{ij}$ and $\beta_{ij}$ for each object point $\vec{q}_{ij}$ to determine a new light ray in the space $S_o$ of the system eye f or visualization by a user. Step 6 requires selection of a mode of presentation and scaling. The light rays corresponding to the object points can be projected in any mode by adjusting the perception of the system eye of space $S_o$ in any manner, either by altering the determination of the output ray to produce the effect of optical adjustments such as telescopic or wide-angled viewing, or by using an optical lens of any desired kind. Although the mode of utilization of the system output may have important consequences for actual computation in Step 7, it is assumed for the present example that the output will be used for ultimate presentation to some form of projector or screen, and that the choice in Step 6 will be one of scale. As such, the new rays are projected in the space $S_o$ of the system eye at the same angles. Thus, it is only necessary to take $\alpha'_{ij}$ and $\beta'_{ij}$ as the angles of projection in the system eyes space $S_o$ and set $\alpha'_{ij} = \alpha_{ij}$ and $\beta'_{ij} = \beta_{ij}$. However, any other mode or optical effect may be produced if desired. If optical effects such as those due to a wide-angle or telescopic lens were taken into account then it would require adjusting the function from equality to $\alpha'_{ij} = f(\alpha_{ij})$, where $f(\alpha_{ij})$ is a function taking into account those effects.

In the simplest case being followed here the output of the system will be to a human eye by way of the monitor screen of a computer, which as discussed earlier represents the retina of the system eye. To project onto the retina of the user's eye an image which reproduces that on the screen, the focal length $d_o$ of the system eye must be set equal to the reading distance at which the user will view the monitor which is normally approximately 20 inches in the user's world. Thus, in the 4-D space of the present example it may conveniently be taken as a natural unit length.

Next in Step 7, the light rays in space $S_o$ of the object points $\vec{q}_{ij}$ are determined to create corresponding image points $Q_{ij}$ on the retina or picture plane of the system eye. First, the angle $\gamma'_{ij}$ which each of the newly generated rays makes with the z-axis in $S_o$ is determined. It is important to note, as essential to the transducer, that the angle $\gamma'_{ij}$ with the z-axis in $S_o$ is computed according to the postulates and theorems of 3-D Euclidean geometry. Even where, as in the present example, the angles $\alpha'_{ij}$ and $\beta'_{ij}$ are taken as equal to $\alpha_{ij}$ and $\beta_{ij}$ respectively, that is not the case with the angle $\gamma'_{ij}$. The angle $\gamma'_{ij}$ is instead determined from the following relation:

$$\gamma'_{ij} = \cos^{-1} [1 - \lambda^2_{ij} - \mu^2_{ij}]^{\frac{1}{2}}.$$

Next, the distance in $S_o$ for each light ray of an object point $\bar{q}_{ij}$ is determined. The distance is represented by $R_{ij}$ and the relation:

$$R_{ij} = d_o / \cos \gamma'_{ij}$$

Finally, the image points are determined on the picture plane or retina of the system eye in $S_o$. Each image point represents a corresponding transduced object point and is represented by the coordinates $\xi$, $\eta$. The coordinates for each image point are determined from the relations:

$$\xi_{ij} = R_{ij} \cos \alpha'_{ij}$$

$$\eta_{ij} = R_{ij} \cos \beta'_{ij}.$$

Step 8

This step sets the output controls for display and controls any further interactive manipulation of the object displayed. Any given device may have any number of alternative modes of assembling and utilizing the image points ($\xi_{ij}$, $\eta_{ij}$). In the VISUALIZATION AND MANIPULATION mode of the present example the output is to a monitor screen of a computer. Thus, assembled and transduced image points would pass to the output step, Step 9.

The user's impression in setting the controls of the panel of the computer described earlier in the GO/LOOK/TOUCH mode is one of adjusting a display—that is, looking at the object or objects in a certain readily adjustable way (GO and LOOK). Actually, any change in the display in that mode is in fact sent back to Step 4, to generate an entirely new set of outputs. It is in this sense that the system is fully interactive.

The TOUCH command (button 36a, FIG. 16(c)), controlled in Step 8, allows a user to virtually touch a point or object in an alternative geometry, such as 4-D Euclidean space. The object can be touched only if it is in the same space $S_o$ so as the user and is within a predetermined reaching distance so that a user can step forward and touch the object. To apply the touch test in the case of an object in 4-D space on the visual axis, two criteria are employed:

(1) the distance $r_{ij}$ for the object point or points $\bar{q}_{ij}$ to be touched must be within a preset maximum value, representing the "reaching" distance; and (2) the fourth coordinate or v coordinate of each object point $\bar{q}_{ij}$ must be zero, insuring that the object point lies in the system eye's space $S_o$ and not at a distance orthogonal to it.

If the requirements are met then the object may be touched using the TOUCH command.

Figure 17:
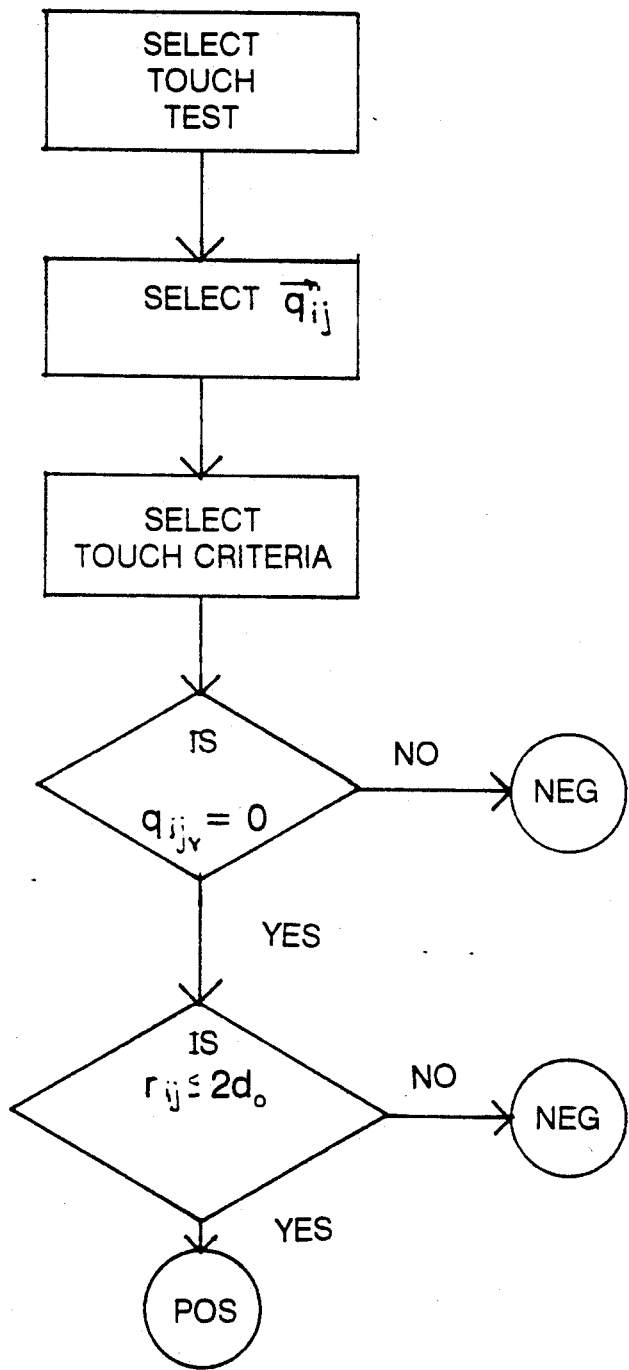
FIG. 17 illustrates the flow diagram for the TOUCH test of the GO/LOOK/TOUCH mode of the present invention.

A more detailed description of this test, as applied in the present example, is shown in the flow diagram of FIG. 17. In FIG. 17 the TOUCH test is selected. Next, the object points $\bar{q}_{ij}$ to test are selected. The TOUCH criteria are selected; the maximum test distance ($d_t$) for reaching to TOUCH the object is defined by $d_t < 2d_o$, and the point or points $\bar{q}_{ij}$ must be present in the space $S_o$ of the system eye. Once the criteria are input then each of the test requirements are checked. If the v coordinate of $\bar{q}_{ij}$ is O, and $r_{ij}$ is less than or equal to $2d_o$, then a positive test results signifying that the object is in $S_o$ and within reach for touching. However, if either of those requirements are not met, then the result is negative and the object cannot be touched. Thus, the system eye and its visual axis must be manipulated by the control panel of Step 8 to meet the TOUCH requirements.

Step 9

A processing device, such as the computer discussed above, used in connection with the present invention in step 8 will assemble the image points $Q_{ij}$ for output to an output in Step 9, which in this example is a computer monitor. The assembled image points will represent the object or objects as they appear in 4-D Euclidean space $S_1$. The output can be configured for use with any display, whether it be video tape, film, or other types of conventional recording equipment, or an input to computerized drawing or CAD systems, any other form of further computer processing or utilization, including but not limited to film or video tape animation or editing equipment. For any of these displays, however, the user is represented by the system eye of the transducer, which converts input information to output leading ultimately to perceptions and responses on the part of the user. The output could be printed graphs which are converted graphically to pictures. In the present example, the computer monitor is the output device which acts as a picture plane receiving and displaying rays which enter the user's eyes just as the original rays enter the system eye in the alternative space $S_1$. As discussed in Step 6, scales are under the user's control, but in normal mode the angles of entry in the system eye and the user's eye will be equal. Thus, the system ends up delivering to the operators eye, as a retinal image, exactly what the system eye itself sees. In this sense, the overall system of the present invention functions as a computerized optical instrument for bringing the light rays of objects from the spaces of alternative geometries and presenting them ultimately as an image on the retina of the human eye.

1a. Visual Example of GO/LOOK/TOUCH mode in 4-D Euclidean Geometry

In the following visual example, the device mode (Step 1) has been selected as GO/LOOK/TOUCH and the alternative geometry as 4-D Euclidean. A set of objects in space $S_1$ must be defined (Step 2). The objects can be 3-D but reside in the space of 4-D Euclidean geometry. The generation of the rays in 3-D Euclidean space discussed above in Steps 1 through 9 are used to determine what would appear on the retina of the system eye of the transducer. A gate-way of some sort is set up at the origin $\Omega$ of the coordinate system $\Sigma$ of the four-dimensional space $S_1$. The gateway is called in this example "The Arch at the Origin." Two benchmarks are then set up to mark the course of two of the coordinate directions—one a marker at a remote distance along the z-axis (the visual axis), and the other at an equal distance along the v-axis extending into the fourth dimension. The two markers are called respectively the "Z-obelisk" and the "V-obelisk." The distance $d_o$ from pupil to retina of the system eye is taken as a kind of natural unit. Initially, the two obelisks are at 1000 such units from the origin along their respective axes. If the retina of the system eye is to relay its image in turn to an observing human eye at equal angles and at normal viewing distance, then the natural unit for $d_o$ will be the viewing distance of about 20 inches, and the obelisks will be at about a third of a mile from the Arch. The bases of these three components of this virtual world will center then at coordinates in $\Sigma$ as follows:

The Arch at the Origin: (0, 0, 0, 0)
The Z-obelisk: (0, 0, 1000, 0)
The V-obelisk: (0, 0, 0, 1000).

Figure 18A:
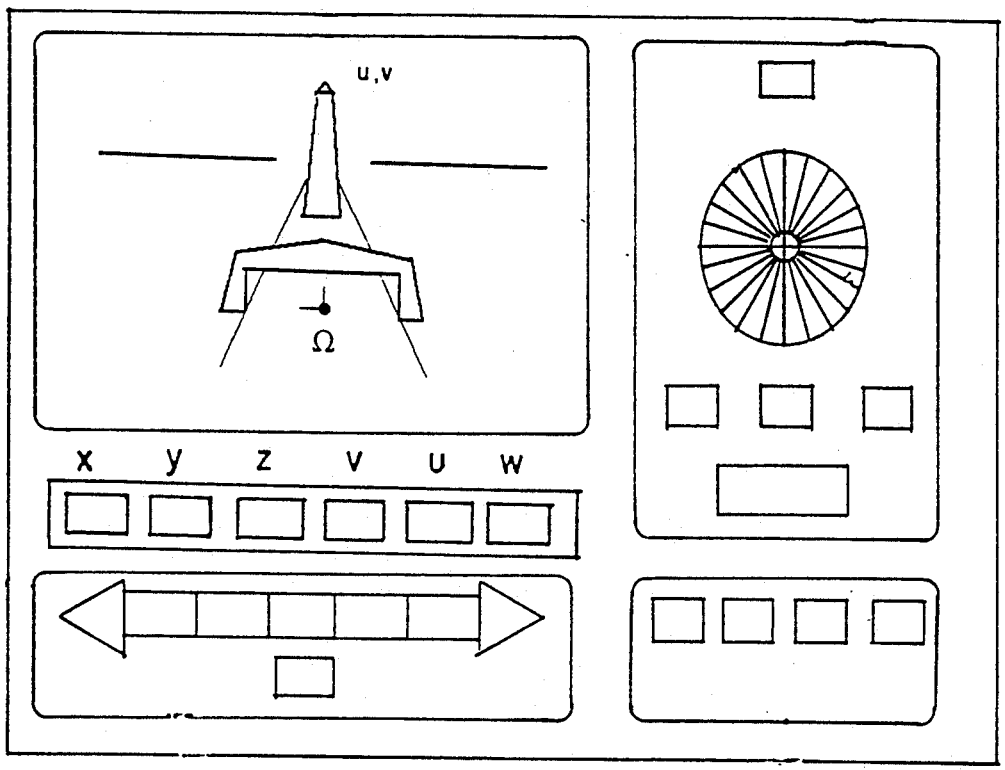
FIGS. 18(a)-18(d) illustrate the screen displays and panel controls for an example of the GO/LOOK/TOUCH mode in the INTERACTIVE VISUALIZATION AND MANIPULATION mode of the present invention.

The choice of where to view the objects is arbitrary. To gain a little perspective, the user is placed back a distance of 300-units on the z-axis, and at a height of 10 units. As such, the user's eye, represented by the system eye, will be located in $\Sigma$ at coordinates (0, 10, −300, 0). Location of the objects in the fourth dimension, as shown in FIG. 18(a) is determined using trigonometry and the Pythagorean theorem, extended to include the fourth coordinate objects in the fourth dimension.

Beyond the Arch and the origin of coordinate system $\Sigma$ of the space $S_1$ the user can see the first image from the fourth dimension, which is the V-obelisk. The Z-obelisk lies behind it, and at a somewhat greater distance. The user cannot see the Z-obelisk because the images double up on the user's retina. Since the rays arriving from the V-obelisk have no x-component, the image points generated by the transducer to represent them will fall directly along the visual axis. The visual axis acts as both a (real) z-axis and as (surrogate) v-axis, and the images from the two superimpose on the retina. The user will have to learn to sort out the complexity of four dimensions crowded into two.

Figure 18B:
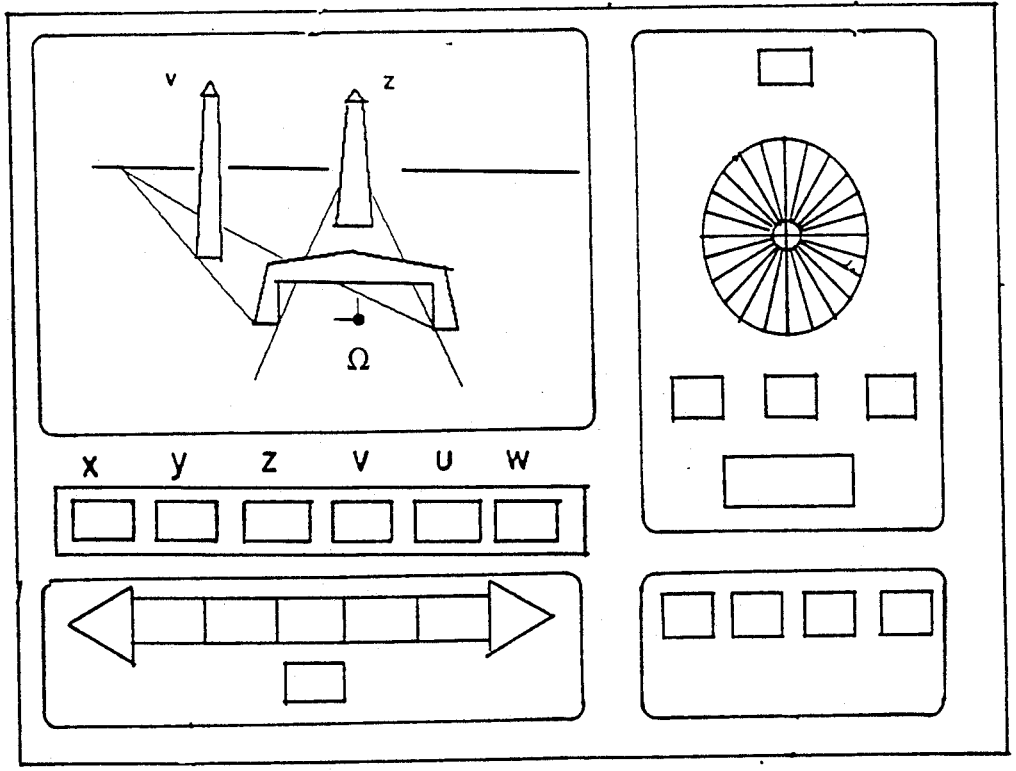

The least turn of the visual axis will serve to separate one axis from the other. FIG. 18(b) shows the result of a four degree rotation, though not a "rotation" in the ordinary sense—not, that is, an axial rotation the user is accustomed to, but one about a plane. Here the rotation has been about the yv plane, meaning that points in that plane (i.e., lacking x or z coordinates) stand fast, just as points on the axis do in 3-D rotations, while the remaining points carry out the same rigid rotation they would have in three dimensions.

Now the v-axis has manifested itself to the user. Next, the user can make virtual motions in the fourth dimension. In this example, the user will move directly into the fourth dimension, down the v-axis, and actually touch the V-obelisk itself.

The user will go to a point on the v-axis using the controls of Step 8. The system of the present invention will place the position of the system eye where the user chooses. For this example, a point is selected just far enough away from the obelisk to leave enough scope to survey the scene: a point at 900 units into the fourth dimension, just 100 units from the V-obelisk. The user next will set the x and z dimensions to zero, and leave just enough y value to place the system eye, in effect the user's eye, at a reasonable eye-level. This translation is shown in FIG. 18(c).

Figure 18C:
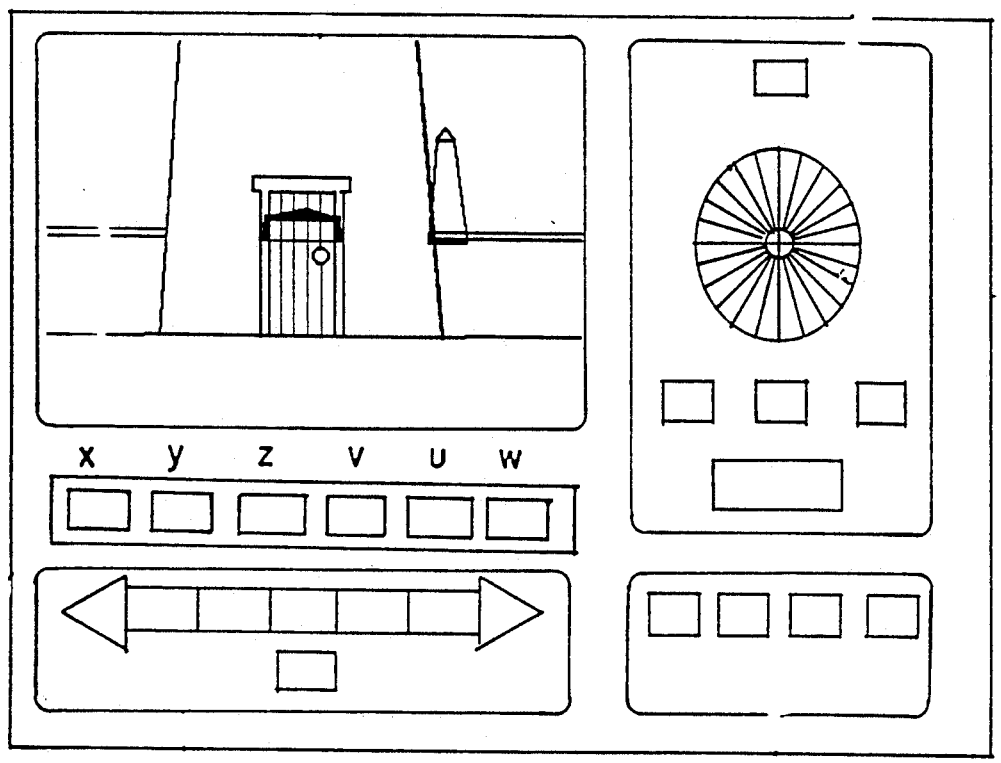
Figure 18D:
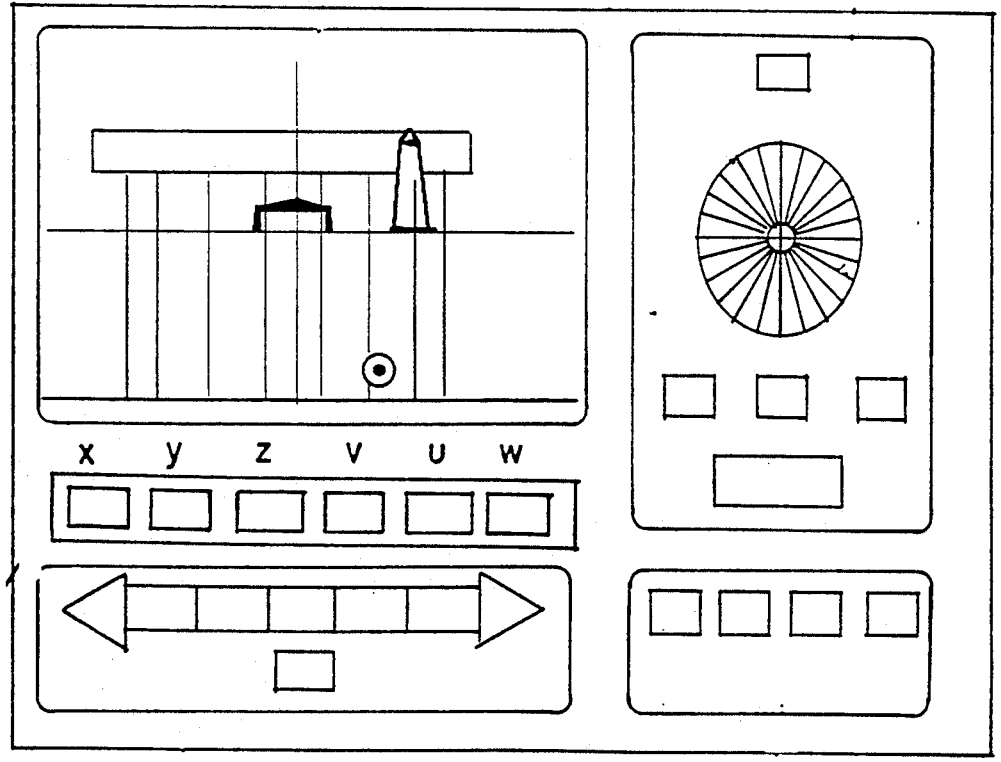

The obelisk stands before the user in FIG. 18(c), and the user now sees the obelisk including a doorway with a handle. The user will seek to advance and touch the doorknob. With the confusion of vision to which the user is becoming accustomed, the Arch at the Origin is now seen at a considerable distance, 900 units in the background, while the once-familiar z-axis veers off toward its obelisk at the four degree angle the user in this example had not removed. The user will next attempt to step forward and touch the doorknob. In this example, 25 units will be close enough to met the requirements of the TOUCH test, as shown in FIG. 18(d).

The user makes the necessary movements of the system eye to that position. To TOUCH the doorknob, the user must in fact meet two tests:

(1) the user must be within the test distance of the obelisk, which is set at twenty-five units, and
(2) the user must be in the same space as the object which is to be touched: thus, the object must lie within the system eye's own space $S_o$.

In this case, the computed distance to the doorknob is 20.0432 units (more than 20, because the user's eye via the system eye is higher than the doorknob, but well within the test limit of 25 units. Thus, the first criterion is met.

The system must still determine whether the doorknob is within the user's grasp. This is determined by generating a vector which measures the object's relation to the system eye's coordinate system $S_o$ [is looked at]. Here the vector is: (0.8231, −1.01, 0, 20). The first two coordinates—those of the 3-D space—are understandable: it is a little to the right (not being on the centerline), and down a bit from eye level. But the fact that it includes a v-component of 20 units reveals that it is not actually on the visual axis of the user (which would be the Z-axis), but still remote from the user—still in another dimension, outside the space $S_o$. The rays the user is seeing are the work of the transducer and the doorway is really a mirage.

The difficulty is that the user is, in effect, still in a space orthogonal to the v-axis. The user is standing at a point on the fourth axis, but has not yet turned toward the object—"forward" for the user remains a direction at right-angles to the axis the user stands on. If the user attempts to step "forward" to touch the doorknob, the user will actually be walking at right-angles to it. To overcome this obstacle, the user must rotate about a plane which will serve to exchange the z-axis (the user's old forward direction) for the v-axis, to be the new "forward" direction toward the obelisk. Since the user has to exchange old z for new v, then x and y must stand fast: and the rotation must be about the xy plane. Again, this is generated using the techniques discussed above in Steps 1-9 of Section III.A.1.

The picture of the fourth dimension, in which the user has entered, is shown in FIG. 18(d). This is the same figure which the user saw before when the user first attempted to step forward. Nothing appears to have changed by the 90 degree planar rotation, which has substituted the fourth dimension for the third. However, where before the user saw a mirage of the fourth dimension, while the direction forward took the user back into the third dimension, the user sees the obelisk at its true location. The Arch and the z-axis are now the mirage, while the V-obelisk, its door, and the doorknob are all in the space $S_o$.

Translating forward now takes the user directly down the fourth axis, bringing the user to the door, so that the user can TOUCH the doorknob of the obelisk. To confirm this, the vector for the doorknob is looked at. Where before the user found the vector (0.8231, −1.01, 0, 20), the user now finds the vector (0.8231, −1.01, 20, 0). The third and fourth components have indeed exchanged places. The interval of 20 units lying along the axis between the user and the doorway before were actually still in the fourth dimension, at right-angles to the user's visual axis and forward direction. Now with the planar rotation of the system eye, the object lies directly in front of the user.

The doorknob is an object in the coordinate system $\Sigma$ of the four-dimensional space $S_1$. No place in all of $S_o$ is closed to the user. A single image on the retina is not the whole measure of the user's spatial perception. The user can use these a succession of these compacted 2-D images as collectively leading to valid perceptions which enable the user by orderly processes to GO where the user desires, LOOK in any direction and enter the space of any object. As the user becomes more experienced with the present invention, the user would learn to make the 90 degree planar turn at the outset, thereafter proceeding steadily and confidently into the fourth dimension.

2. GO/LOOK/TOUCH mode in 3-D Lobachevskian Geometry

Figure 19A:
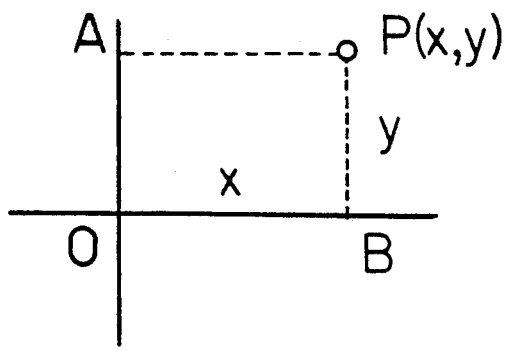
FIGS. 19(a)-19(c) illustrate the geometrical relationship of a light ray from an object point in 3-D Lobachevskian space which is transduced into 3-D space with the system of the present invention.

If the choice is made for Lobachevskian (hyperbolic) geometry in the GO/LOOK/TOUCH mode, the flow diagram of FIG. 10 is the same but the generation of rays of Step 5 is quite different in detail. The object will again be defined as a vector in accord with the instructions and interactive manipulations of the user. However, to get from the object-vector $\vec{q}_{ij}$ to the incident angles $\alpha_{ij}$ and $\beta_{ij}$ on the system eye's pupil $\bar{O}$ is a much more complex task. In Step 2 the characteristics of the alternative geometry and the object or objects must be defined in a hyperbolic coordinate system $\Lambda$. The difference in the transducer is only in Step 5 which determines the angles of incidence of the light rays from the object; the lines and angles must now be determined within the alternative space $S_1$ of 3-D Lobachevskian geometry, and hence must operate by the rules of hyperbolic trigonometry (see for example, Wolfe, H. E., *Introduction to Non-Euclidean Geometry* (New York 1954), Chapter V). A decision must first be made concerning the coordinate system to be used for Lobachevskian geometry. It is convenient to choose the system for the present example "Lobachevskian coordinates," in which the point $P(x,y)$ is located as in FIG. 19(a) (Wolfe, p. 138). It is important to observe that the distance AP in FIG. 19(a) is not equal to the distance OB, which we have taken as the x-coordinate of P.

Figure 19B:
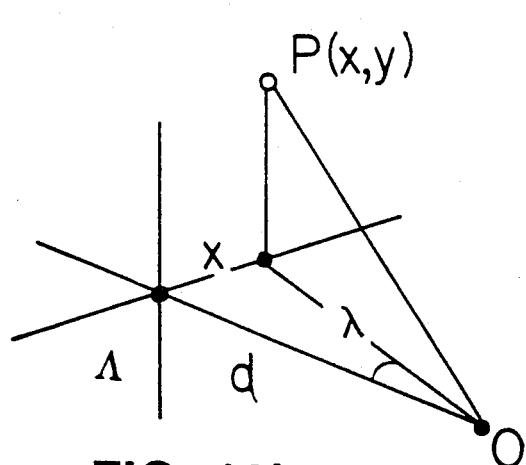
Figure 19C:
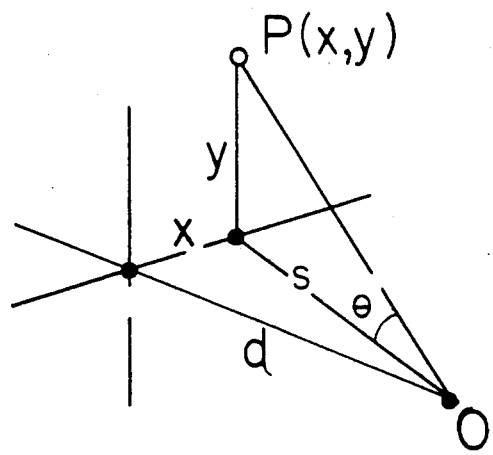

To determine the angles at which the system eye of the transducer will, in effect, see point P, we must determine certain hyperbolic right triangles. If the pupil O of the eye is at distance d, as shown in FIGS. 19(b) and 19(c), then the rules of the hyperbolic trigonometry of the right triangle provide the following relations:

$$\tan \lambda = \tan h\, x / \sin h\, d,$$

$$\cos h\, s = \cos h\, d \cos h\, x,$$

$$\tan \theta = \tan h\, y / \sin h\, s.$$

These three relations permit determination of the two angles $\lambda$ and $\theta$, measuring the angles of incidence of the ray incident on the pupil of the transductive eye, at O. Note that these are not the same angles as those determined in the 4-D Euclidean case, so that the reduction to coordinates on the retina or picture plane (Steps 5–7 of FIG. 10) is correspondingly different.

Figure 19D:
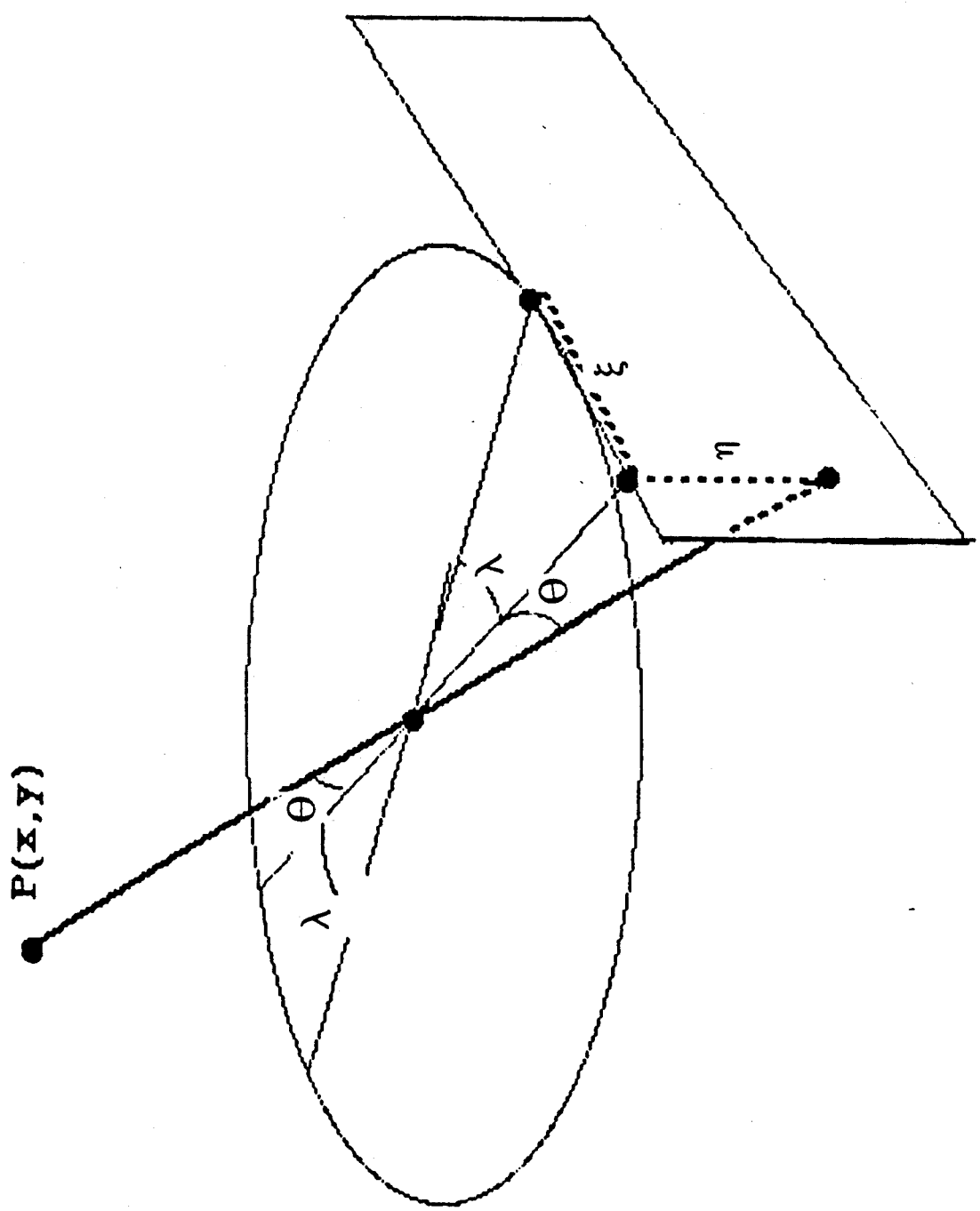
FIG. 19(d) illustrates the geometrical relationships in 3-D space of a light ray from 3-D Lobachevskian space forming an image point on the picture plane used by the transducer of the present invention.

Note that this is now a question of trigonometry within the eye's Euclidean space—the transducer having done its work—and thus follows familiar forms discussed above for 3-D Euclidian geometry in Steps 6–7 of FIG. 10. Here $\xi$ and $\eta$ are the rectangular coordinates on the retinal or picture plane, and if for convenience the distance from pupil to retina is taken as unity the relations from FIG. 19(d) are:

$$\xi = \tan \lambda,$$

$$\eta = \tan \theta / \cos \lambda.$$

3. MOVE/TURN/TOUCH mode in 4-D Euclidean geometry

The transducer is essentially the same in the MOVE/TURN/TOUCH mode as in the GO/LOOK/TOUCH mode discussed in section III.A.1, and the sequence of operations is the same as in FIG. 10. The main difference is that now the system eye is fixed and the object is manipulated with respect to the system eye. Thus, in Step 2, in addition to the coordinate system $\Sigma$, unit vectors $\hat{i}, \hat{j}, \hat{k}, \hat{l}$, and origin $\vec{\Omega}$ for the space $S_1$, a 4-D Euclidean coordinate system $R_o$ must also be defined for the object, corresponding unit vectors $\hat{e}, \hat{f}, \hat{g}, \hat{h}$, and origin $\vec{Q}$ of $R_o$ having coordinates (0, 0, 0, 0). Also, in Step 2 the user would redefine for the object to be manipulated the components of the object in vector form, as vectors $\bar{p}_{ij}$. Other objects used as benchmarks or background will as before be defined by the vector $\bar{q}_{ij}$. In Step 4, translation will now be with respect to the object and its coordinate system $R_o$. Thus, Step 4 will now also include the locating of the origin $\vec{Q}$ in the coordinate system $\Sigma$, as $\vec{Q} = (x_q, y_q, z_q, v_q)$. Then, the object $\bar{p}_{ij}$ is translated in the coordinate system $\Sigma$, along with the unit vectors, by the relations:

$$\vec{p}'_{ij} = \vec{p}_{ij} + \vec{Q}$$

$$\hat{e}' = \hat{e} + \vec{Q}$$

$$\hat{f}' = \hat{f} + \vec{Q}$$

$$\hat{g}' = \hat{g} - \vec{Q}$$

$$\hat{h}' = \hat{h} + \vec{Q}$$

In Step 3 the position of the system eye will have to be defined as shown above in the GO/LOOK/TOUCH mode. Next, rotation in Step 4 would also be different because now the rotation is to the object $\bar{p}_{ij}$ and not the system eye. First, the coordinate system R of the object $\bar{p}_{ij}$ will be orientated in the coordinate system $\Sigma$ of the alternative space $S_1$. The designated planar rotations of s, t, u, w will be the same. Next one of the planar rotations must be selected for rotating the object $\bar{p}_{ij}$. For example, if the planar rotation is k degrees about s then the representative rotational matrix is:

$$T_{Qs} = \begin{array}{cccc} \cos k & 0 & \sin k & 0 \\ 0 & 1 & 0 & 0 \\ -\sin k & 0 & \cos k & 0 \\ 0 & 0 & 0 & 1 \end{array}$$

The rotation of the object vectors $\bar{p}_{ij}$, and their corresponding unit vectors $\hat{e}, \hat{f}, \hat{g}, \hat{h}$, are then determined by the relations:

$$\vec{p}''_{ij} = T_{Qs}\vec{p}'_{ij}$$

$$\hat{e}'' = T_{Qs}\hat{e}'$$

$$\hat{f}'' = T_{Qs}\hat{f}'$$

$$\hat{g}'' = T_{Qs}\hat{g}'$$

$$\hat{h}'' = T_{Qs}\hat{h}'$$

Similarly, the rotation of the other background objects, the origin $\Omega'$ of $\Sigma$, and the unit vectors of the coordinate system $\Sigma$ must also be determined, resulting in $\bar{p}''_{ij}, \bar{q}''_{ij}, \Omega''$, and $\hat{i}'', \hat{j}'', \hat{k}'', \hat{l}''$, respectively.

Using the resulting vectors the object vectors $\bar{p}_{ij}$ must be determined with respect to $S_o$, by the following relations:

Translation $$\vec{p}'''_{ij} = \vec{p}''_{ij} + \Omega'$$

Rotation $$\vec{p}''''_{ij} = T_s \vec{p}'''_{ij}$$

Then, with the vectors $\vec{p}''''_{ij}, \vec{q}''_{ij}, \hat{i}'', \hat{j}'', \hat{k}'', \hat{l}'', \hat{e}'', \hat{f}'', \hat{g}'',$ $\hat{h}''$, the remaining Steps 6 through 9 are carried out as in the GO/LOOK/TOUCH mode as described above in Section III.A.1 and known to one skilled in the art.

4. MOVE/TURN/TOUCH mode in 3-D Lobachevskian Geometry

As discussed above, the choice of Lobachevskian (hyperbolic) geometry, only changes the trigonometric relationships used in defining the characteristics of the alternative geometry and the object or objects used in the flow diagram of FIG. 10. The difference is in the transducer, specifically performance of Step 5 in generating the angles of incidence of the light rays from the object; the lines and angles must now be determined within the alternative space $S_1$ of 3-D Lobachevskian geometry, and hence must operate by the rules of hyperbolic trigonometry. These are well-known, however, and their inclusion is simply a matter of utilizing the alternative trigonometric relationships known to those skilled in the art, but are set forth in some detail in Section III.A.2 above for Lobachevskian 3-D in the GO/LOOK/TOUCH mode. As to the MOVE/TURN/TOUCH mode the differences from the GO/LOOK/TOUCH mode outlined in Section III.A.3 above for the 4-D MOVE/TURN/TOUCH mode, equally apply, and need not be further detailed.

B. GRAPHING/IMAGING MODE in 4-D Euclidean Geometry

The "GRAPHING/IMAGING" mode allows a user to graph functions in alternative geometries, and thus to graph or visualize data input from measuring instruments, imaging devices, or from data sets of any sort in which it is useful to be able to study relationships among variables in an alternative geometry. In the GRAPHING mode the object is now a graph in the alternative geometry, which can be visualized and manipulated, as discussed above, using the transducer of the present invention in the GO/LOOK/TOUCH and MOVE/TURN/TOUCH mode of the INTERACTIVE VISUALIZATION AND MANIPULATION mode. Thus, each of the points or objects shown in the alternative geometry are transduced to corresponding images points in accordance with the flow diagram of FIG. 10. The visual intuition has been known since the time of Descartes to aid immensely in the comprehension of the relationships among interrelated quantities; the present invention in its GRAPHING/IMAGING mode makes this same advantage available in the case, for example, of sets of four related measurements, or of data from imaging devices looking at an object from more than one three-dimensional point of view. The present invention provides for graphing and imaging in four dimensions as a technique routinely available to engineers, scientists, the medical profession, artists, or any persons concerned with the structure of data sets or the visualization of spatial relations.

1. HYPERGRAPH Instructor

To illustrate the system and method in the GRAPHING/IMAGING mode, examples will be given herein for the four-dimensional Euclidean case. The first problem is to explain the method for the graphing of a single point in four-dimensional space; in principle, once one point has been plotted, any number of others, and thus whole figures or graphs, can be constructed in the same manner. In general, the steps are the same as those discussed above in relation to FIG. 10 and the device of FIG. 10(a). FIGS. 19(a) and 19(b) show "HYPERGRAPH instructor", proposed as an example of the GRAPHING mode. The sequence of FIGS. 19(a) 19(h) were created as a HYPERCARD stack to be run on the Macintosh computer, though the same effects could be produced by other programming techniques, to be run on other computers, including in particular much faster interactive workstations. The diagrams produced, however, are computer generated, and arise only through the system of the transducer implemented in the present example on the Macintosh computer using the MATHMATICA program.

In conventional graphing each point is located with respect to its coordinates, obtained by projecting onto the coordinate axes; to plot a point, the coordinate values are located on the axes, and projections are made from the axes to meet at a unique intersection which locates the point on the plane or in space. The "HYPERGRAPH instructor" carries this through to 4-D in the case of any chosen point. The panel controls can be set in any desired mode, FIG. 19 showing one configuration; altering these settings makes it possible to view the resulting figure from any position and at any angle, and thus to get a more comprehensive sense of its structure. FIG. 19 shows a point P plotted in 4-D Euclidean geometry with coordinates (2, 6, 4, 2) at a planar rotation of 45 degrees (i.e., "u") about the yz coordinate plane; the point (2,6) is first located in the x,y plane, and the point (4,2), in the z,v plane. The point itself is the intersection of planes run through these points parallel to the axial planes, as in the FIG. 19(c). The transducer of the present invention serves to locate that intersection and to present it to the eye. The HYPERGRAPH instructor can graph the 4-D point P from its component coordinates and also work backwards from a point in 4-D space to determine its component coordinates.

The system of the present invention makes it possible to graph a number pair as a function of a number pair, i.e., to in effect map a plane into itself, as a surface in 4-D Euclidean space. The surface or graph can also be studied in the same way as any other 4-D objects by translation and planar rotation using the GO/LOOK/TOUCH and MOVE/TURN/TOUCH modes of the INTERACTIVE VISUALIZATION AND MANIPULATION mode discussed above.

Figure 20A:
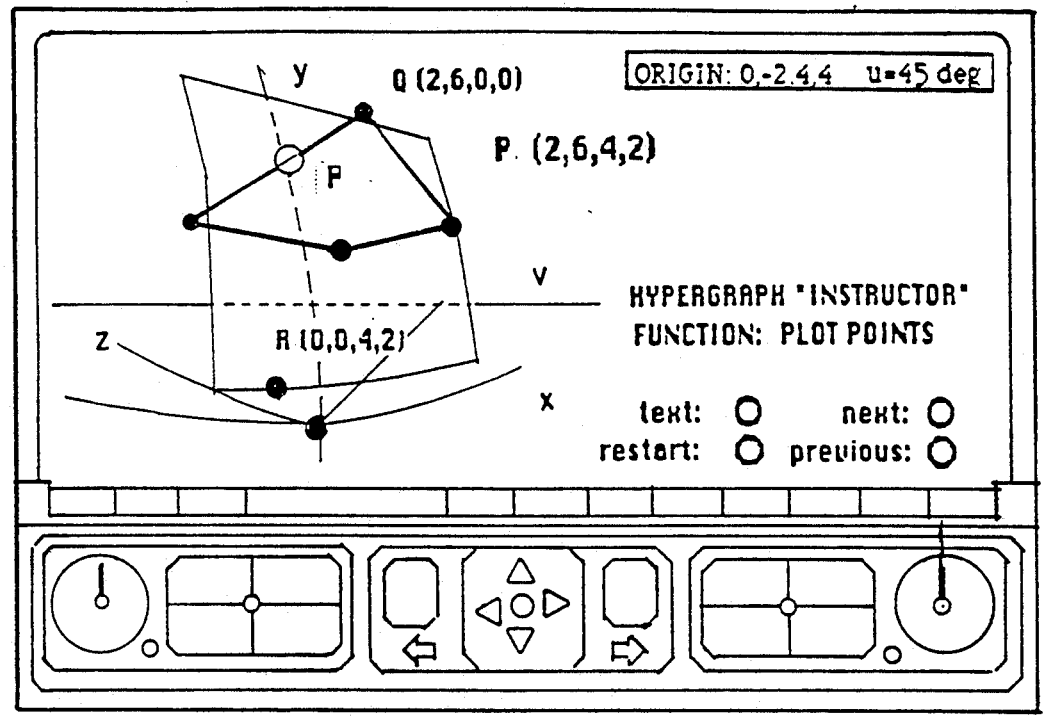
FIGS. 20(a)-20(h) illustrate the screen displays and panel controls in the GRAPHING/IMAGING mode of the present invention for graphing a point in 4-D Euclidean space.
Figure 20B:
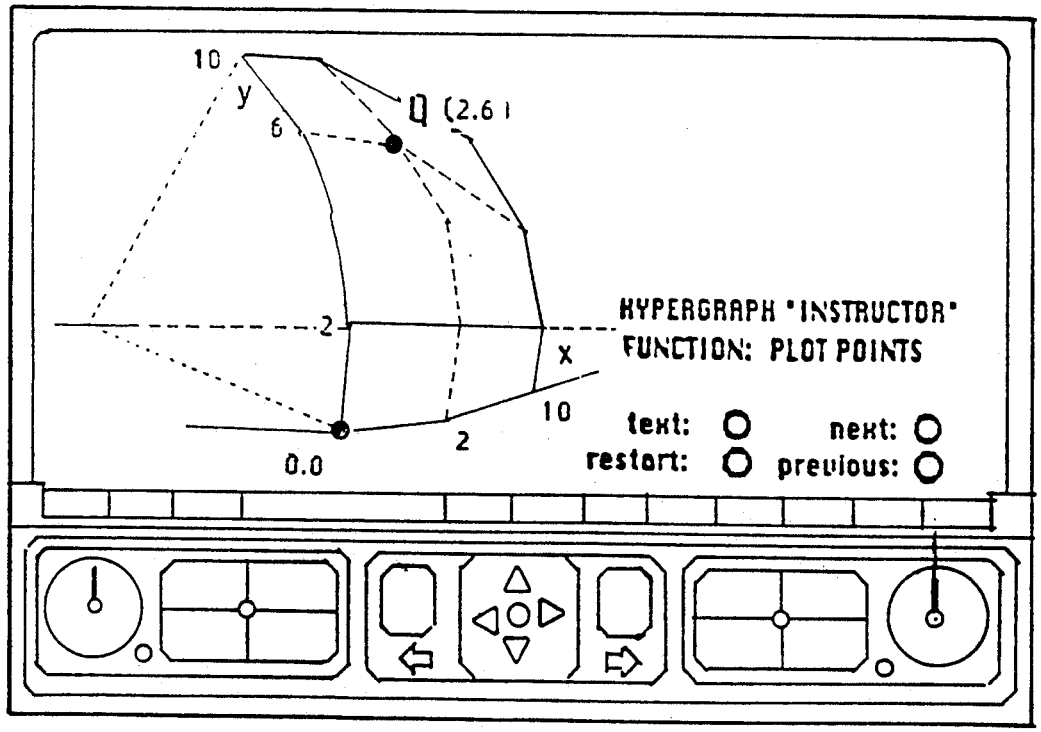

FIGS. 20(b)–20(f) illustrate the graphing of the point P at (2, 6, 4, 2) shown in FIG. 20(a). First, a point must be chosen by the user such as Q somewhere in the xy plane. As shown in FIG. 20(b) the point Q has the coordinates:

x=2, y=6.

Figure 20C:
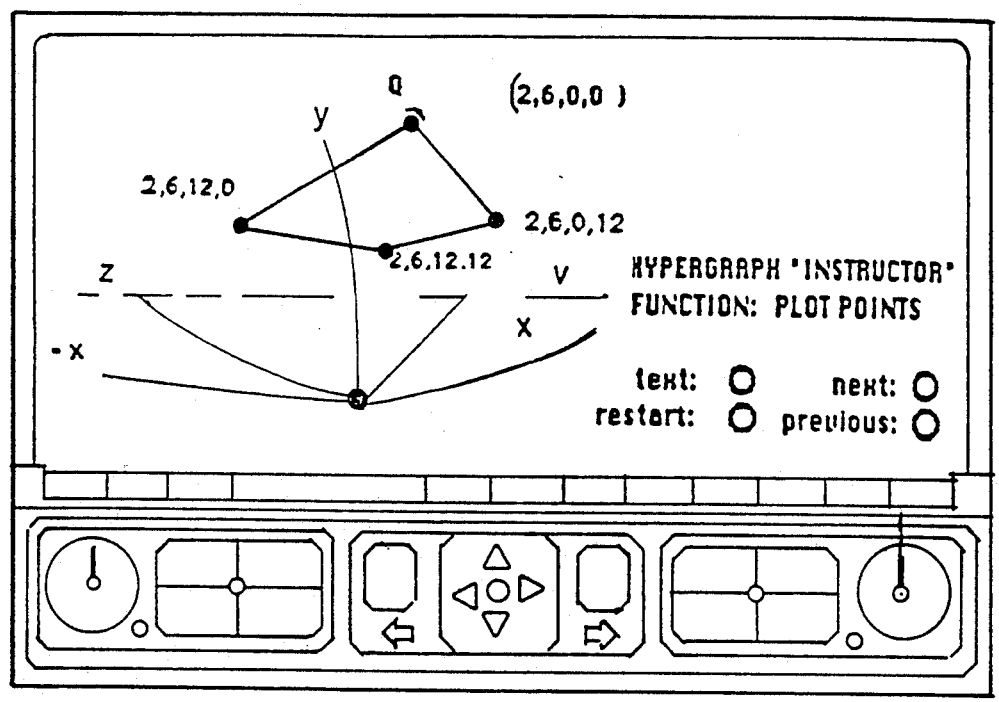
Figure 20D:
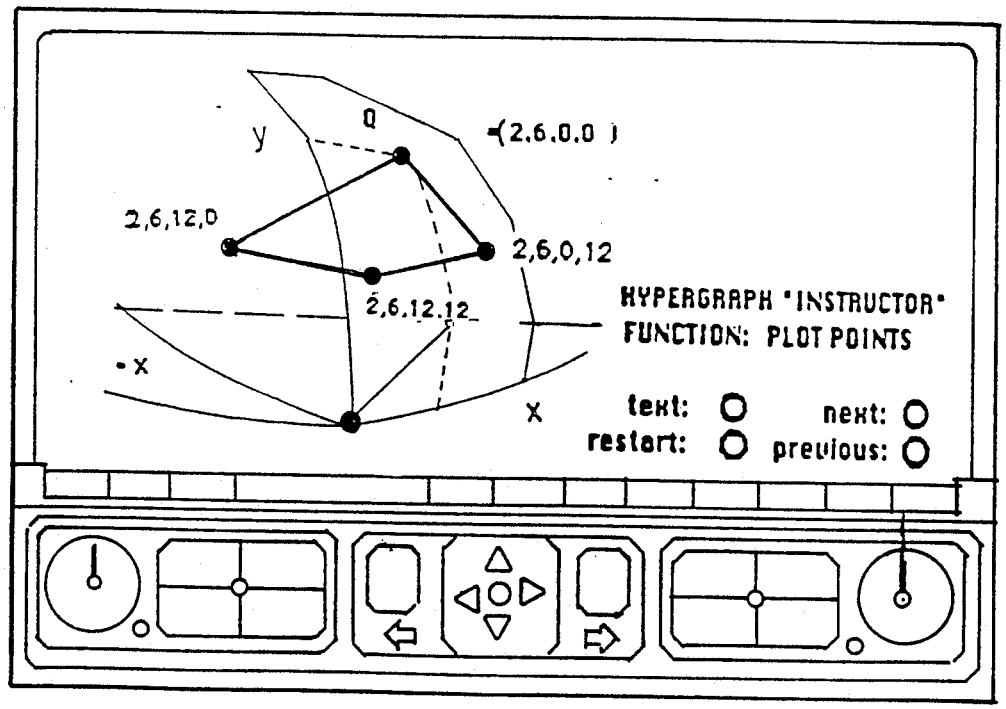

Since the point Q is in the xy plane its z and v coordinates are zero. Next, the user projects the point Q back in to the space of the 4-D graph by drawing a plane though the point Q parallel to the zv plane, as shown in FIG. 20(c). All points on this plane share the xy coordinates 2, 6 through all values of z and v. The "HYPERGRAPH instructor", utilizing the methods of the transducer previously discussed, makes this "drawing" possible. The result is shown in FIG. 20(d). Note in FIG. 20(d) that the plane the user has just drawn does not lie in the same 3-D space as the (x, y, z) coordinate system. All points in that coordinate system have the value v=0. In general, in 4-D, two planes intersect at a point. Here, the coordinate plane and the new plane intersect at just one point, Q.

Figure 20E:
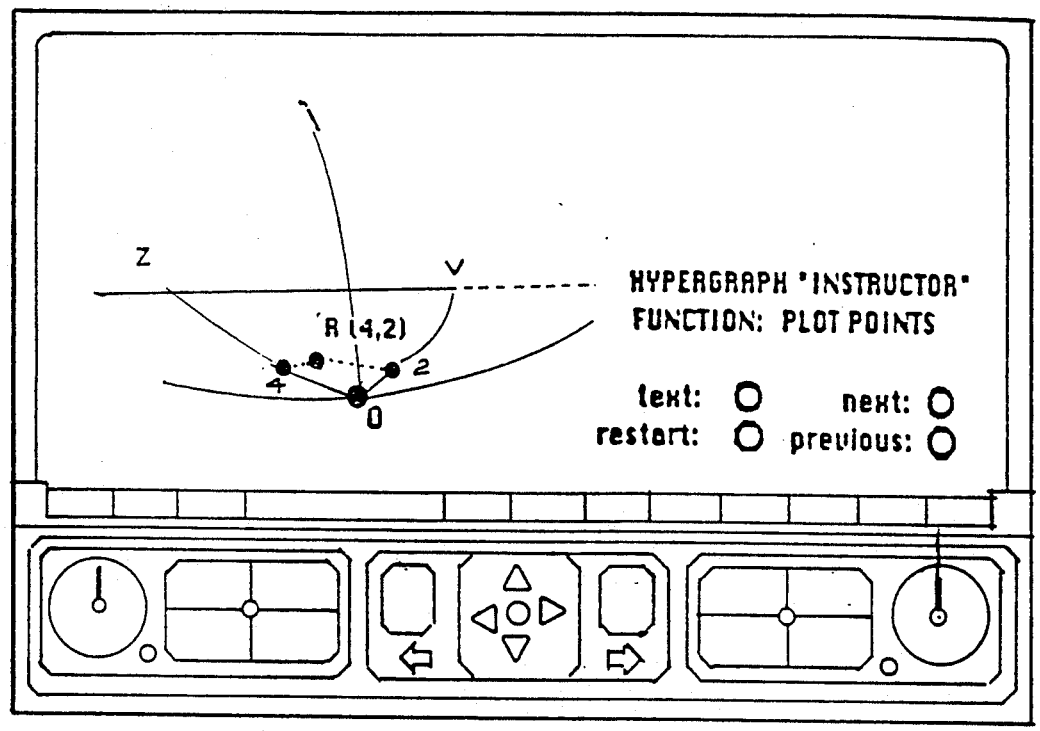

Next, the user takes any second point, R, in the yz plane, as shown in FIG. 20(e). Here, it happens that R has the coordinates:

$$z=4, v=2.$$

The purpose is to plot in 4-D space that point P which has the combined coordinates of Q and R, namely:

$$x=2, y=6, z=4, v=2.$$

Figure 20F:
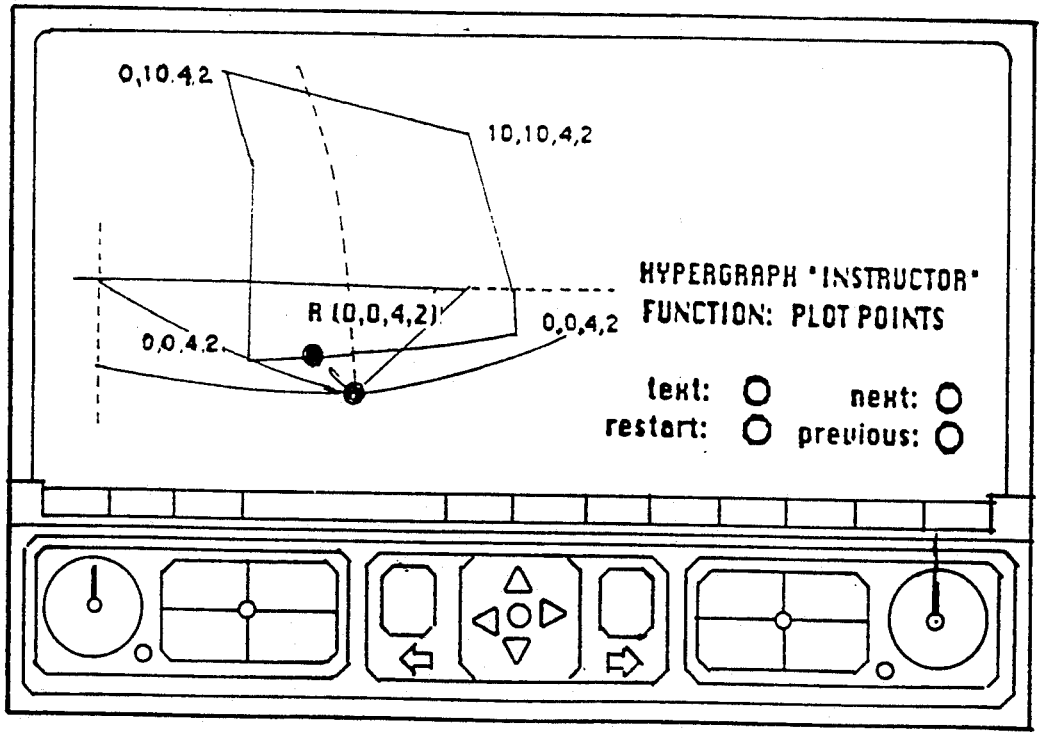

To project R in turn into 4-D space the user draws a plane through it, but this time parallel to the xy plane, as shown in FIG. 20(f). For this new plane the z and v coordinates remain constant, while the x and y coordinates range freely.

Finally, the user allows the two projection planes to intersect, which results in the point P (2, 6, 4, 2) in 4-D Euclidean space as shown in FIG. 20(a). Since the two planes exist in distinct 3-D spaces, in general, they pass without meeting to the eyes of a user unaided by the transducer of the present invention. However, with the use of the present invention the user can see in to 4-D Euclidean space and would note that the two planes do meet at the point P which is the point the user was seeking to find with the HYPERGRAPH instructor.

Figure 20G:
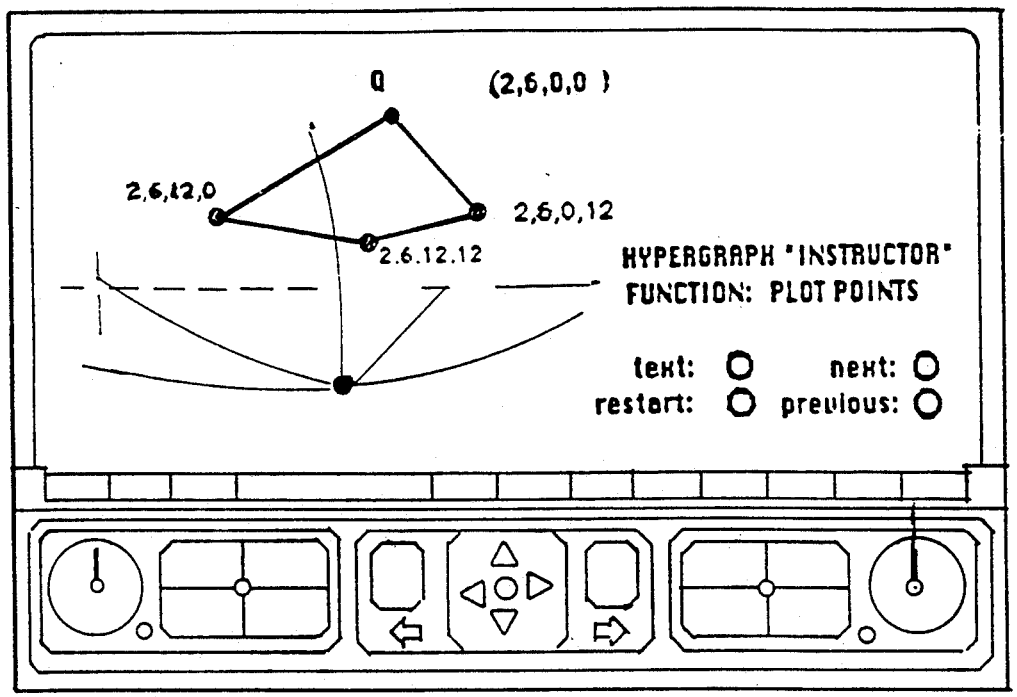

The whole process could be run backwards, starting from the point P in 4-D space displayed in FIG. 20(a), and seeking its component coordinates. For example, from the point P two projection planes would be run out in the same way, but in each case passing the planes through the given point P. First, the user would project "forward" from P to the xy plane, until the user located the point Q of intersection of the projection plane with the xy plane, as shown in FIG. 20(g). As discussed above, since the projection plane and the xy plane belong to distinct 3-D spaces, they have Q as a unique point in common. Next, the user projects down from P to locate its projection in the zv plane. R will be the unique point in which the projection plane and the zv plane intersect, as shown in FIG. 20(h).

Figure 20H:
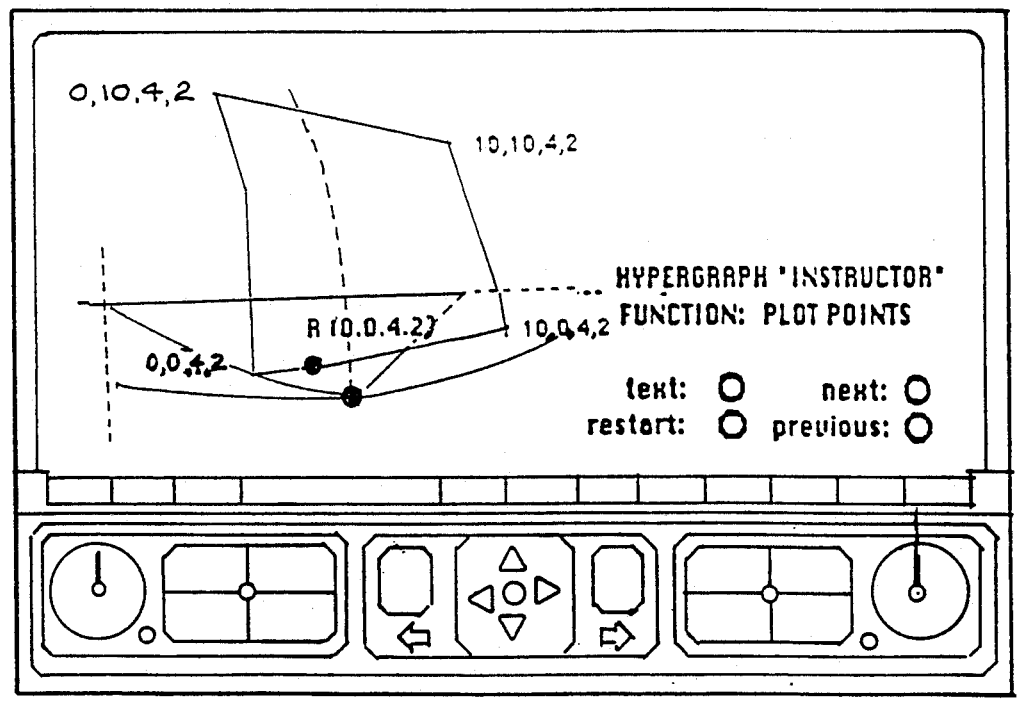

Thus, the user is left with the component parts of the 4-D point P as shown in FIGS. 20(g) and 20(h). The preceding graphing in 4-D Euclidean space is the result of the present invention which transduces the graph in the space of the alternative geometry for viewing by a user. The GRAPHING mode can be visualized as shown in the Figures by use of the GO/LOOK/TOUCH mode and the MOVE/TURN/TOUCH mode discussed above. Thus, each of the points of the objects or graphs shown in 4-D space are transduced to corresponding image points in the space $S_o$ of the system eye in accordance with the flow diagram of FIG. 10 and the examples given for both modes in the selected geometry of 4-D Euclidean geometry.

2. GRAPHING/IMAGING Complex Functions and Variables

The system using the same steps depicted in FIG. 10 of the device shown in FIG. 10(a), also makes it possible, for example, to visualize a Cartesian coordinate grid in 4-D space, and to plot in it figures representing functions involving four variables. For example, a Cartesian coordinate plane in four dimensions is shown in FIG. 21(a). The plane shown in FIG. 21(b) is a Cartesian coordinate system in 4-D space, made visible by the system and method of the present invention. The plane is shown together with conventional coordinate systems in FIGS. 21(c)-(d), onto which its points are projected by what is in effect a method of 4-D orthographic projection. If the three planes were drawn so as to share the origin which they in fact have in common, their figures would overlie one another and be visually confusing. They are shown, therefore, as is conventional in 3-D orthographic projection, in this extended mode which thus constitutes a method of systematic orthographic projection in 4-D space. FIG. 21(a) depicts 4-D coordinate axes for reference, whose center is in fact at the origin of FIG. 21(b). Projected onto the xy plane in FIG. 21(a), it gives the conventional grid in that plane, while projected onto the zv plane, both of whose axes are perpendicular to both x and y, it yields another Cartesian grid. Any point P located in the usual way with coordinates x,y in the first coordinate frame will project onto the 4-D system at a point S, and this in turn will project onto point R in the uv plane. In this way, all points of any chosen locus in the xy plane will map into a locus on the uv plane.

The graphing functions of complex numbers is also overcome by the present invention. For the following example, a notation, conventional in this domain, is adopted. Each complex number is a number pair, with real and imaginary components, so that when a function $$w=f(z)$$

is written, one number-pair, w, is asserted to be a function of another number pair, z, and thus four quantities are to be related. The components of z are defined as x,y and those of w as u,v, and thus for the following discussion and the accompanying figures, we will accede to that convention and label variables and the coordinate axes as (x,y,u,v). It should be noted that this differs from the convention used elsewhere in this application. To illustrate such a relation within the limitations of three dimensional space, it is usual to have recourse to conformal mapping. In this traditional method, two figures are drawn. One lies in the z-plane and is a locus representing the choice of x,y values for z. The other lies in the w-plane and arises from the first by the operation of the function. The figure in the z-plane is said to be mapped onto the w-plane, and the function is studied by reference to both figures in their relation. This mapping in four dimensions could not be visualized without the present invention.

The transducer makes it possible to graph the four-dimensional figure representing the function directly, and to present the loci in the z and w planes as projections from this one graph which presents to the system eye and the human eye the function as a whole. FIGS. 22(a)-22(d) show an example, produced uniquely by the system and method of the present invention in HYPERGRAPH mode, in which a function often studied in this context is graphed in four dimensions. The function is the hyperbolic cosine, written in complex notation:

$$w=\cos h(z).$$

As shown from the hyperbolic function, straight lines parallel to the x-axis in the z plane are mapped as ellipses in the w plane; it is difficult to imagine the form of a four-dimensional graph which would accomplish this transformation, and it is chosen as our example here partly for that reason.

Figure 22A:
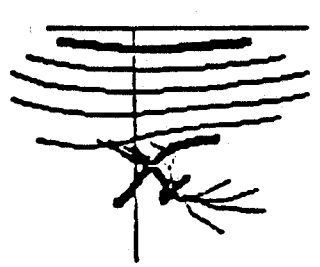
FIGS. 22(a)-22(d) illustrate the graphing of complex numbers in 4-D in the GRAPHING/IMAGING mode of the present invention.
Figure 22A:
Figure 22A:
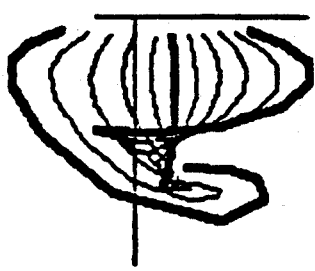
Figure 22A:
Figure 22A:

In FIG. 22(a), shown at the right is a set of lines in the (x,y) plane parallel to the x-axis, and hence representing successive fixed values of y. These are then traced, to the left, on the 4-D surface, thus delineating that surface from the point of view of y as the parameter. Below the 4-D surface is shown the projection of that surface onto the (u,v) plane, which similarly is delineated for successive values of y. This procedure, in which projections are made from the 4-D surface onto the (x,y) and (u,v) planes, is the equivalent of conventional 3-D orthographic projection, and may thus be referred to as 4-D orthographic projection.

Figure 22B:

In FIG. 22(b), the same procedure is followed, but this time the lines in the (x,y) plane are parallel to the y-axis, and hence represent successive constant values of x. The 4-D surface, to the left in FIG. 22(b), is here delineated from the point of view of x as the parameter, giving a second visual impression of the complex spatial form. Below the 4-D surface in FIG. 22(b), projection is made onto the (u,v) plane.

Figure 22C:
Figure 22C:
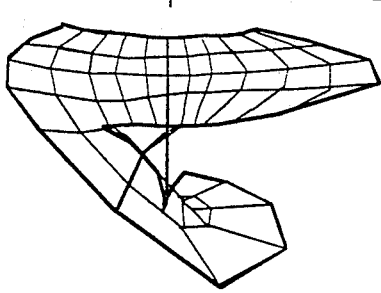
Figure 22C:
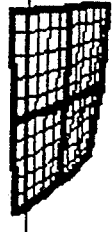
Figure 22C:
Figure 22D:
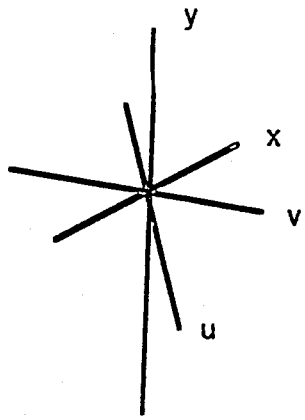

In FIG. 22(c), the two projections of FIGS. 22(a) and 22(b) are combined to give a single visual impression of the 4-D spatial form which constitutes the 4-D graph of the complex hyperbolic cosine function. In FIG. 22(d), the four coordinate axes are represented. The particular configuration which they take is the consequence of the point of view which has been chosen for these figures, in which the user's eye has been displaced from the origin and the visual axis tilted, so as to separate the axes visually and make the coordinate planes visible, as well as a rotation of 30 degrees about the (y,z) plane which has been given to the graph itself.

Figures 23A, 23B:
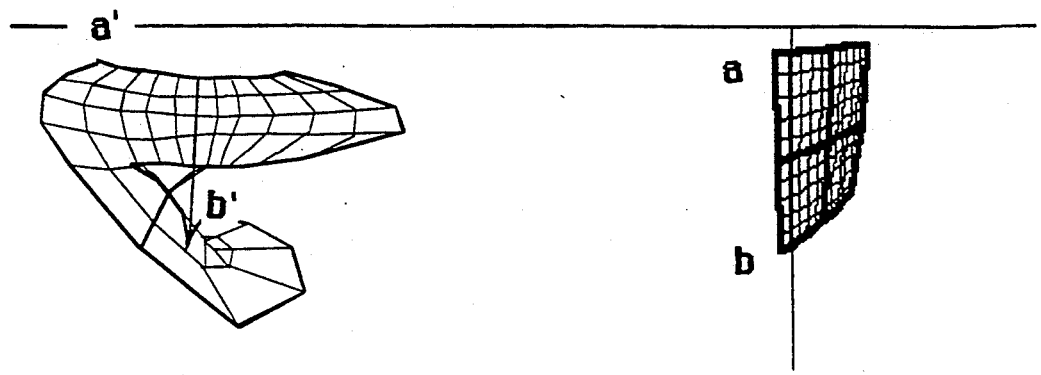
FIGS. 23(a)-23(d) illustrate the graphing of a hyperbolic cosine in 4-D in the GRAPHING/IMAGING mode of the present invention.
Figure 23C:
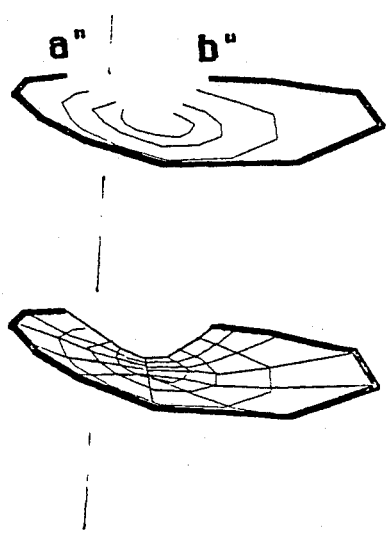
Figure 23D:
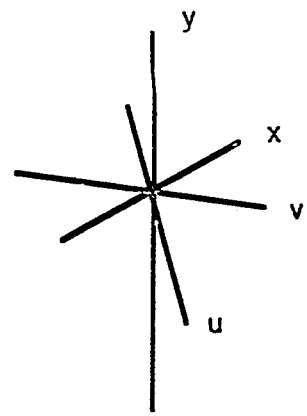

FIGS. 23(a)-23(d) similarly show the graph of cosh (z) in four dimensions, and trace the projection by which one particular straight line in the z-plane maps into an ellipse in the plane of the dependent variable, by way of a space curve. Thus, in FIG. 23(a), a specific negative value of x has been chosen, represented in the (x,y) plane by the line ab. The same line projects onto the 4-D graph as the space curve a'b', as shown in FIG. 23(b), and that line in turn projects onto the (u,v) plane as the elliptical line a"b", shown in FIG. 23(c). In this way, it is possible to intuit how the straight lines of the (x,y) plane become transformed by way of the space curve into the curvilinear lines of the (u,v) plane. As before, the coordinate axes are shown for reference at FIG. 23(d).

It should be noted that the graphs in FIGS. 22(a)-22(d) and 23(a)-23(d) are shown here in simple "wire-frame" form. Fully implemented, in HYPERGRAPH mode, the present invention would include techniques of shading and illumination (from a light source located at a position of the viewer's choice in the fourth dimension) which would make it less difficult to read. It should be emphasized, however, that these data are complex, and it will take time and training to develop the intuitions necessary to utilize the new technique intuitively—this is to a considerable extent terra incognita for the human psyche. As this is accomplished, however, 4-D imaging may become routine practice in many areas of science, technology, or more general data utilization, including economics and the social sciences.

Figure 24A:
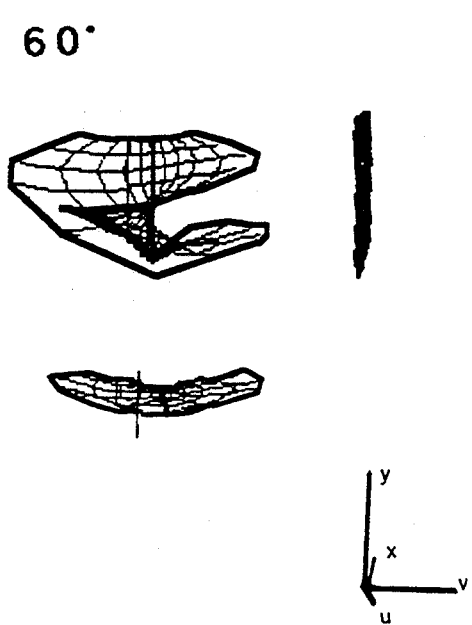
FIG. 24(a)-24(d) illustrate the rotation of the image in FIG. 22 in 4-D at angles of 60, 120, 150, and 180 degrees respectively.
Figure 24D:
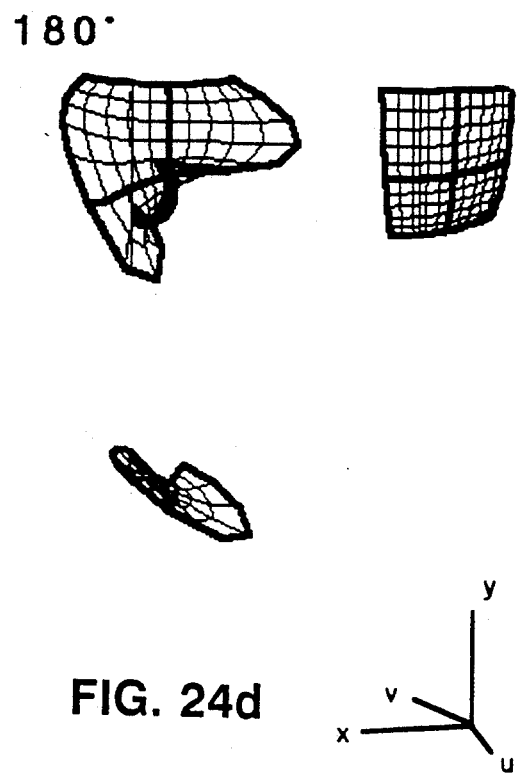
Figure 24B:
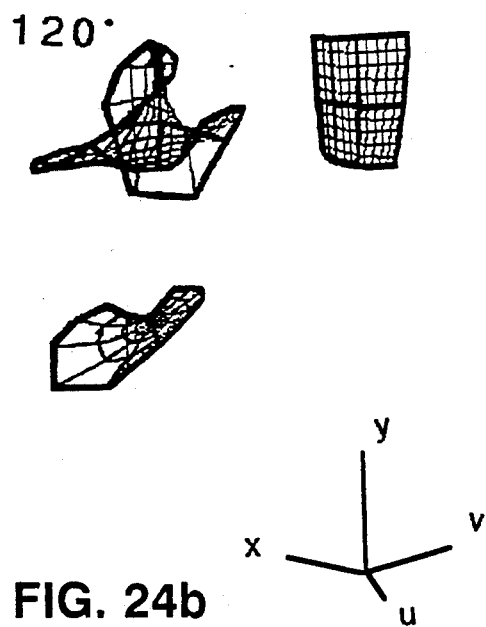
Figure 24C:
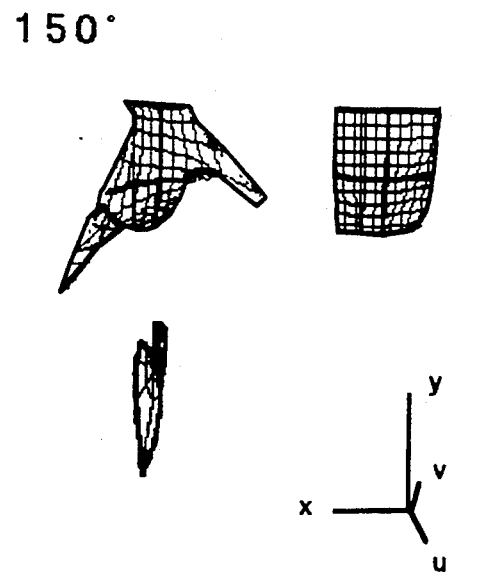

The spatial intuition is aided in interpreting the extreme complexity of FIGS. 22(a)-22(d) by the ability to manipulate the figure in the manner of the MOVE/TURN mode, as shown in FIGS. 24(a)-24(d). Thus, in FIGS. 24(a)-24(d), the 4-D graph has been rotated about the (y,z) plane, in the manner of the MOVE/TURN mode described earlier, to successive orientations of 60, 120, 150 and 180 degrees. Each of these is still viewed from the same user's position as in FIGS. 22 and 23. Looking at the 60-degree case in of FIG. 24(a), it can be noticed that in this orientation, the (x,y) plane is seen edge-on, while the elliptic figure in the (u,v) plane is fully extended. The coordinate system shown at the bottom right of FIG. 24(a), for reference, confirms that in the 60-degree case, the x and y coordinate axes are indeed visually superimposed. By contrast, in the 150-degree case in FIG. 24(c), the (x,y) plane is seen fully extended, while the (u,v) plane is seen compressed. The graph takes very different visual forms when turned to 120 degrees, as shown in FIG. 24(b), or at 180 degrees, as shown in FIG. 24(d). By viewing continuous rotations of the graph in this manner, as well as about other planes of rotation, an intuitive visual conception of the shape of the mathematical function can be achieved.

As the spatial figure representing the cosh (z) function is rotated in 4-D space through angles of 60, 120, 150 and 180 degrees, features can be distinguished which are confused in other views, contributing to the intuition of the figure integrated from the impressions of the several views. It should be remembered that in a similar way, we never "see" the 3-D cube as a whole, but form our intuition of the figure by integrating the impressions from the experience of many partial 2-D views. In addition to rotation of the image as shown in FIGS. 24(a)-24(d), alternative views can be developed by altering the choice of viewing position, as in the MOVE/TURN mode.

Figure 25A:
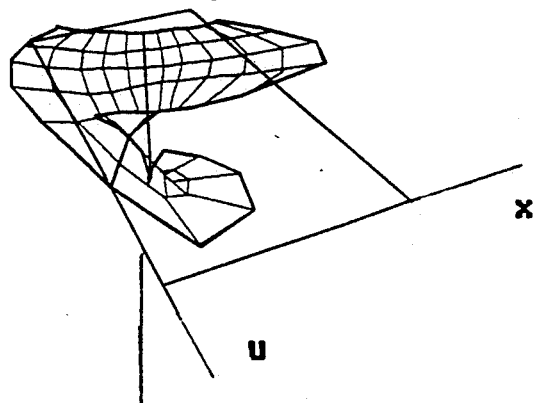
FIGS. 25(a)-25(e) illustrate the sectioning of the graph of FIG. 24 representing a data structure with a plane in any 4-D orientation.
Figures 25B, 25C:
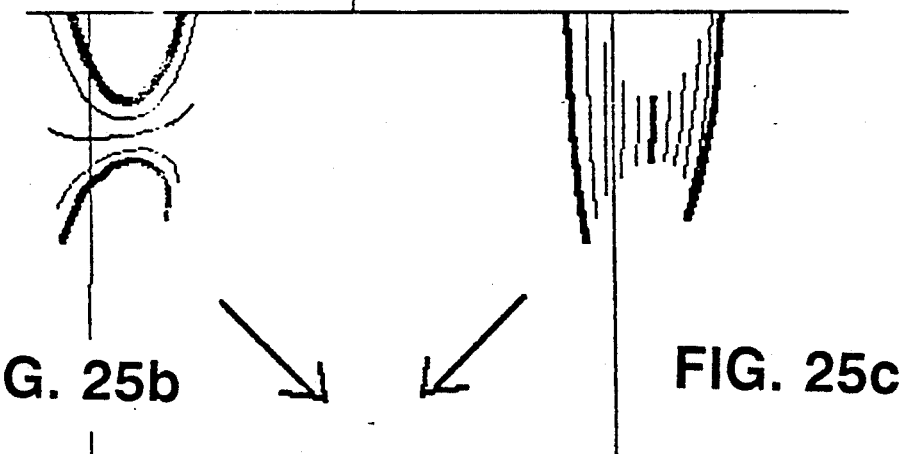
Figure 25D:
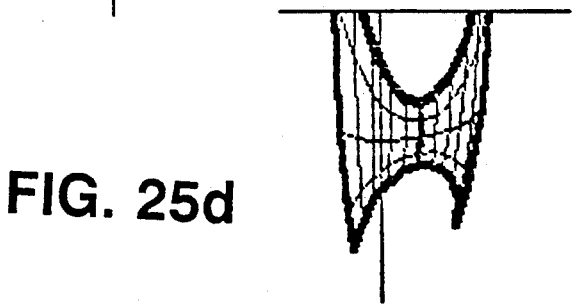
Figure 25E:
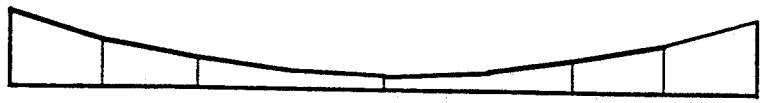

An intuition of the function can be enhanced by "sectioning" it in other ways. In FIGS. 25(a)-25(e), the same spatial form is shown projected onto the xu plane, instead of the uv plane. Since that consists of the real components of the dependent and independent variables, it reveals that within the complex figure, a more familiar real relation u=cosh x is contained. In FIG. 25(a), the new sectioning plane is represented, onto which the figure is to be projected. In FIGS. 25(b) and 25(c) are shown traced the two sets of curves in the (u,v) plane corresponding to this new section, and in FIG. 25(d) the two are combined to complete the figure in the (u,v) plane. This relation is recognizable as the form of the catenary, the form of the hanging cable. Stretched by a change of coordinates as shown at the bottom of our figure, it reveals the familiar image of a bridge, as shown in FIG. 25(e).

This example illustrates an important feature of this system, which permits sectioning the graph representing a data structure by means of a plane in any desired 4-D orientation, not necessarily in alignment with any of the original coordinate planes, and thereby to discover with the aid of visual perception unsuspected orders within the data. This is the visual counterpart of standard methods of coordinate rotations, as in "factor analysis" of data sets.

Figure 26:
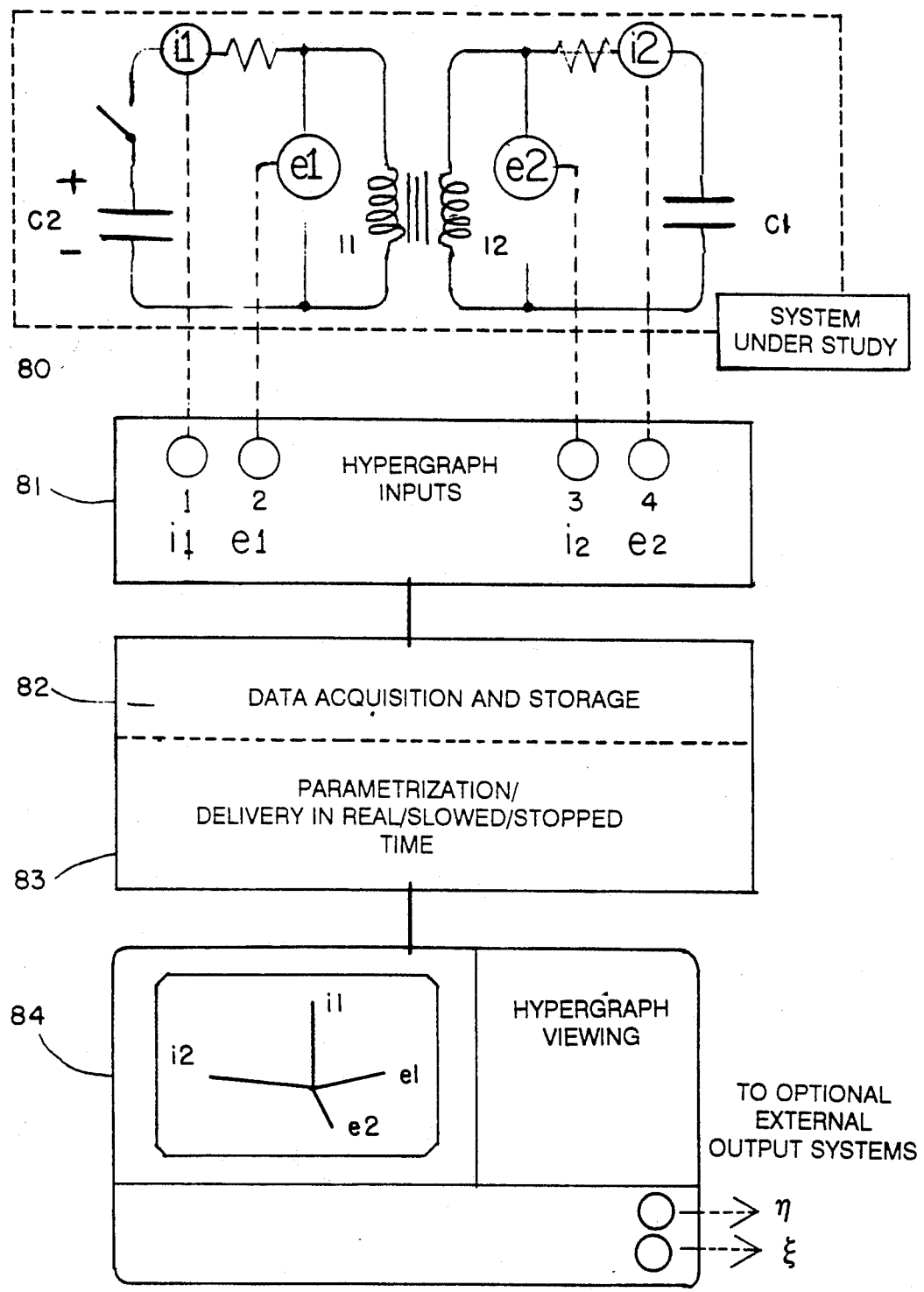
FIG. 26 illustrates the HYPERGRAPH device accepting laboratory input from two coupled resonant systems.

The same system can also be applied practically in such areas as exploring relations among empirical data. FIG. 26 shows the HYPERGRAPH device accepting laboratory input data through inputs 81 from two coupled resonant systems 80—here shown as electric circuits, but equally from any physical, chemical or biological system, industrial process, or medical imaging apparatus. It will be useful, in general, in the examination of data sets of any kind, however gathered. It will function as a module in standard laboratory instruments by which data are gathered and processed, such as the standard laboratory storage oscilloscope. Data examined in this way would be acquired, for example, through usual forms of analog/digital converter, stored in any convenient form of data-base storage 82, processed through any of the conventional technologies of filtering, Fourier transformation, etc. of module 83, and then output to output 84, a computer monitor, for study in any combination, rotated in four dimensions and viewed from a position chosen to best reveal relationships in the data set. Sets of more than four variables might be sampled in any four-parameter combination, and "parametricized" in module 83 in any sequence. Further, the image points for the data defined by coordinates $\xi$, $\eta$ can be output to any optional external output systems.

It is not essential to this system that the input data be thought of in numerical terms. Images scanned or otherwise made available in data form can be presented in this way, and presented by the system in an alternative geometry, and in particular, in a single image which includes a fourth dimension. Thus, the user could see aggregated on four axes two dimensional images captured by two cameras or other viewing devices, such as medical imaging devices, or study the relation of data on four channels of devices such as the EKG or EEG recorders. With practice, this permits the possibility of more complex viewing incorporating a new degree of information—in effect, permitting "seeing around corners." If time is taken as the fourth axis, this four dimensional graphing of processes will make it possible to view an entire motion of a 3-D object in a single image.

C. THE BLACKBOARD MODE for GEOMETRIC DRAWING/DESIGN

From a mathematical point of view, the "BLACKBOARD" mode differs in that the beginning in a sense begins with the output. Objects are defined for input to the blackboard by some form of draw command from a Chalk Tray. The déterminations must then run backwards ("upstream") from the rays in $S_o$ to those in the alternative space. The method shown in FIG. 10 is inherently reversible, and the determinations will be possible, provided the desired object is sufficiently described. If the object is not sufficiently described, as may often be the case, then the system should make an arbitrary choice.

Thus, if the user asks to draw a plane in Euclidean four-dimensional space without specifying more, the system may take one of the coordinate planes, such as xy, input it, and produce the image. Similarly, barring other information, the system may alternatively default to place the system eye in the space of the alternative geometry (Step 3) and thereby draw in a standard advantageous configuration in which all four coordinate axes are readily seen. If the user invokes the cursor to draw a straight line between two points not otherwise defined, the system may place them in the plane xy. If the user asks for a perpendicular to his plane at a point—not a unique line in four-dimensions—the system may choose to place the line in $S_o$, setting v=0. If the user then asks for a perpendicular to $S_o$ at a given point—perhaps the same point—the problem is determined, and the system responds with a line parallel to the v-axis.

In every case, whether the user does so or not, the system will assign four coordinates to every vector, and even if the object drawn is 3-D, the system will place and draw it in 4-D space, remaining ready to respond to a further command which may call for a four-dimensional increment to the object. Again, the more rapidly the system can complete its loop between Steps 8 and 4 of FIG. 10, the more immediate, presumably, will be the sense of actually drawing on an alternative medium. "Marks" made with mouse-cursor, light pen, touch screen, graphics pad, etc., will be picked up as cursor locations, effectively the familiar ($\xi$, $\eta$) output coordinates, with which the reversed determinations can properly begin, in a manner that will be apparent to those skilled in the art, in view of this discussion.

Although outputs to the blackboard might be quite elaborate, implementation would be sufficient for study purposes in terms of "wire frame" drawings, in which only critical points are computed, linked by simple linear interpolations—perhaps made by the operator with normal "draw" tools. Such simplicity might make more rapid responses possible with systems of limited power. At the other extreme, large systems could respond with the full speed and versatility of advanced CAD programs.

The BLACKBOARD acts, in effect, as a virtual blackboard for the construction and study of figures or objects in alternative geometries. One example of a control panel configured to implement this mode is shown in FIGS. 27(a) through 27(e). The system shown is implemented using a HYPERCARD stack run on the Macintosh computer for the present example.

Figure 27A:
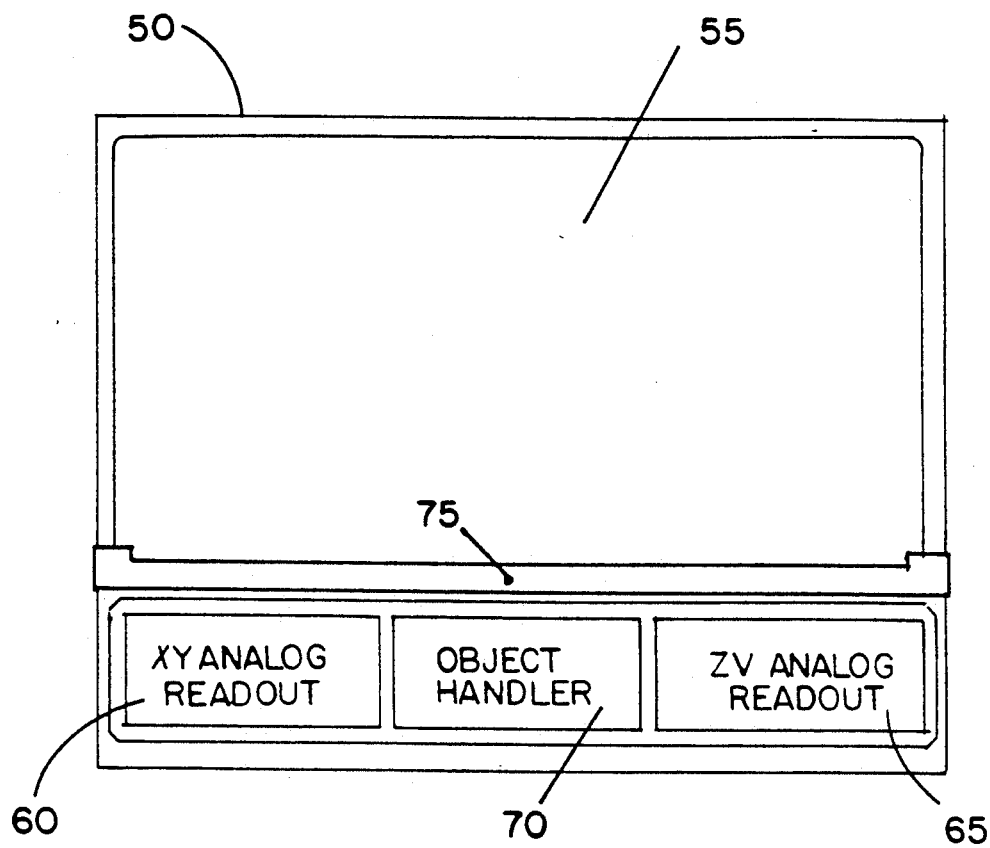
FIGS. 27(a)-27(e) illustrate the virtual blackboard screen displays and panel controls of the BLACKBOARD mode of the present invention for geometric construction of objects in an alternative geometry.
Figure 27B:
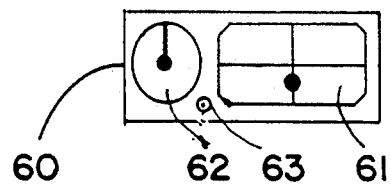
Figure 27C:
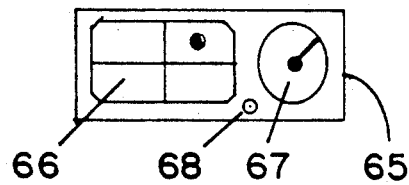

The BLACKBOARD, shown in FIG. 27(a) as a window 55 in a computer screen 50, may be any form of projection device or other medium for presenting visual images from electronic output. It may use commercially available technology to provide projection from a computer display onto an actual classroom blackboard area. As the output element of the system which constitutes the present invention, it may best be thought of as a virtual blackboard, which behaves in ways appropriate to the postulates of an alternative geometry—as if it were made of matter other than rigid three-dimensional Euclidean materials. Window 55 is also used for certain displays which implement the operation of the system in this mode. These would continue to be provided on a local screen in this position if the blackboard were displayed separately.

In this mode, in which the system becomes a convenience for drawing in otherwise inaccessible ways, qualitative management of the position and attitude of the blackboard objects would suffice for most purposes—the intention being to find convenient positions of the objects for better viewing. For this reason, the normal display is in analog form. The xy analog readout module 60, shown in FIGS. 27(a) and 27(b), reads x and y positions in rectangular coordinates on the screen 61, and angular position about the xy plane on the dial 62. Similarly, the zv analog readout module 65, shown in FIGS. 27(a) and 27(c), reads the zv coordinates on screen 66, and angular position about the zv plane on the dial 67. Quick shift from the xy analog readout module 60 and the zv analog readout module 65 and vice-versa is made with buttons 63 and buttons 68, respectively.

Figure 27D:
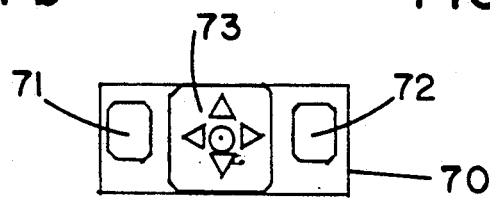

The object handler module 70, shown in FIGS. 27(a) and 27(d), contains a set of four buttons for left-right and up-down motions in the coordinates under current control. Either of the readout modules will be actively under the control of the handler at any given time; the active module is lighted. Buttons 71 and 72, as before, provide continuous control in rotation, and when double-clicked, set the object under management into continuous rotational motion.

Button 73, when activated brings onto a corner of the blackboard a numerical readout of the current position and orientation of any object under management.

Figure 27E:
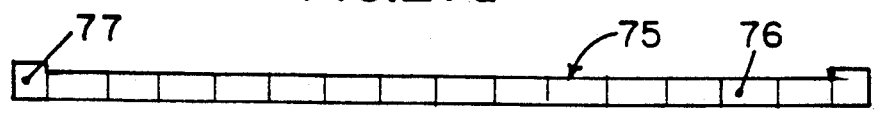

The chalk tray module 75, shown in FIGS. 27(a) and 27(e), is a drawing program which contains the instruments such as a ruler and compass for drawing figures in the selected geometry using the transducer of the present invention—in this case, Euclidean four-dimensional space—including a tool box with objects as they appear in the alternative geometry. Each instrument is invoked by one of the buttons 76. Like the instruments of conventional computer-supported drawing or design programs, these in effect implement the postulates of the geometry, and thus permit the construction of geometric figures in that space. The present invention makes it possible to represent such figures systematically in a new way, and hence makes such systematic drawing possible in a new way.

In the case of Euclidean 4-D space, such objects as the hypercube could be directly represented, every position defined by the use of the drawing implements being accepted as inputs in Step 2 of the overall flow diagram, then interpreted by the transducer Step 5 and the rays determining corresponding image points on the blackboard computed and displayed. Invoking the instrument, to mark a point, join two points with a straight line, determine a plane with a third point, pass the plane, etc., would continuously invoke the transducer and yield the output as well. The system would have the ability to determine the intersection of two planes (in a point), as in the GRAPHING mode, to do lighting and shading, to utilize color and indicate surfaces, etc.

For all of this, standard technology of computer-aided drawing and design could be directly adapted to develop a chalk tray tool kit, in a manner that will be appreciated by those skilled in the art, in view of this discussion. Objects drawn with ruler and compass would be selected, cut, copied, moved, scaled, etc.; only an object so selected would come under the control of the object handler module 70. The ruler itself could draw a line between any two points—i.e., specify the points for the transducer, and thus produce the line as the transducer's regular output. A line on the board could thus lie along any direction in four-dimensional space, and any line or plane in that space could be rotated into the plane of the board for visualization and manipulation.

Button 77 on the tray invokes icons identifying the buttons on the tray, while button 78 in conjunction with one of the buttons 76 calls up a corresponding menu making the instrument's options accessible. The icons may be displayed immediately above the tray, while the menus, movable at the user's option, would normally appear to the side of the blackboard. Menus, icons, and the figures on the board may be arranged and managed in the manner of a desktop computer display.

Normal file-handling routines would make it possible to input information to be displayed on the blackboard from any external source capable of providing an electronic output, and to output the figures produced on the blackboard to any system, storage divide or medium capable of accepting electronic information. In this way the blackboard would serve to design graphic materials for technical or educational purposes, the illustration of books or articles, or the initial determination of objects for video or films.

1. BLACKBOARD mode in 3-D Lobachevskian Geometry

Figure 28A:
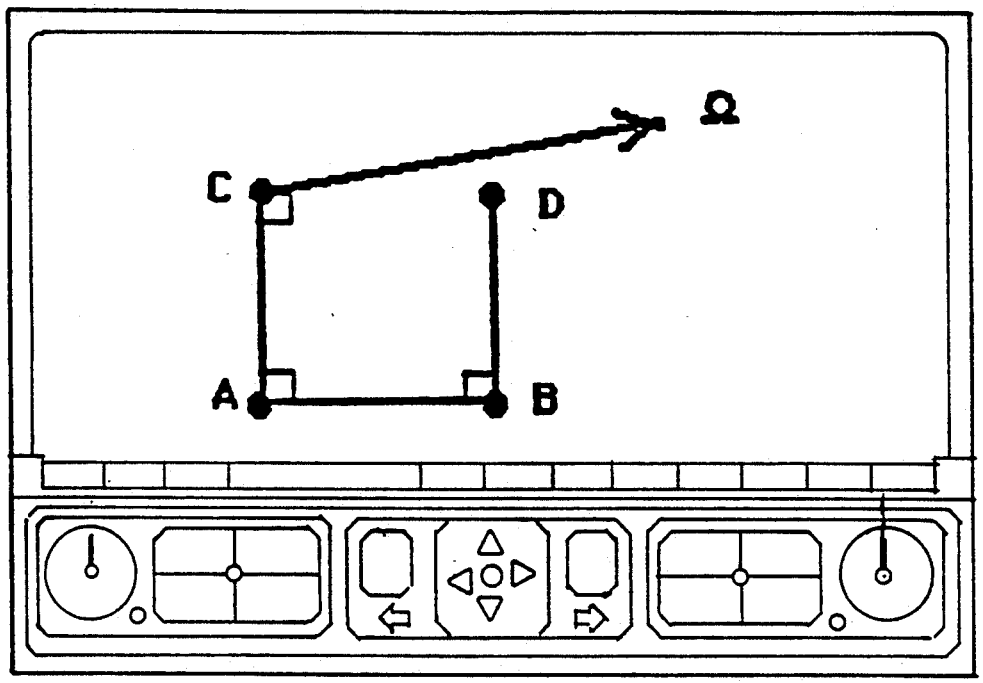
FIGS. 28(a)-28(c) illustrate by screen displays the problem in constructing geometrical objects of an alternative geometry on a Euclidean blackboard.
Figure 28B:
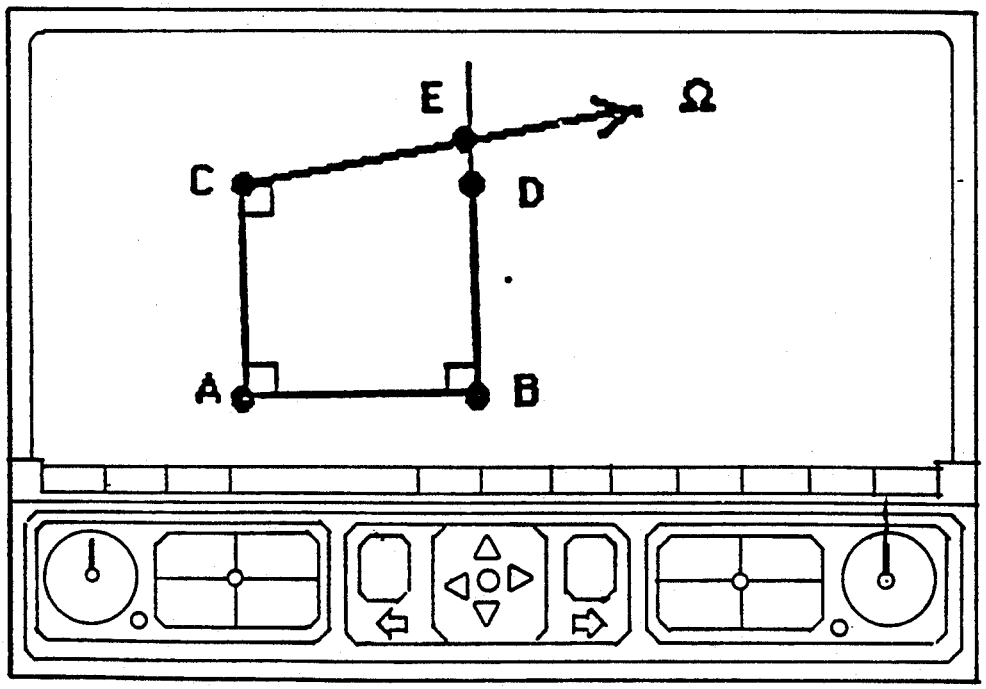

It is impossible in Euclidean space to draw consistent pictures of objects in non-Euclidean geometries. For example, in Lobachevskian geometry, it is impossible to draw a simple Euclidean square. As shown in FIG. 28(a), if a user sought to construct on a Euclidean 3-D blackboard a square according to Lobachevskian geometry, the user would first choose a line segment AB and erect perpendiculars at A and B having lengths equal to AB. However, when the user tries to construct the perpendicular CΩ it will miss the point D at which the user was aiming to complete the square. If the user next extends BD to meet CΩ at E, the Lambert Quadrilateral is created as shown in FIG. 28(b), and the angle CEB is less than a right angle required for a square.

Figure 28C:
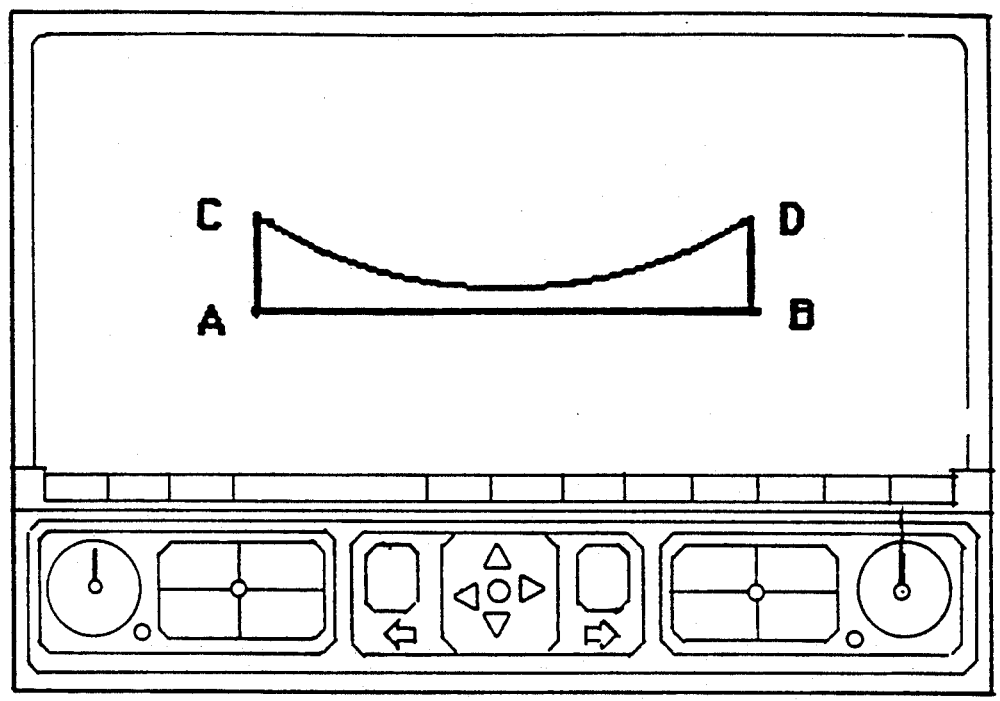

Alternatively the user could insist on a straight line between the two points C and D. But according to Lobachevskian geometry the line CD is not straight but is curved, and thus the vertex angles ACD and CDB could not be right angles, as shown in FIG. 28(c). In general, instead of creating a square the user is creating a Saccheri quadrilateral. Thus, the user will realize that it is impossible to draw plane figures defined by one postulate set (i.e., Lobachevskian geometry) on a plane which is governed by a different geometry (i.e., Euclidian geometry).

The present invention provides a transductive system eye to overcome the limitations of the human eye. The human eye is a Euclidean surface which is not able to visualize Lobachevskian objects in a consistent way, as shown in FIGS. 28(a) and 28(b). Using the present invention, the blackboard is the picture plane of the system eye of the transducer which intervenes between the two disparate geometries so that the blackboard, in effect, becomes a Lobachevskian plane.

Figure 29A:
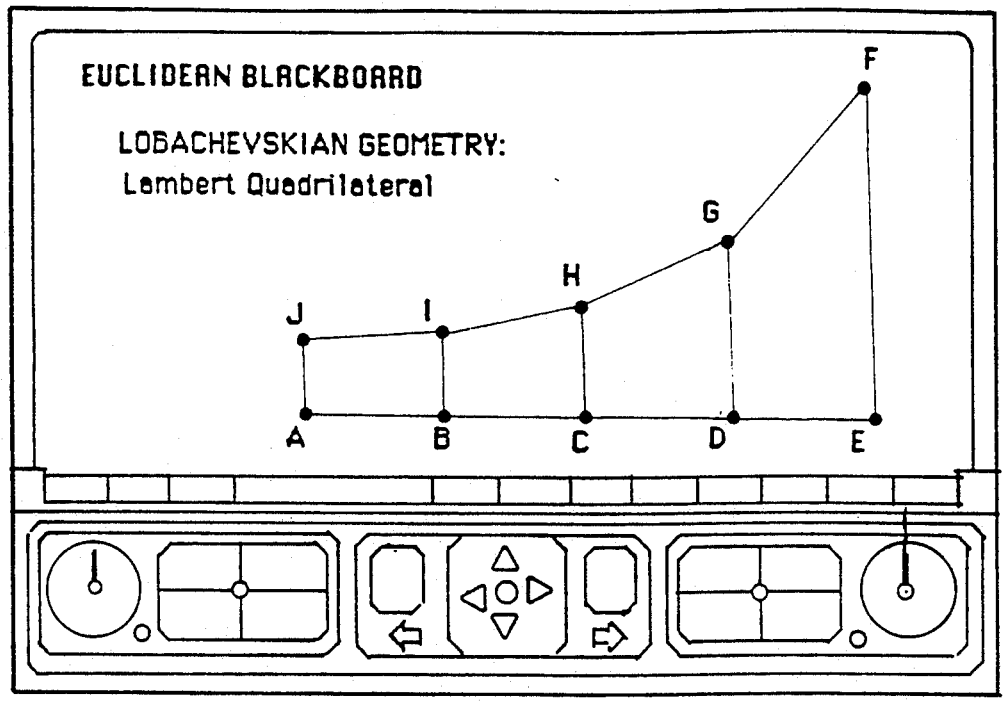
FIGS. 29(a)-29(b) illustrate the screen displays for construction of a Lambert quadrilateral in 3-D Lobachevskian geometry on a Euclidean blackboard and a Lobachevskian blackboard, respectively, in the BLACKBOARD mode of the system of the present invention.
Figure 29B:
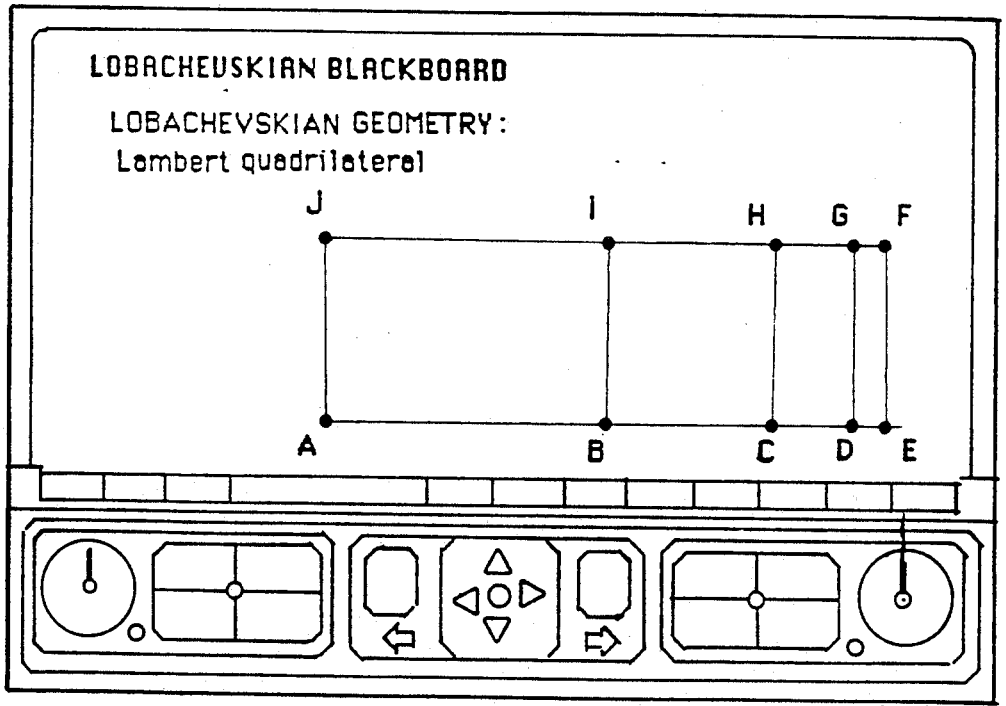

FIG. 29(a), shows the normal Euclidean Blackboard, unaided by the present invention. Using the tools of a CAD drawing system, available through the buttons on the chalk tray, a user has constructed the Lambert quadrilateral, shown in FIG. 29(a). However, the Blackboard is in the Euclidean mode, obeying the postulates of Euclidean geometry, with the result that the line JF is incapable of appearing straight to the unaided Euclidean eye. The user can change the mode of the blackboard to a Lobachevskian surface using the present invention. If the user does so, then the eye of the user is able through the system eye of the transducer to visualize the Lambert quadrilateral, as it would appear in the space of Lobachevskian geometry. The system eye sends light rays forming image points on a users retina corresponding to the light rays from the object points of the Lambert quadrilateral as it would appear in Lobachevskian space. The result is displayed on the Lobachevskian blackboard shown in FIG. 28(b).

Following the process of FIG. 10, the present invention transduces the object points of the Lambert quadrilateral in to corresponding image points in the space of the conventional eye. The Lambert quadrilateral is an object which can be visualized and manipulated on the blackboard according to the flow of the GO/LOOK/TOUCH or MOVE/TURN/TOUCH modes of the VISUALIZATION AND MANIPULATION mode of the present invention, discussed above. In the MOVE/TURN/TOUCH mode the system uses the mathematical flow discussed above but now according to the trigonometry and postulates of 3-D Lobachevskian geometry. Similarly, for the GO/TOUCH/MODE the mathematical flow would be the same as discussed above for 4-D Euclidean geometry but now with the Lobachevskian trigonometry and postulates.

Figure 30:
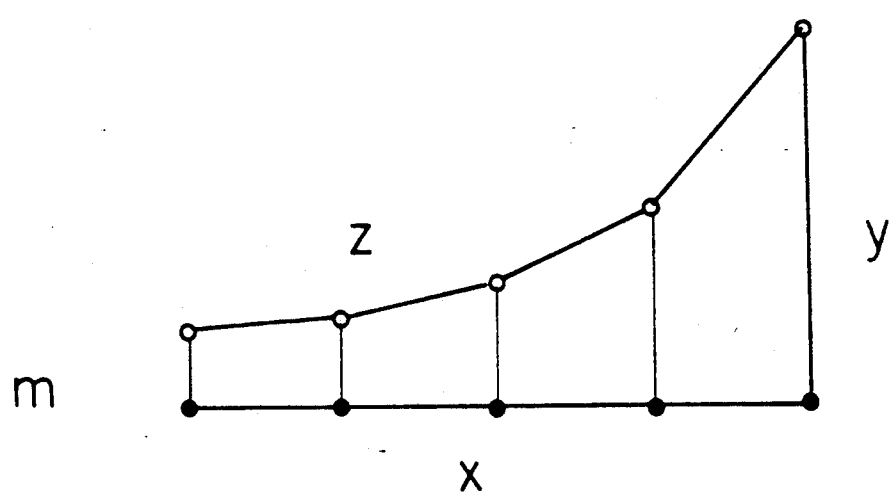
FIG. 30 illustrates a Lambert quadrilateral in 3-D Euclidean space having sides x, y, z and m.

For example, if the BLACKBOARD and GO/LOOK/TOUCH modes are selected (Step 1) for a selected 3-D Lobachevskian geometry (Step 2) and the object is defined by the user with sides x, y, z and m in terms of the Lambert quadrilateral (Step 2), as shown in FIG. 30, then, the transducer (Step 5) would use the following Lobachevskian relationships to determine the incident angles of the light rays from the object in 3-D Euclidean space:

$$a = 2\tan^{-1}(e^{-m})$$

$$a' = (90 - a)$$

$$m' = -ln(\tan a'/2)$$

$$y = \tanh^{-1}\left(\frac{\cosh x}{\cosh m'}\right)$$

$$z = \tanh^{-1}\left(\frac{\cosh m}{\cosh x'}\right)$$

where, $$\epsilon = 2\tan^{-1}(e^{-x}),$$

$$\epsilon' = (90 - \epsilon),$$

$$x' = ln(\tan \epsilon'/2)$$

$$s = \cos h^{-1}(\cos h\, q \cdot \cos h\, x)$$

$$\theta = \tan^{-1}\left(\frac{\tanh y}{\sinh s}\right)$$

$$\lambda = \tan^{-1}\left(\frac{\tanh x}{\sin q}\right)$$

The remaining Steps 6–9 of the system will be followed as discussed above in relation to FIG. 10 for the GO/LOOK/TOUCH mode in Section III.A.1.

In full computer-aided design (CAD) implementation of the present invention for geometric construction and drawing, the user is unaware of processes occurring when the user selects an object of an alternative geometry from a chalk tray to be placed on the screen in an alternative geometry blackboard. It will be illustrative here to track through one particular example, that of drawing a straight line between two points directly designated in the Lobachevskian plane.

Figure 31A:
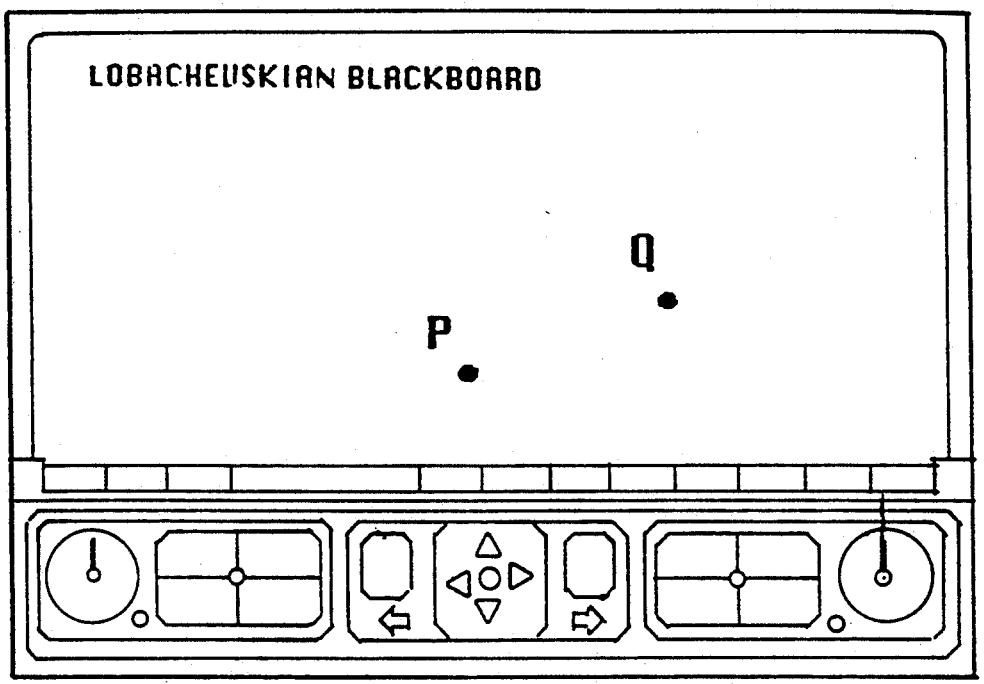
FIG. 31(a)-31(b) illustrates the drawing of a straight line though two points P and Q on a Lobachevskian blackboard in the BLACKBOARD mode.
Figure 31B:
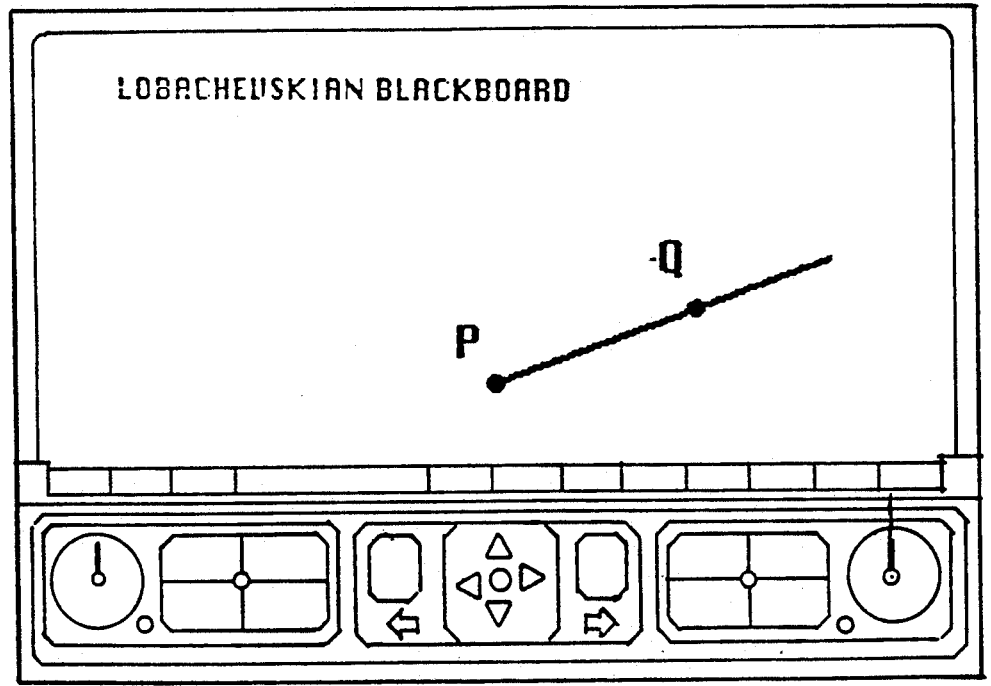

Having selected the "Lobachevskian Blackboard", the user may designate the two points, P and Q, through which a straight line is to be drawn as shown in FIG. 31(a). This selection may be made merely by pointing to a light-sensitive computer screen, or by selecting them by means of a mouse-click or on a digital drawing tablet, or by any other of a number of means. The transducer of the present invention operates to produce an image, which the user will immediately see, of the line passing through the selected points, as it would be seen by the system eye placed in 3-D Lobachevskian space. This result is shown in FIG. 31(b). For the user, then, the experience is that of having drawn a line in the 3-D Lobachevskian space, or on a blackboard substance which behaved in a Lobachevskian manner.

Figure 32:
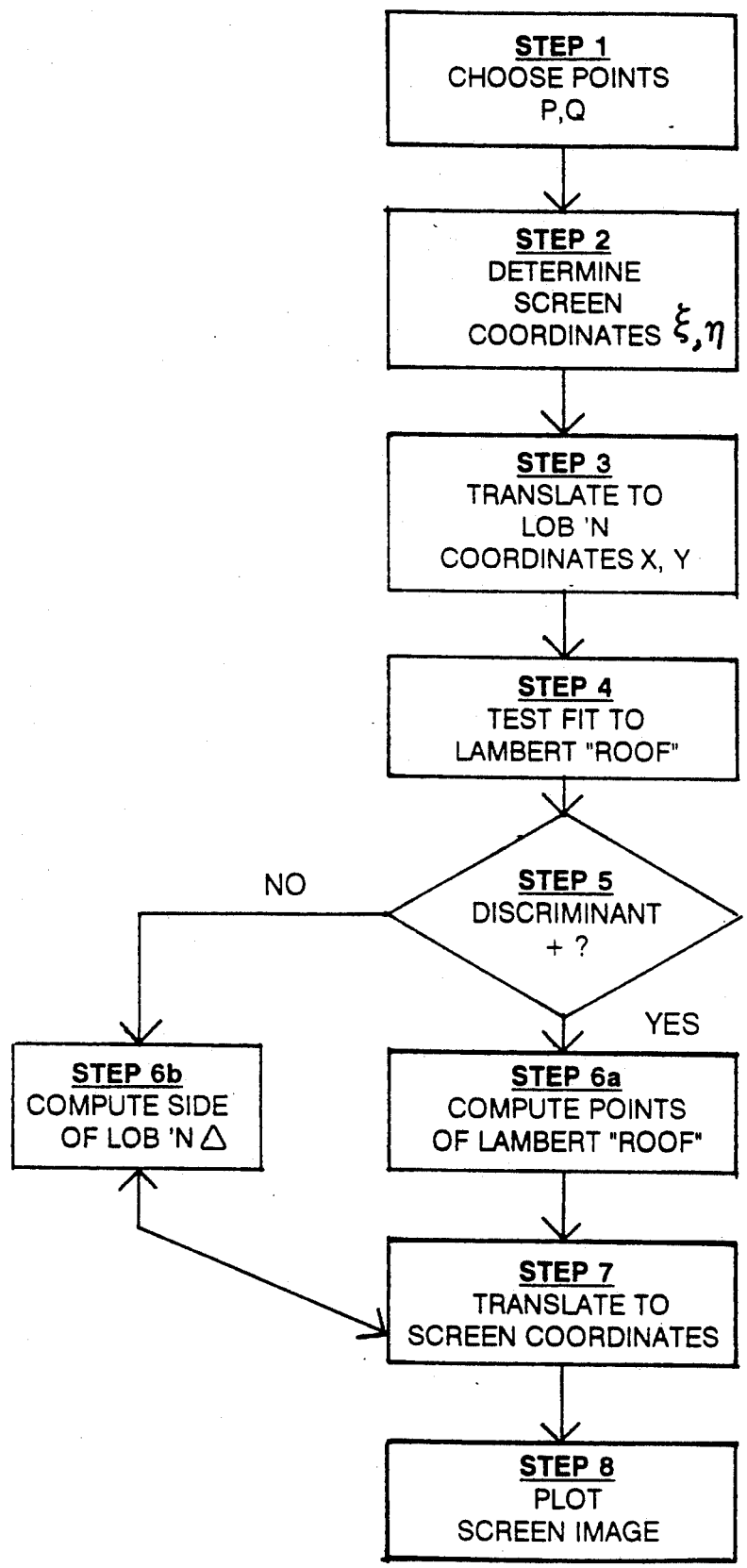
FIG. 32 illustrates in flow diagram form the steps of the system for the drawings of FIG. 31(a) and 31(b) in the BLACKBOARD mode of the present invention.
Figure 33A:
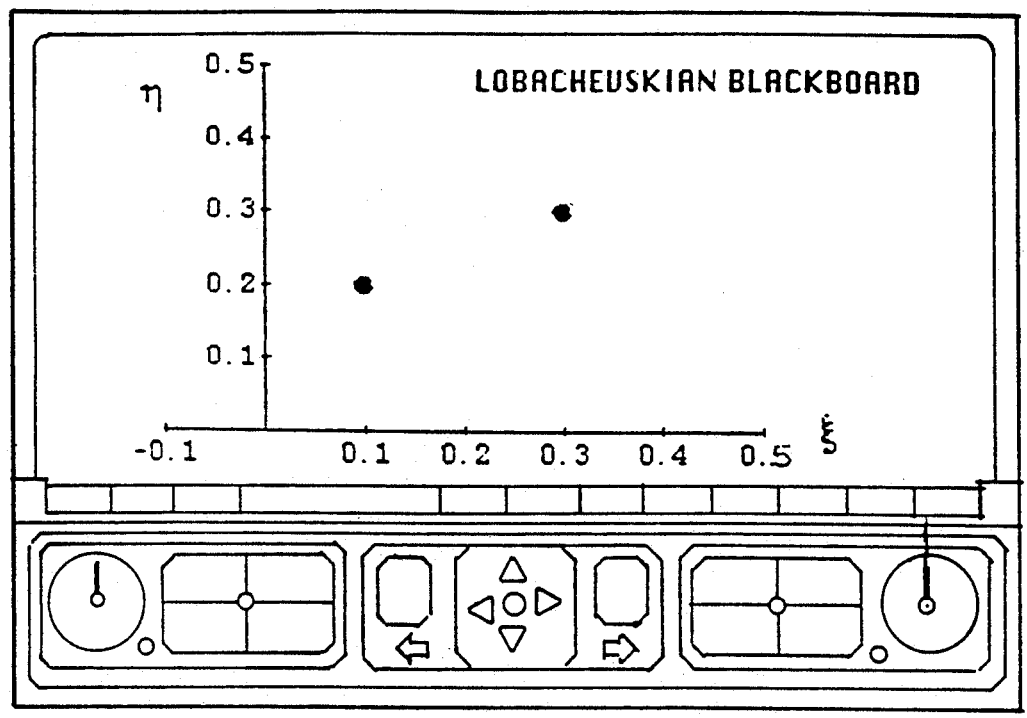
FIGS. 33(a)-33(d) illustrate the drawings of FIGS. 31(a) and 31(b) in the BLACKBOARD mode following the flow diagram of FIG. 32, and the corresponding results on the 3-D Euclidean Blackboard.

To accomplish this, the system passes through the steps delineated in the flow diagram of FIG. 32. It first uses standard computer utilities to determine the screen coordinates of the selected points in Step 1—these may be displayed by means of a "Chalk Tray" option as discussed above, and are shown here in FIGS. 33(a) and 33(b). In Steps 2–3, the determination earlier described which translated Lobachevskian coordinates (x,y) into retinal or picture-plane coordinates ($\xi$, $\eta$) are now reversed from the flow of FIG. 10, so that the appropriate trigonometry already discussed is used to translate the selected screen coordinates into what was earlier designated "Lobachevskian coordinates" (x,y) in the discussion of GO/LOOK/TOUCH in Section III.A.2. Again, it is possible, and is illustrative for our purposes, to switch to the "Euclidean Blackboard" mode in order to display the result in FIGS. 33(c) and 33(d), though in normal CAD use there would ordinarily be no need to do so.

The system in Step 4 then makes an algebraic test to determine whether the two points are on the line which constitutes the "roof" of a Lambert quadrilateral; in one procedure, this can be done by determining the sign of the discriminant in a curve-fitting equation in Step 5 of FIG. 33. If the sign is positive, the system continues in Step 6(a) to use standard algebraic curve-fitting techniques to determine the equation in Lobachevskian coordinates of the roof of the appropriate Lambert quadrilateral. If the discriminant is negative, on the other hand, the required line will intersect the baseline, and the program accordingly follows Step 6(b), fitting the points to a side of a Lobachevskian right triangle which includes a segment of the baseline as one side. In either case, in Step 7 the Lobachevskian coordinates of a sequence of points must be computed along the straight line thus defined. If desired, the Blackboard may be placed in "Euclidean" mode and this line plotted as it would appear in the Euclidean plane as shown in FIG. 33(d).

Figure 33B:
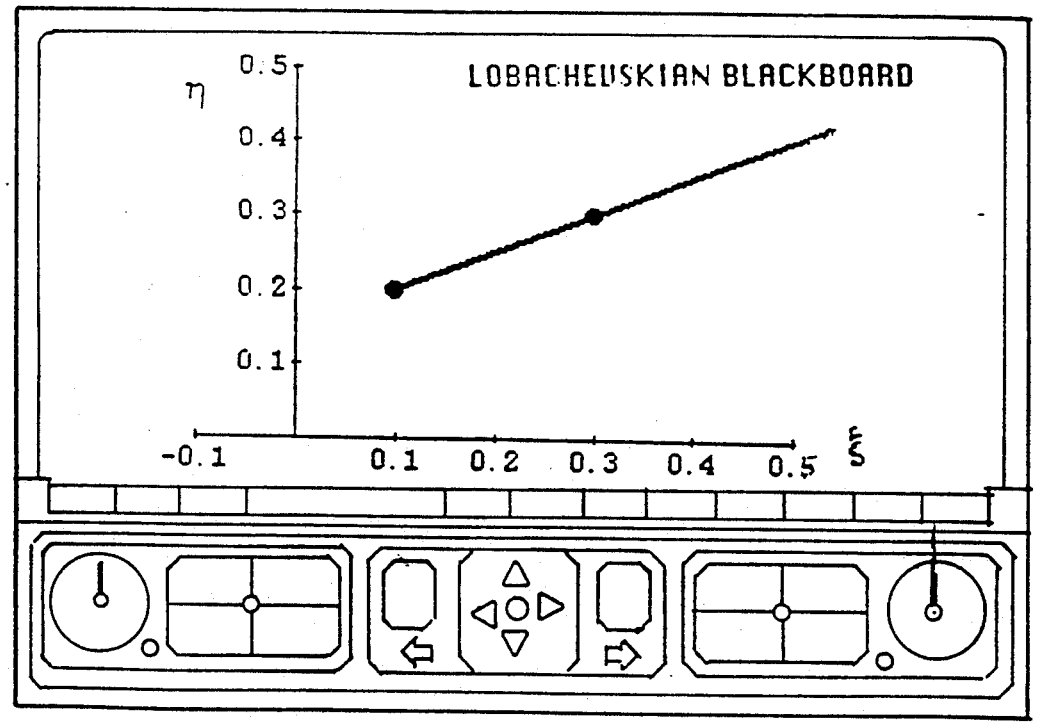
Figure 33C:
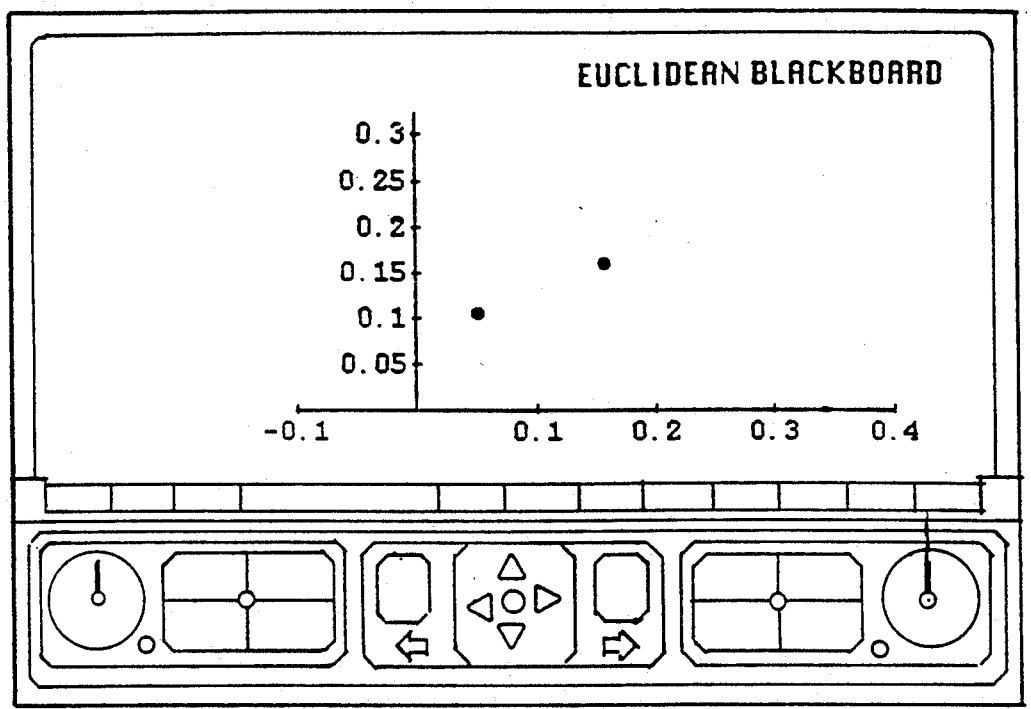
Figure 33D:
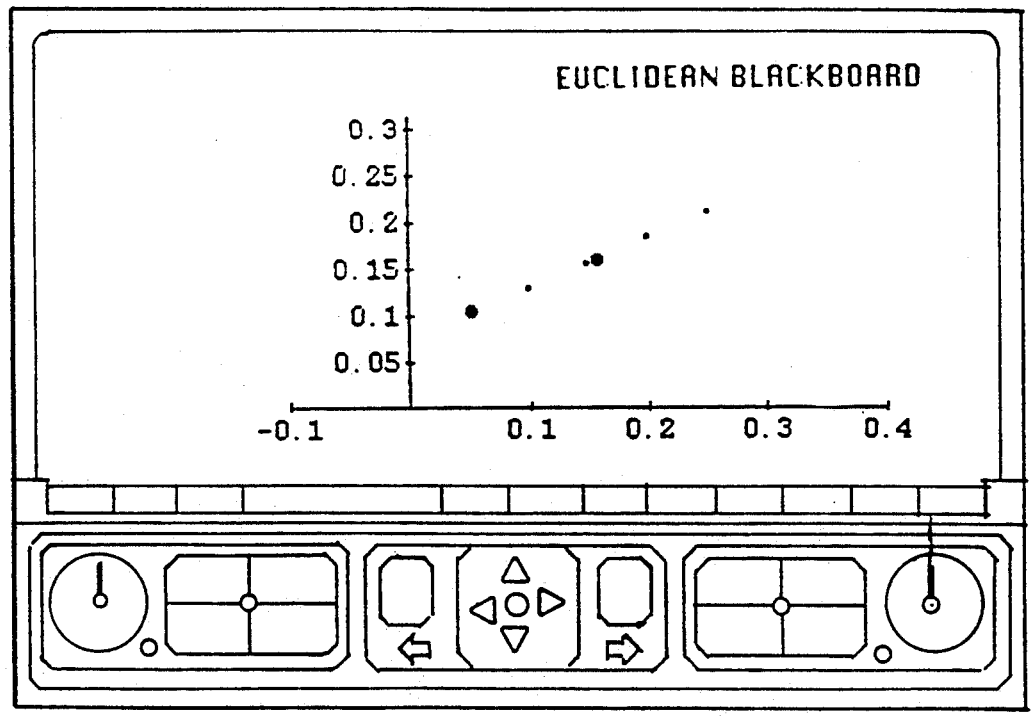

In Step 8, this line must then be taken as an object in Lobachevskian space and translated by the transducer of the present invention, in the manner already described above in Section III.A.1 for the GO/LOOK/TOUCH mode, into the retinal coordinates to be plotted on the Lobachevskian Blackboard shown in FIG. 33(b), where they produce an image of the line through the given points, as shown in FIG. 33(b). This is one implementation of the invention and is not intended to limit the invention in any way.

Overall, it is to be emphasized that the CAD user need have no involvement with the background process just described, or the intermediate "Euclidean Blackboard" images reproduced here in order to clarify the method. The user has only the immediate experience of having drawn a line in Lobachevskian space. Choosing a "ruler" from the Chalk Tray, the user merely indicates the selected points, and sees the required line appear. While the straight line has been chosen here as a fundamental example illustrating the method of the alternative blackboard, any geometric figure or design could be implemented in the same manner and by application of the same technique—curvilinear forms being approximated as closely as desired, for example, by arbitrarily numerous linear elements or by other methods of computerized curve drawing or "splining" commonly employed in computer graphic systems. Ultimately, the user would have complete freedom to draw or design figures in Lobachevskian space. Existing CAD methods of enhancing and assisting such drawing and design processes could be extended by means within the present art to apply to this problem.

The pair of points chosen for illustration yielded a "negative" result in the test of Step 5 in FIG. 32. If the value had been positive, the system would have fitted the points to the equation of the "roof" of a Lambert quadrilateral, and found a set of points lying along that line. When plotted on the Euclidean plane, these points, which have been chosen as yielding a straight line in Lobachevskian space, may well yield a curved line in the Euclidean plane. In FIGS. 30(a) and 30(b) discussed earlier, the difference between drawing a straight line on the Lobachevskian and Euclidean planes was shown, and hence the significance of being empowered by an effective CAD program to draw required shapes directly in the Lobachevskian plane. Techniques for drawing in the plane could be extended by use of the techniques already discussed, to permit design of three-dimensional figures in Lobachevskian space.

Thus, the present invention provides a system for designing and imaging objects in alternative geometries. Various changes and applications of the present invention will occur to those skilled in the art in view of the foregoing description. For example, the present invention is not limited to 4-D Euclidean Geometry and 3-D Lobachevskian geometry. The system is equally applicable for Riemannian 3-D, curvilinear systems (differential geometry), higher-dimensionalities, etc. The system of the present invention can also be used in modes other than the modes described above, as long as the transducer of the present invention is implemented. The system can produce displays, videos, hard copy output, movies, stereoptic displays, stereographic displays, and stereophonic output, etc.

What is claimed is:

1. A system for imaging directly on a retina of a user's eye in three-dimensional Euclidean space an object in an alternative geometry other than three-dimensional Euclidean geometry comprising:
   an input device for inputting physical characteristics of the alternative geometry and the object,
   a transducer for receiving light rays emitted from the object in the alternative geometry and for converting the light rays into corresponding light rays in three-dimensional Euclidean space, the light rays in three-dimensional Euclidean space being three-dimensional,
   a processing device for generating image points, representing an intersection of the light rays in three-dimensional Euclidean space with the user's retina, and for assembling the image points to form an image of the object at it would directly appear to the user's eye placed in the alternative geometry, and
   an output device for presenting the object to the user's retina as it would directly appear to the user's eye placed in the alternative geometry.

2. The system of claim 1, wherein the alternative geometry is four-dimensional Euclidean geometry.

3. The system of claim 1, wherein the alternative geometry is 3-D Lobachevskian geometry.

4. The system of claim 1, wherein the input device includes means for inputting a coordinate system for the alternative geometry.

5. The system of claim 1, wherein the input device includes selecting the alternative geometry.

6. The system of claim 1, wherein the input device further includes means for interactive manipulation of the object in the alternative geometry.

7. The system of claim 6, wherein the object manipulation means is capable of planar rotation and translation of the object.

8. The system of claim 1, wherein the input device further includes means for inputting a viewing position of the user's eye, having a visual axis, and an orientation of the visual axis of the user's eye.

9. The system of claim 8, wherein the input device further includes means for interactive manipulation of the viewing position and visual axis of the user's eye.

10. The system of claim 9, wherein the interactive manipulation means is capable of imputing planar rotation and translation to the user's eye by planar rotation and translation of the object.

11. The system of claim 1, wherein the input device includes active buttons on a computer monitor screen.

12. The system of claim 1, wherein the output device is a computer monitor screen.

13. The system of claim 1, wherein the object in the alternative geometry is a graph.

14. The system of claim 1, wherein the output device graphs an object in the alternative geometry.

15. The system of claim 1, wherein the object is a complex function.

16. The system of claim 15, wherein the complex function is a hyperbolic cosine.

17. The system of claim 1, wherein the input device further includes means for sectioning a graph representing a data structure using a plane in any four-dimensional orientation.

18. The system of claim 1, wherein the output device constructs and draws the object in the alternative geometry.

19. The system of claim 1, wherein the input device further includes means for inputting physical characteristics of the user's eye.

20. The system of claim 19, wherein the characteristics of the user's eye, having a visual axis, include a position of the user's eye and an orientation of the visual axis of the user's eye.

21. A method for imaging directly on a retina of a user's eye in three-dimensional Euclidean space, an object in an alternative geometry other than three-dimensional Euclidean geometry, comprising:
   defining through an input device physical characteristics of the alternative geometry and the object,
   transducing light rays emitted from the object in the alternative geometry by converting the light rays into corresponding light rays in three-dimensional Euclidean space, the light rays in three-dimensional Euclidean space being three-dimensional, generating image points in a processing device representing an intersection of the light rays in three-dimensional Euclidean space with the user's retina, assembling the image points in the processing device to form a direct appearance of the object in the alternative geometry, and presenting the object to the user's retina on an output device as it would directly appear to the user's eye placed in the alternative geometry.

22. The method of claim 21, wherein the method further includes the steps of interactively translating the object and interactively rotating the object about a plane in the alternative geometry.

23. The method of claim 21, wherein the method further includes the step of interactively imputing translation and planar rotation to the user's eye by translation and planar rotation of the object.

24. The method of claim 21, wherein the step of defining the characteristics of the alternative geometry includes defining a coordinate system in the alternative geometry.

25. The system of claim 21, wherein the step of defining the characteristics of the object includes interactively specifying a position and orientation for the object.

26. The method of claim 21, wherein the step of transducing includes the step of determining angles of incidence for the light rays in the alternative geometry on three-dimensional Euclidean space using geometric relationships of the alternative geometry.

27. The method of claim 26, wherein the step of transducing includes the step of determining from the incident angles of the light rays in the alternative geometry corresponding angles in three-dimensional Euclidean space using geometric relationships of three-dimensional Euclidean geometry.

28. The method of claim 27, wherein the step of determining corresponding angles further includes the step of calculating from the incident angles in the three-dimensional Euclidean space corresponding two-dimensional image points, representing the intersection of the three-dimensional light rays with the user's retina, using the geometric relationships of three-dimensional Euclidean geometry.

29. The method of claim 21, wherein the object is presented graphically as it would appear in the alternative geometry.

30. The method of claim 21, wherein the object is presented as a geometric construction.

31. The method of claim 21, wherein the steps of the method are performed as set forth sequentially in claim 1.

32. The method of claim 21, wherein the step of defining includes defining the physical characteristics of the user's eye.

33. The method of claim 32, wherein the characteristics of the user's eye, having a visual axis, include a position of the user's eye and an orientation of the visual axis of the user's eye.

* * * * *